US008029351B2

(12) United States Patent
Kosaka et al.

(10) Patent No.: US 8,029,351 B2

(45) Date of Patent: Oct. 4, 2011

(54) GAMING MACHINE INCLUDING A WHEEL AND A PROCESSOR TO SPECIFY A POCKET OF THE WHEEL

(75) Inventors: Toshihiko Kosaka, Tokyo (JP); Junichi Kogo, Tokyo (JP); Kazumasa Yoshizawa, Tokyo (JP); Yoichi Kato, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1272 days.

(21) Appl. No.: 11/500,315

(22) Filed: Aug. 8, 2006

(65) Prior Publication Data

US 2007/0060262 A1 Mar. 15, 2007

(30) Foreign Application Priority Data

| | | |
|---|---|---|
| Aug. 18, 2005 | (JP) | 2005-237808 |
| Aug. 18, 2005 | (JP) | 2005-237818 |
| Aug. 19, 2005 | (JP) | 2005-238930 |
| Jun. 27, 2006 | (JP) | 2006-177036 |
| Jun. 27, 2006 | (JP) | 2006-177045 |

(51) Int. Cl.
*A63F 13/00* (2006.01)

(52) U.S. Cl. .................... 463/17; 463/16; 273/274

(58) Field of Classification Search ............ 463/16–17; 273/274

See application file for complete search history.

(56) References Cited

U.S. PATENT DOCUMENTS

| | | | | |
|---|---|---|---|---|
| 5,178,390 | A * | 1/1993 | Okada | 273/143 R |
| 5,540,442 | A * | 7/1996 | Orselli et al. | 463/17 |
| 5,588,650 | A * | 12/1996 | Eman et al. | 273/142 B |
| 5,613,910 | A | 3/1997 | Hamano | |
| 5,743,798 | A | 4/1998 | Adams et al. | |
| 7,533,885 | B2 * | 5/2009 | Nicely et al. | 273/142 R |
| 2002/0167126 | A1 | 11/2002 | De Raedt et al. | |
| 2004/0061285 | A1 | 4/2004 | Hughes-Watts | |
| 2005/0032570 | A1 | 2/2005 | Ohira | |
| 2005/0159200 | A1 * | 7/2005 | Nicely et al. | 463/16 |

FOREIGN PATENT DOCUMENTS

| | | |
|---|---|---|
| JP | 8-38739 | 2/1996 |
| JP | 8-71208 | 3/1996 |
| JP | 8-229191 | 9/1996 |
| JP | 8-266707 | 10/1996 |
| JP | 9-75505 | 3/1997 |
| JP | 10-5393 | 1/1998 |
| JP | 2001-120716 | 5/2001 |
| JP | 2002-812 | 1/2002 |

(Continued)

OTHER PUBLICATIONS

Eurasian Search Report dated Dec. 25, 2006.

(Continued)

*Primary Examiner* — Dmitry Suhol
*Assistant Examiner* — David Duffy
(74) *Attorney, Agent, or Firm* — McGinn Intellectual Property Law Group, PLLC

(57) ABSTRACT

As a result of lottery using the roulette device 3, if the ball 27 enters in the bonus pocket 24 among the pockets formed on the wheel 22, the special bonus game using the WIN lamp 11 occurs and all credits betted to each station 4 in the present game are paid out (S15) to one station 4 which is determined based on the lottery (S123) by the server control CPU 81 that winning is obtained.

11 Claims, 31 Drawing Sheets

FOREIGN PATENT DOCUMENTS

| | | | |
|---|---|---|---|
| JP | 2003-325726 | | 11/2003 |
| JP | 2004-97487 | | 4/2004 |
| JP | 2004-248690 | | 9/2004 |
| JP | 2004-267428 | | 9/2004 |
| JP | 2005-080861 | | 3/2005 |
| RU | 2 205 052 | C1 | 6/2002 |
| WO | 2005/027058 | | 3/2005 |

OTHER PUBLICATIONS

Eurasian Office Action dated Oct. 20, 2006, with partial English translation.

Japanese Office Action for Patent Application No. 2006-177036, dated Jun. 29, 2010, with English translation.

Japanese Office Action for Patent Application No. 2006-177045, dated Jun. 29, 2010, with English translation.

Japanese Office Action in counterpart Japanese patent application No. 2005-237808 issued on Sep. 7, 2010, and English language translation.

Japanese Office Action in counterpart Japanese patent application No. 2005-237818 issued on Sep. 7, 2010, and English language translation.

Japanese Office Action in counterpart Japanese patent application No. 2006-177045 mailed on Jun. 14, 2011, and English language translation.

* cited by examiner

FIG.32
122
CONGRATULATIONS!
8
123
MEGA JACKPOT
124

GAMING MACHINE INCLUDING A WHEEL AND A PROCESSOR TO SPECIFY A POCKET OF THE WHEEL

CROSS-REFERENCE TO THE RELATED APPLICATIONS (S)

This application is based upon and claims a priority from the prior Japanese Patent Application Nos. 2005-237808, 2005-237818, 2005-238930, 2006-177036 and 2006-177045 filed on Aug. 18, 2005, Aug. 18, 2005, Aug. 19, 2005, Jun. 27, 2006 and Jun. 27, 2006, respectively, the entire contents of which are incorporated herein by reference.

BACKGROUND OF THE INVENTION

1. Field of the Invention

The present invention relates to a gaming machine in which a game is conducted by using a plurality of pockets formed in a wheel, such as a roulette game machine or a bingo game machine. In particular, the present invention relates to a gaming machine in which a payout rate can be controlled without changing construction of the wheel by paying out game media betted when a predetermined bonus pocket is specified by a specification device among pockets formed on the wheel, thereby variegated games can be provided.

2. Description of Related Art

In a gaming machine that a game is conducted by predicting a winning number such as a roulette game machine, a bingo game machine or a keno game machine, pockets, to which discriminative numbers (for example, in the roulette game machine numbers of “00”, “0”, “1”~“36”) are added, are formed on the wheel and a winning number lottery is conducted by specifying any one of the pockets on the wheel by using a roll object such as a ball rolling on the wheel.

It is desirable that such a gaming machine is constructed so that a payout rate is made controllable within a predetermined range according to a country, district and game arcade where the gaming machine is installed. However, in such gaming machine in which a lottery is conducted by using a wheel and a ball mentioned in the above, the lottery is conducted by a physical (structural) device, different from a slot machine or poker game machine in which the lottery is conducted by software control, therefore physical construction to conduct the lottery should be changed, in order to control the payout rate. Here, in particular, explanation will be done by showing the roulette game machine as an example. In the roulette game machine, special pockets corresponding to “0” (single zero) and “00” (double zeros) are provided in addition to pockets corresponding to the discriminative numbers “1”~“36” as natural numbers, thereby the payout rate is controlled. Further, in Unexamined Japanese Publication No. 2004-97487, said a bingo game machine is disclose that, in addition to plural pockets to specify symbols based on that a lottery ball is dropped in each of the pockets, a passage is provided in which the lottery ball passes and a lottery is conducted whether or not the lottery ball is newly dropped in a bonus pocket. If the lottery ball is dropped in the bonus pocket, an allotment is paid out to the player.

However, as in the conventional gaming machine mentioned in the above, if the wheel having the specific passage or the specific pocket such as “0” or “00” in addition to the normal pockets is used, thereby the payout rate is controlled, there are required plural kinds of wheels according to the number of payout rate desired to change (for example, in a case that wheels can be controlled with three kinds of payout rates, three kinds of wheels are required).

Here, the number of gaming machines using the wheel installed in one game arcade, such as the roulette game machine, the bingo game machine or the keno game machine, is reduced. Since the gaming machines are expensive, the gaming machines are typically not mass-produced. Instead a gaming machine is produced after an order is received from a game arcade. Therefore, each part utilized for the gaming machine basically becomes very expensive and it becomes a large burden for the game arcade to prepare plural kinds of parts in order to control the payout rate. Further, it is hard to partially modify or reconstruct parts.

In the above gaming machine, since it is common in the game to roll the ball on the wheel and determine the winning number, there is fear that players lose interest for the game when such games are repeatedly conducted.

Thus, a gaming machine is desired in which the payout rate can be controlled while using the wheel having the same construction in the conventional gaming machine and variegated games can be provided.

On the other hand, when a special payout or execution of a bonus game is given by forming the specific pockets on the wheel in addition to the normal pockets, there will increase chances to payout many game media in comparison with the gaming machine in which only a base game is conducted, thus a wave in payout will tend to occur. However, the above gaming machine is constructed so that when a considerably number of games is conducted, a game state is converged to an incoming and outcoming state (for example, payout rate is 80%) of game media, which is preset beforehand. Therefore, many game media may be obtained eventhough few game media are consumed, or only a few game media can be obtained eventhough many game media are consumed.

At this point, although gambling tendency is raised and interest for games raised players may lose expectation for games based on that a beneficial result does not occur for a long time, as a result, there will be a tendency that players (customers) do not desire to play such games.

SUMMARY OF THE INVENTION

In order to dissolve the above problems, the present invention has an object to provide a gaming machine in which a bonus pocket can be voluntarily provided on a wheel without changing construction of the wheel of the gaming machine, and a payout rate corresponding to payout of game media through the bonus pocket can be controlled, thereby game characteristic can be variegated.

Furthermore, the present invention has another object to provide a gaming machine having a game compensation device to compensate a loss of a player if a predetermined condition is satisfied, in which the loss of player can be compensated even if a large loss of player occurs or a disadvantageous state for the player continues for a long time, thereby fairness among players can be raised by reducing the loss of player and interest for games can be raised.

In order to accomplish the above object, according to one aspect of the present invention, it is provided a gaming machine comprising:

a wheel having a plurality of pockets to each of which a discriminative number is given, the pockets being arranged thereon;

a plurality of game stations each of which has a bet acceptance device which accepts a bet operation conducted while predicting a winning number; and a processor programmed to operate with the wheel and the game stations (a) to specify the pocket among plural pockets on the wheel, (b) to detect the discriminative number given to the specified pocket as the winning number, (c) to pay out to the game station based on the detected winning number and the bet operation accepted by the bet acceptance device in the game station, (d) to set one of the pockets to a bonus pocket, and (e) to give an award to the game station when the bonus pocket is specified thereby.

And according to another aspect of the present invention, it is provided a gaming machine comprising:

a wheel having a plurality of pockets to each of which a discriminative number is given, the pockets being arranged thereon;

a plurality of game stations each of which has a bet acceptance device which accepts a bet operation conducted while predicting a winning number; and a processor programmed to operate with the wheel and the game stations (a) to specify the pocket among plural pockets on the wheel, (b) to detect the discriminative number given to the specified pocket as the winning number, (c) to pay out to the game station based on the detected winning number and the bet operation accepted by the bet acceptance device in the game station, and (d) to compensate a loss in a game based on a bet amount betted through the bet acceptance device when a right to win an award is not obtained according to the detected winning number.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

Hereinafter, a gaming machine of the present invention embodied in a roulette game machine will be described based on the first to seventh embodiments, with reference to the drawings. Here, the roulette game machine is a gaming machine on which players predict a number and the like which is determined by a lottery in the roulette game machine and bet game media such as medals to the number predicted, and when the number to which game media are betted is won, players can obtain payout of a predetermined number of medals.

First Embodiment

Figure 1:
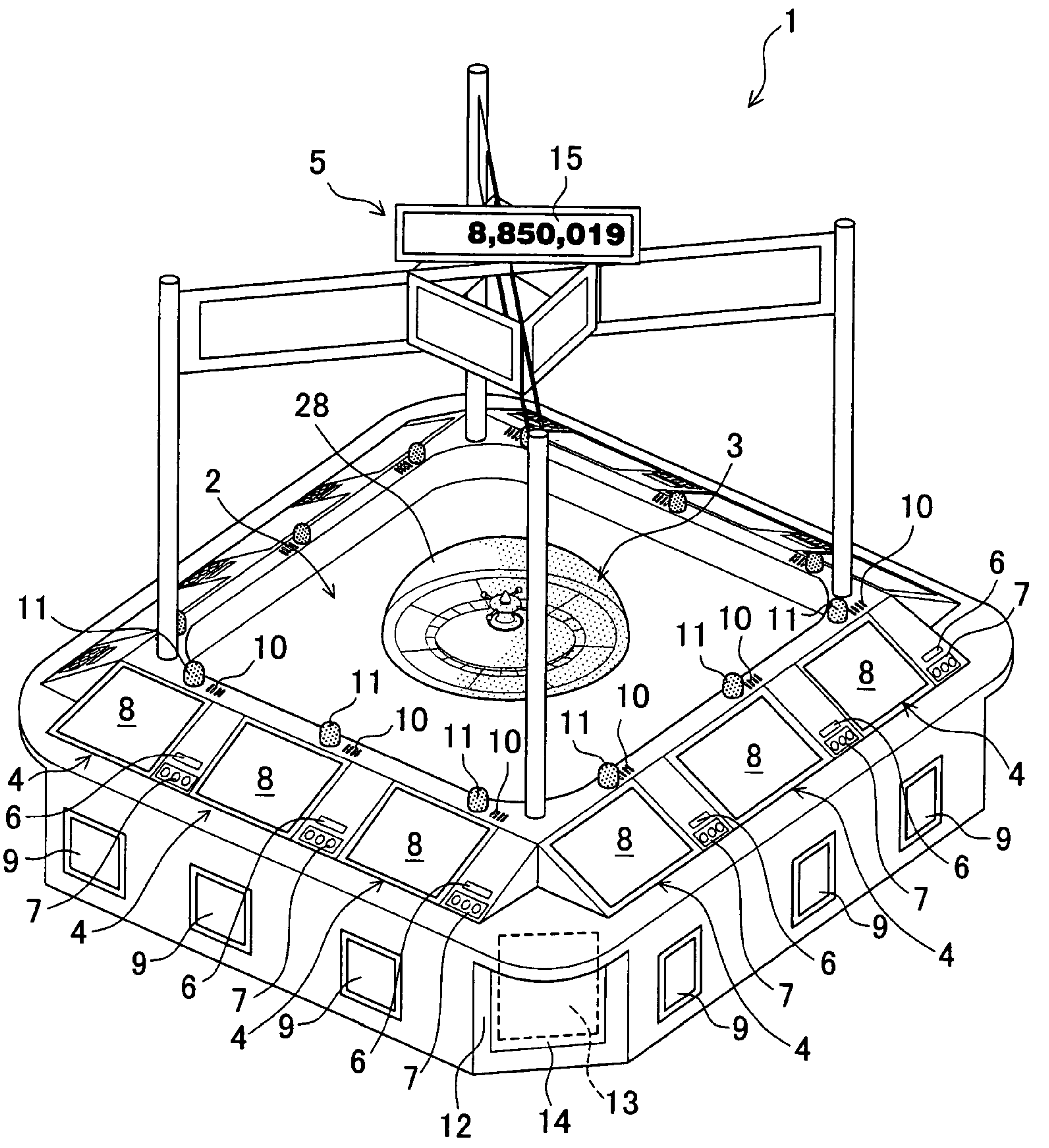
FIG. 1 is an outline perspective view showing an outline construction of a roulette game machine according to the first embodiment.

At first, an outline construction of a roulette game machine according to the first embodiment will be described with reference to FIG. 1. FIG. 1 is an outline perspective view showing an outline construction of the roulette game machine according to the first embodiment.

As shown in FIG. 1, the roulette game machine is basically constructed from a cabinet 2 as a main body, a roulette device 3 substantially arranged at an upper center position of the cabinet 2, a plurality of stations 4 (in the first embodiment, 12 stations) arranged so as to surround the roulette device 3 and an electric display device 5 arranged at an upper position of the cabinet 2.

Here, the station 4 is defined as a gaming area with at least a medal insertion portion 6 to insert game media such as coins or medals used in a game, a control portion 7 having plural control buttons by each of which a predetermined instruction is input by a player and an image display device 8 displaying images concerning with the game. A bet operation by the player is accepted through the station 4. The player operates a touch panel or the control portion 7 while seeing the images displayed on the image display device 8, thereby the game can be progressed.

At a side plane of the cabinet 2, in which each of the stations 4 is installed, a medal payout opening 9 is respectively provided. Further, at an upper right position of the image display device 8 in each of the stations 4, a speaker 10 to output music or effect sounds is provided.

Further, at an upper position of each of the image display devices 8, a WIN lamp 11 is respectively provided. Here, as mentioned later, the WIN lamp 11 is utilized in a special bonus game occurring when a ball enters in a pocket corresponding to "00" (double zeros), and turning on and off of the WIN lamp 11 is repeatedly conducted with a predetermined timing (see FIG. 14) so that the station 4 in which the WIN lamp 11 turns on is moved in clockwise direction in the roulette game machine 1. Only the WIN lamp 11 of the station 4 in which the special bonus game is obtained is turned on, thereby winning of the special bonus game is notified. Further, also in a base game, if the number (in the first embodiment, "0", "1"~"36") betted in the station 4 is won, the WIN lamp 11 of the station 4 in which winning of the number occurs is turned on. Furthermore, in a Jack Pot (hereinafter, abbreviated as "JP") bonus game to obtain the JP, the WIN lamp 11 of the station 4 in which the JP is won is also turned on. Here, this WIN lamp 11 is arranged at a position where the WIN lamp 11 can be seen from all of the stations 4 (12 stations in the first embodiment), thereby the other players playing in the same roulette game machine 1 can always confirm turning on of the WIN lamp 11.

A medal sensor (not shown) is arranged within the medal insertion portion 6, thereby game media such as medals inserted in the medal insertion portion 6 are discriminated and counted by the medal sensor. A hopper (not shown) is provided within the medal payout opening 9 and the hopper pays out a predetermined number of medals from the medal payout opening 9.

Within a corner portion 12 positioned at corners of the cabinet 2, a server 13 (mentioned later) is arranged. Here, although the server 13 is normally arranged within the corner portion 12 so as not to be operated by the player, the server 13 can be operated by opening a corner door 14 provided at the corner portion 12 through a key switch. By operating the server 13, various conditions of the roulette game machine 1 can be set and the pocket becoming the bonus pocket can be changed and set.

On the electric display device 5 a JP sum display portion 15 displaying a JP sum is provided. Here, in the roulette game machine 1 according to the first embodiment, among credits betted in the base game (roulette game) by using the BET screen 61 (mentioned later) in all of 12 stations 4, 0.5% of credits are accumulatively stored. With respect to the JP credits accumulatively stored, when a predetermined condition is satisfied in the JP bonus game, the JP is won, thereby the payout is conducted in the predetermined station 4. The JP sum display portion 15 is provided on a top of the electric display device 5 and contents thereof can be seen by all players playing in the stations 4.

Figure 2:
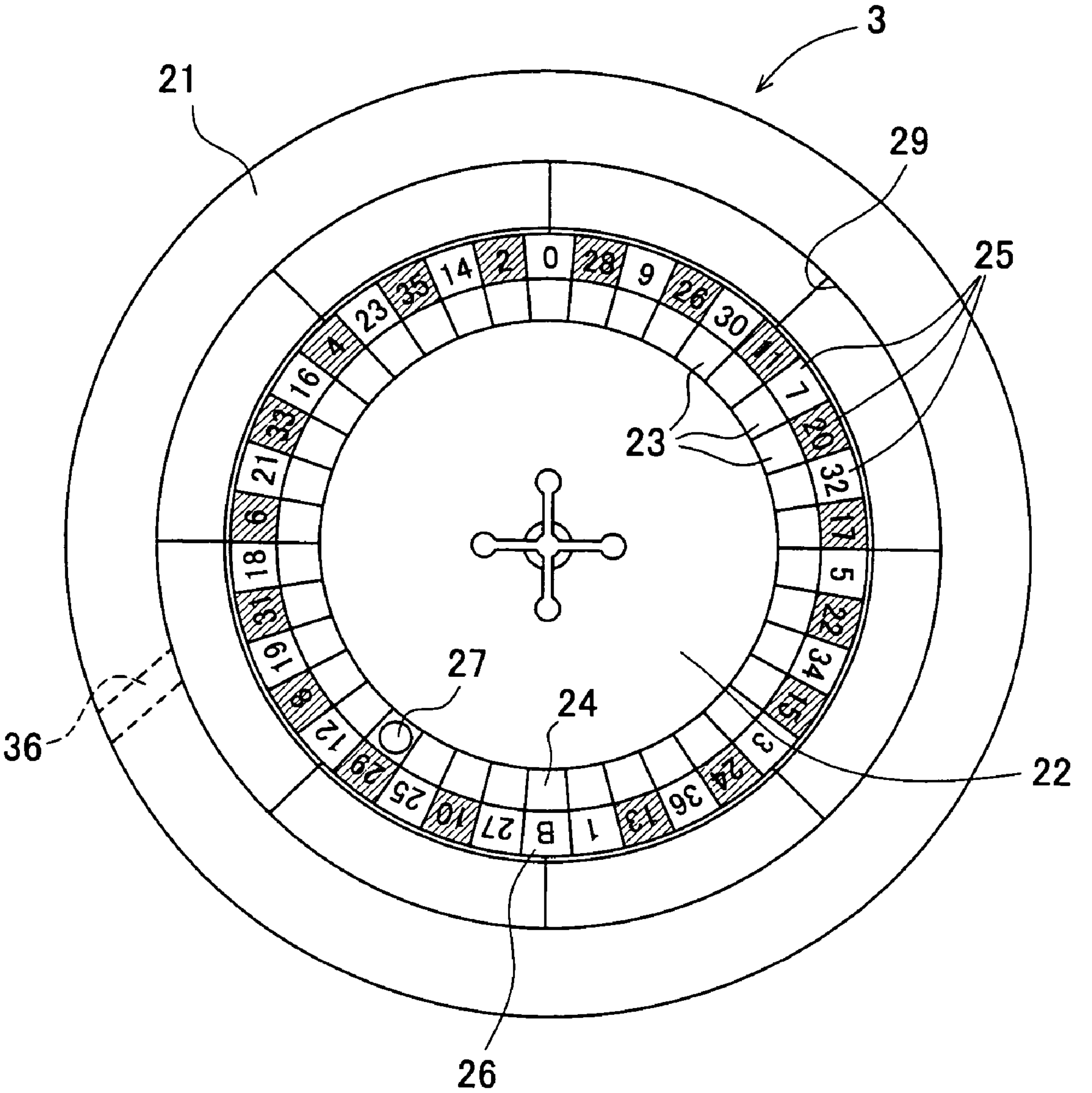
FIG. 2 is a plan view of the roulette game machine according to the first embodiment.

Next, a construction of the roulette device 3 according to the first embodiment will be described with reference to FIG. 2. FIG. 2 is a plan view of the roulette device 3 according to the first embodiment.

As shown in FIG. 2, the roulette device 3 is basically constructed from a frame 21 fixed to the cabinet 2 and a wheel 22 which is rotatably set within the frame 21. On an upper surface of the wheel 22, number pockets 23 formed in a concave form and a bonus pocket 24 (total 38 pockets in the first embodiment) are formed. Further, on the upper surface of the wheel 22 in an outer direction of each number pocket 23, a number display plate 25, on which each of the numbers "0", "1"~"36" as figure numbers is printed, is arranged so as to correspond to each of the number pockets 23. That is to say, in other words, 37 number pockets 23, to each of which any one of the numbers is given among the numbers "0", "1"~"36", are totally formed on the wheel 22. On the upper surface of the wheel 22 in an outer direction of the bonus pocket 24, a bonus display plate 26, on which the English character "B" is printed, is arranged so as to correspond to the bonus pocket 24.

Here, the bonus pocket 24 is a pocket which is positioned at the same position as the number pocket corresponded to "00" formed in the conventional roulette device 3 having 38 number pockets and has the same figure as the number pocket of "00". The bonus display plate 26 is constructed by adhering a seal and the like on the number display plate 25 on which the number "00" is printed. Therefore, in the roulette device 3 of the first embodiment, the bonus pocket 24 can be voluntarily provided on the wheel 22 instead of the number pocket corresponding to the number "00", without changing structure of the wheel 22.

Further, in the first embodiment, although the bonus pocket 24 is provided instead of the number pocket corresponded to the number "00", the number of the bonus pocket 24 is not limited to one. For example, the bonus pocket 24 may be further provided instead of the number pocket 23 corresponded to the number "0". At that time, additional setup of the bonus pocket can be done by conducting a predetermined operation in the server 3.

Within the frame 21, a ball throwing opening 36 is formed. A ball throwing device (not shown) is connected to the ball throwing opening 36 and a ball 27 is thrown on the wheel 22 from the ball throwing opening 36 corresponding to drive of the ball throwing device. An upper whole of the roulette wheel is covered with a semi-spherical cover member 28 made of transparent acrylic resin.

A winning determination device (not shown) is arranged under the wheel 22 to determine whether or not winning is obtained. The winning determination device is a device to determine whether the ball 27 enters in any of the number pockets 23 or the bonus pocket 24. Further, a ball collection device (not shown) is arranged under the wheel 22. This ball collection device is a device to collect the ball 27 on the wheel 22 after the game is terminated. Here, the ball throwing device, the determination device and the ball collection device are already well-known, thus explanation thereof will be omitted.

Here, the frame 21 is gradually inclined toward the inner side thereof and a guide wall 29 is formed in the middle position of the frame 21. The guide wall 29 guides the ball 27 against centrifugal force of the ball 27 thrown in the frame 21 and rolls the ball 27 therealong. When rolling speed of the ball 27 becomes weak and centrifugal force thereof disappears, the ball 27 rolls down on an inclined surface of the frame 21 toward the inner side and reaches to the wheel 22 which is rotating.

As the ball 27 rolls down to the wheel 22, it passes the number display plates 25 or the bonus display plate 26 positioned at the outer side of the wheel 22 which is rotating. Thereby, the ball 27 enters in any of the number pockets 23 or the bonus pocket 24. As a result, if the ball 27 enters in any of the number pockets 23, the number printed on the number display plate 25 corresponding to the number pocket 23 in which the ball 27 enters is determined as the winning number by the winning determination device. On the other hand, if the ball 27 enters in the bonus pocket 24, the special bonus game mentioned later is started by using the WIN lamp 11.

Figure 3:
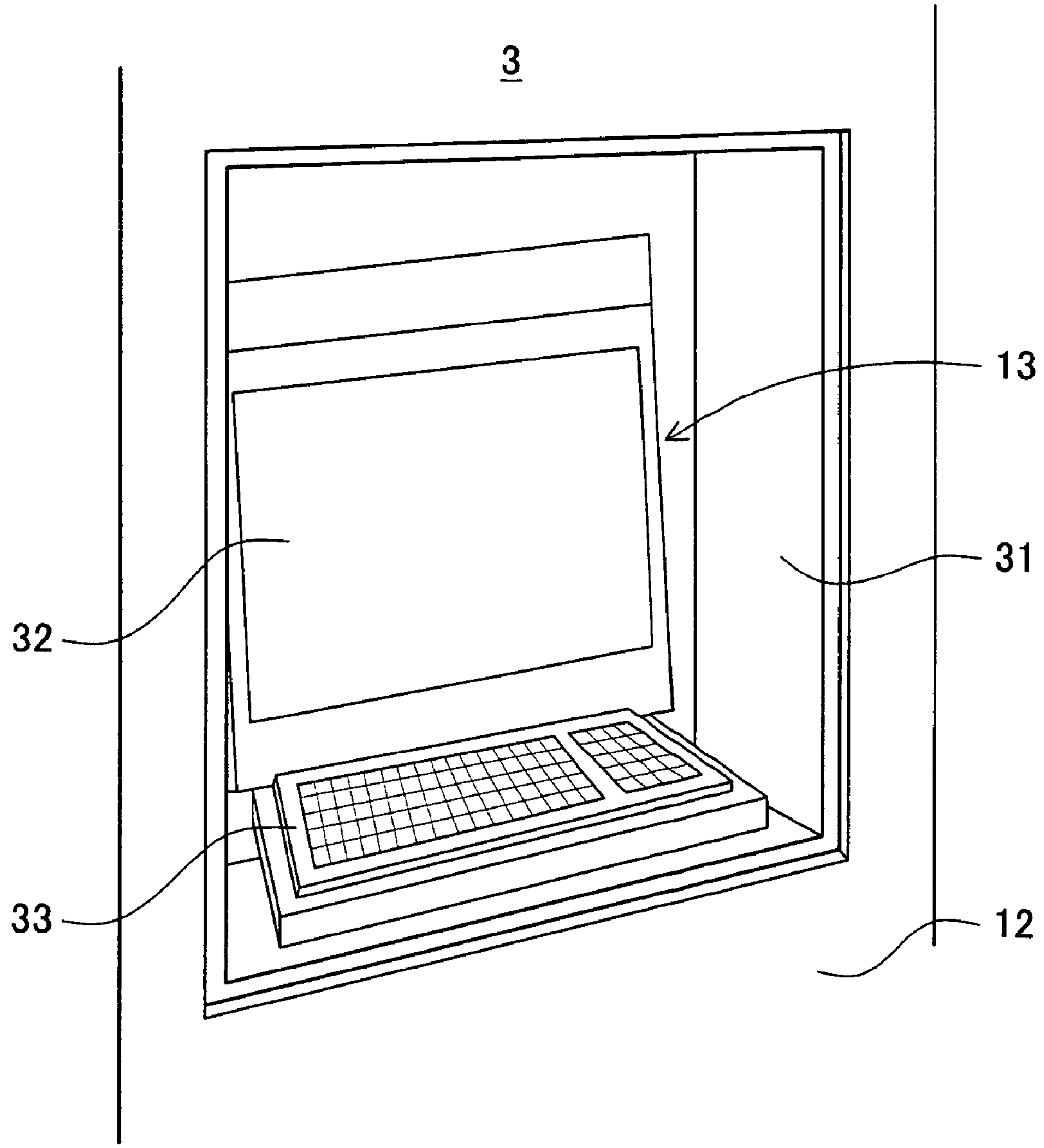
FIG. 3 is a perspective view showing a server according to the first embodiment.

Next, with reference to FIG. 3, the server 13 provided in the roulette game machine 1 according to the first embodiment will be described. FIG. 3 is a perspective view showing the server 13 according to the first embodiment.

FIG. 3 is a view showing a state in which the corner door 14 of the corner portion 12 is opened, and the server 13 is installed in a space 31 formed on a wall surface of the cabinet 2.

Here, the server 13 is connected to each of the stations 4 and mainly controls each station 4 by transmitting an instruction signal to each station 4, thereby the server 13 progresses the game. Through the server 13, setup of addition and deletion of the bonus pocket 24 is conducted, in addition to control concerning with the game in the roulette game machine 1.

As shown in FIG. 3, a liquid crystal display 32 and a keyboard 33 are connected to the server 13 and a menu screen 40 (see FIG. 4) mentioned later and a bonus pocket setup screen 42 (see FIG. 5) are displayed on the liquid crystal display 32. The keyboard 33 is an operation device on which plural keys are arranged, and based on that a maintenance person operates the keyboard 33 in a state that the menu screen 40 or bonus pocket setup screen 42 is displayed on the liquid crystal display 32, setup of addition and deletion of the pocket becoming the bonus pocket 24 can be done, in addition to various setups in the roulette game machine 1.

Here, in the roulette game machine 1 according to the first embodiment, when the ball 27 enters in the bonus pocket 24 formed in the wheel 22, the special bonus game mentioned later occurs, and the payout rate can be precisely controlled by adding or deleting the number of the bonus pocket 24 through the server 13.

Figure 4:
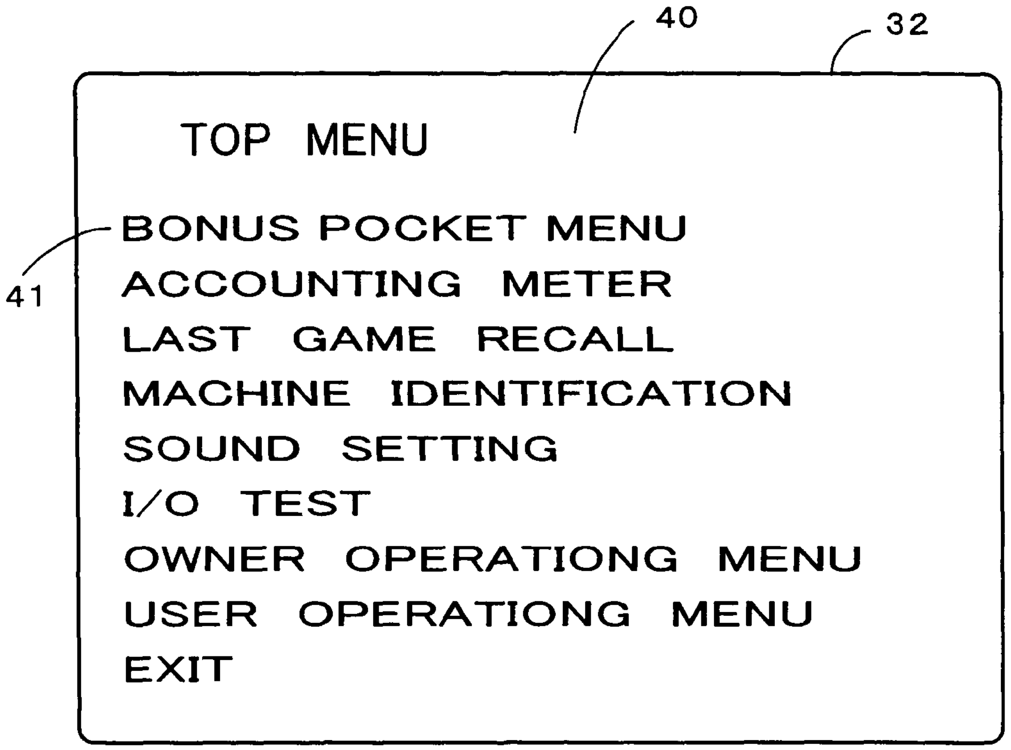
FIG. 4 is an explanatory view showing a menu screen displayed on a liquid crystal display of the server according to the first embodiment.

Next, the menu screen 40 and bonus pocket setup screen 42 displayed on the liquid crystal display 32 will be described with reference to FIGS. 4 and 5. FIG. 4 is an explanatory view showing the menu screen displayed on the liquid crystal display 32 and FIG. 5 is an explanatory view showing the bonus pocket setup screen 42 displayed on the liquid crystal display 32.

As shown in FIG. 4, a plurality of setup items 41 (eight items in the first embodiment) corresponding to the roulette game machine 1 are displayed in the menu screen 40 and the maintenance person can conduct various setups (for example, setup of sound volume, test operation) in the roulette game machine 1 by selecting desirable setup items through the keyboard 33. Among the setup items 41, in particular, if "BONUS POCKET MENU" is selected, the bonus pocket setup screen 42 is displayed and setup concerning with addition or deletion of the pocket becoming the bonus pocket 24 can be changed.

Figure 5:
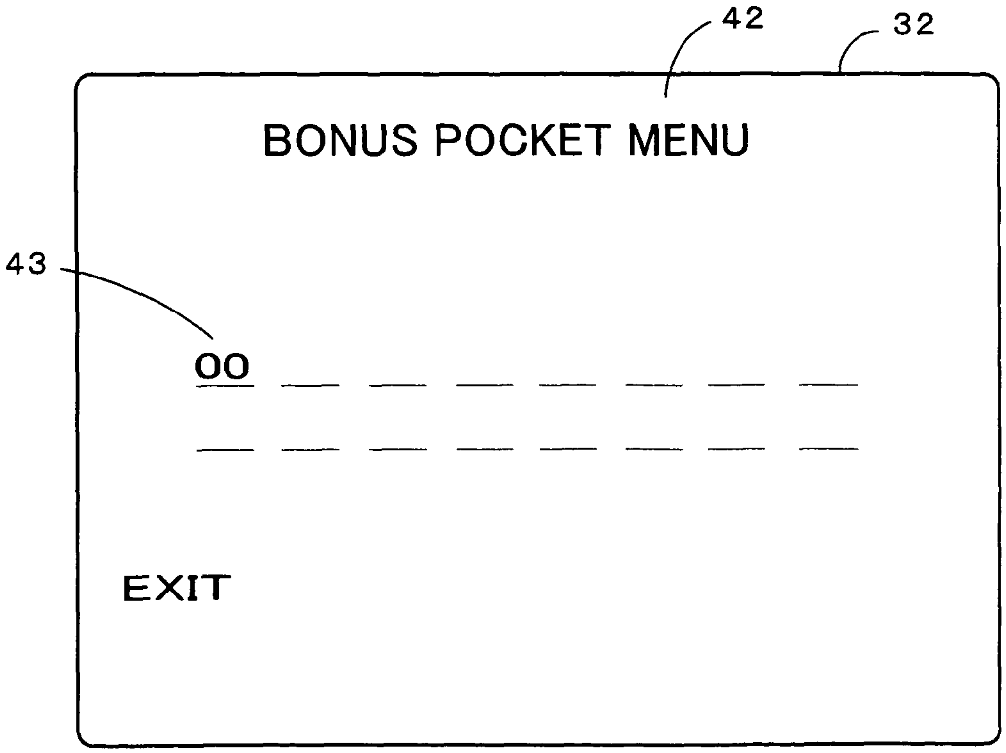
FIG. 5 is an explanatory view showing a setup screen of bonus pocket displayed on the liquid crystal display of the server according to the first embodiment.

As shown in FIG. 5, on the bonus pocket setup screen 42, a bonus number 43 is displayed to specify the number of the pocket which becomes the bonus pocket 24 among 38 pockets formed on the wheel 22. Here, in the roulette game machine 1 according to the first embodiment, as shown in FIG. 5, the number "00" as the initial setup number when the roulette game machine 1 is forwarded is preset to the bonus number 43 and the bonus pocket 24 is provided instead of the number pocket 23 corresponded to the number "00", as shown in FIG. 2.

The maintenance person newly inputs the bonus number 43 on the bonus pocket setup screen 42 within a range of numbers "00", "0", "1"~"36" by using the keyboard 33, thereby the number pocket 23 corresponding to the number input by the maintenance person can be changed to the bonus pocket 24. On the other hand, when the maintenance person deletes the number displayed as the bonus number 43 on the bonus pocket setup screen 42 by using the keyboard 33, the bonus pocket 24 corresponding to the number deleted by the maintenance person can be changed to the number pocket 23.

Thereafter, the maintenance person adheres the seal on the number display plate 25 of the number pocket 23 changed to the bonus pocket 24, thereby such number display plate 25 is changed to the bonus display plate 26. Based on that the maintenance person peels the seal adhered on the bonus display plate 26 of the bonus pocket 24 changed to the number pocket 23, the bonus display plate 26 is changed to the number display plate 25. Thereby, the player can distinguish the number pocket 23 and the bonus pocket 24 formed on the wheel 22 at sight.

Next, construction of the control portion 7 and the image display device 8 of the first embodiment will be described.

The control portion 7 is, as shown in FIG. 1, provided at the side position of the image display device 8 and buttons operated by the player are arranged on the control portion 7. Concretely, when seeing toward the station 4, a BET confirmation button 47, a CASHOUT button 48 and a HELP button 49 are arranged from the left side.

The BET confirmation button 47 is a button which is pressed when the BET is confirmed after a bet operation is conducted by the image display device 8 mentioned later. After the BET is confirmed and if the player bets to the number printed on the number display plate 25 corresponding to the number pocket 23 in which the ball 27 enters in the roulette device 3 during the game, the player can win. If a player wins, credits corresponding to the number of chips betted are added to the credits obtained at present by the player. Here, the bet operation will be described hereinafter.

The CASHOUT button 48 is a button generally pressed when the game is terminated, and when the CASHOUT button 48 is pressed, medals (generally, one credit corresponds to one medal) corresponding to the credits obtained in games at present by the player are paid out from the medal payout opening 9.

The HELP button 49 is a button pressed when the player cannot understand the game operation method and the like, and when the HELP button 49 is pressed, a help screen on which various kinds of operation information are displayed is displayed on the image display device 8 right after press of the HELP button 49.

Figure 6:
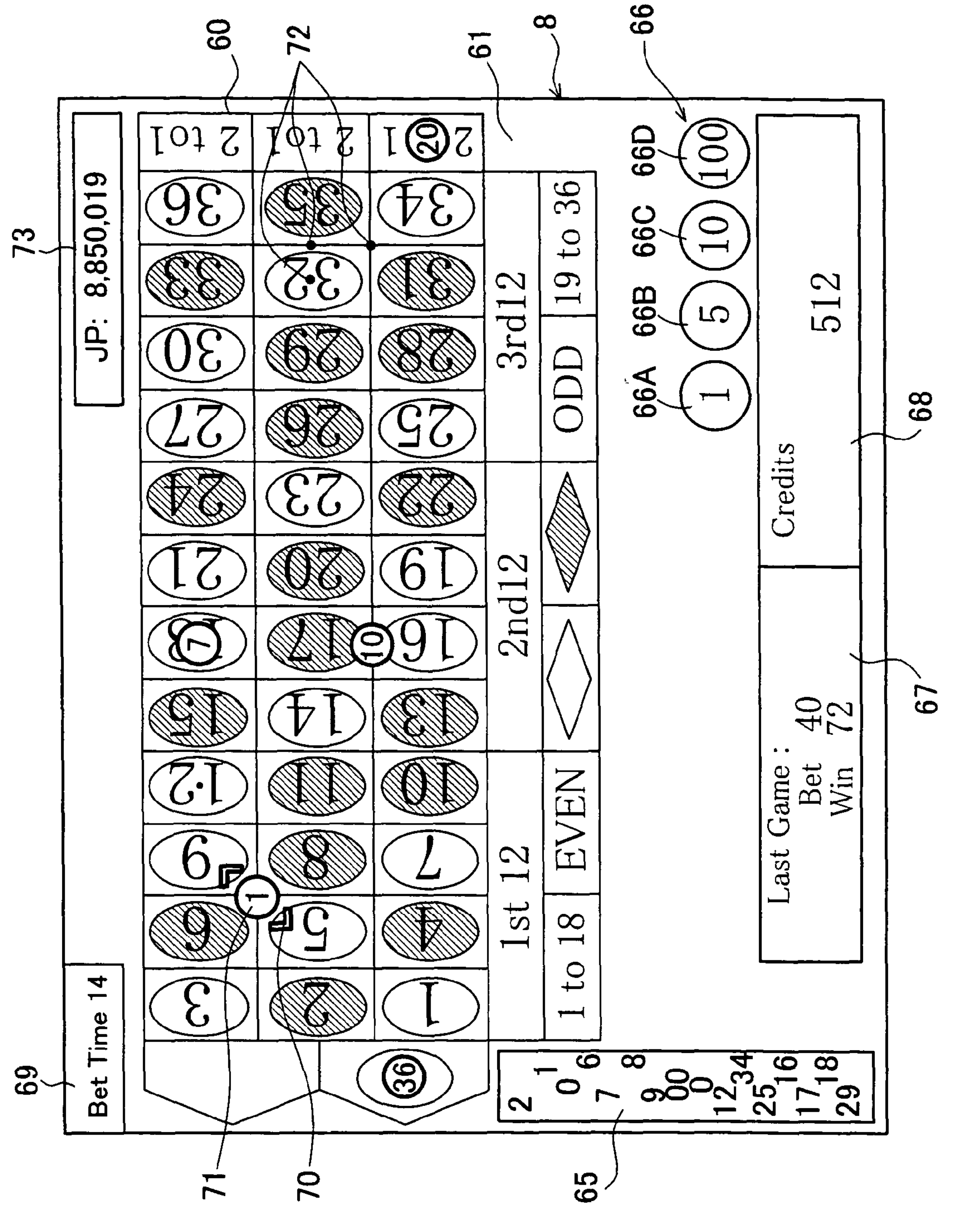
FIG. 6 is an explanatory view showing a BET screen displayed on an image display device.

On the other hand, the image display device 8 is a so-called liquid crystal display with a touch panel which is arranged on the front surface thereof, and based on that the player presses one of plural icons displayed on the liquid crystal screen by the finger, such icon can be selected. FIG. 6 is an explanatory view showing one example of display screen displayed on the image display device 8 during the game.

As shown in FIG. 6, during the game in the roulette game machine 1 a BET screen 16 having a table betting board 60 is displayed on the image display device 8. Using the BET screen 61, the player can bet chips by using the credits obtained at present.

At first, with reference to FIG. 6, the BET screen 61 used in the base game will be described. In the table betting board 60 displayed in the BET screen 61, among 38 numbers of “0”, “00”, “1”~“36”, there are arranged and displayed in matrix the numbers as same as the numbers (that is, the numbers displayed on the number display plates 25, and for example, 37 kinds of numbers of “0”, “1”~“36” in FIG. 2), except for the number set to the bonus pocket 24 by the server 13. There are also arranged in matrix “odd numbers”, “even numbers” “kinds of color of number display plates” (red and black) and specific BET areas to bet chips by directing “a predetermined number range (for example, “1”~“12”)”.

Under the table betting board 60, a result history display portion 65, unit BET buttons 66, a CASHOUT result display portion 67 and a credit number display portion 68 are displayed from the left side of the screen.

In the result history display portion 65, it is displayed in a table form a result of winning numbers won in the games conducted till the previous game is terminated (here, one game means a series of operations that the player bets in each station 4 and the ball 27 rolls down in one of the number pockets 23 or the bonus pocket 24 and the payout of credits is conducted based on the winning number). At that time, after one game is terminated, a new winning number is added and displayed from the upper side and the history of winning numbers for 16 games at maximum can be confirmed.

The unit BET button 66 is a button to bet chips on BET areas 72 (on number and square of mark or square line forming squares) directed by the player. The unit BET button 66 comprises four kinds of a 1 BET button 66A, a 5 BET button 66B, a 10 BET button 66C and a 100 BET button 66D.

The player, at first, directly presses the BET area 72 for betting by the finger and directs by a cursor 70 mentioned later. In such state, when the player presses the 1 BET button 66A, the player can bet one chip every one press thereof (the bet number increases according to “1”→“2”→“3”→ . . . every the player presses the 1 BET button 66A by the finger). When the player presses the 5 BET button 66B, the player can bet 5 chips every one press thereof (the bet number increases according to “5”→“10”→“15”→ . . . every the player presses the 5 BET button 66B by the finger). When the player presses the 10 BET button 66C, the player can bet 10 chips every one press thereof (the bet number increases according to “10”→“20”→“30”→ . . . every the player presses the 10 BET button 66C by the finger). Further, when the player presses the 100 BET button 66D, the player can bet 100 chips every one press thereof (the bet number increases according to “100”→“200”→“300”→ . . . every the player presses the 100 BET button 66D by the finger).

Therefore, when many chips are betted, the bet operation of chips can be simplified.

In the CASHOUT result display portion 67, the bet number in the previous game betted by the player and the credit number for cashout are displayed. Here, the number obtained by subtracting the bet number from the CASHOUT credit number is the credit number which is newly obtained in the previous game by the player.

Further, in the credit number display portion 68, the credit number obtained by the player at present is displayed. This credit number reduces according to the bet number (one credit against to one bet) when chips are betted. In a case that a player wins and cashout of the credit is conducted, the credit number for cashout number of chips is increased. Here, when the credit number obtained by the player becomes “0”, the game is terminated.

Further, at an upper position of the table betting board 60, a BET time display portion 69 is provided. The BET time display portion 69 displays a remaining time during which the player can bet. At start of acceptance for bet operation, the number “20” is displayed and such number decreases by 1 every one second elapses, and when the number becomes “0”, the acceptance of bet operation is terminated. If the remaining time permitted for the player becomes 5 seconds in each station 4, the ball throwing device is driven and the ball 27 is thrown on the roulette wheel.

Further, at the right side of the BET time display portion 69, a JP display portion 73 is provided for displaying the credit number of the JP accumulated by now. Here, the JP display portion 73 displays the credit number which is calculated by accumulatively adding 0.5% of the credits betted in all of 12 stations 4 and the common value is displayed in all of the stations 4. Further, in a case that a predetermined condition is satisfied in the JP bonus game which occurs at a predetermined timing, the JP is won and the credit number of JP is paid out. Thereafter, an initial value (for example, 50000 credits) is displayed in the JP display portion 73. Here, as for the credit number of JP accumulated by now, such credit number is also displayed in the JP sum display portion 15 (see FIG. 1), in addition to the JP display portion 73.

On the table betting board 60, a cursor 70 indicating the BET area 72 which the player selects at present is displayed. A chip mark 71 indicating the chip number betted by the present time and the BET area 72 is displayed and the number displayed on the chip mark 71 indicates the bet number of chips. For example, as shown in FIG. 6, the chip mark 71 of “7” set on the square “18” indicates that 7 chips are betted to the number “18”. Here, the betting method to bet to only one number is called as “straight bet”.

The chip mark 71 of “1” set on the cross point of the squares “5”, “6”, “8”, “9” indicates that one chip is betted so as to cover four numbers “5”, “6”, “8”, “9”. Here, the betting method to cover four numbers is called as “corner bet”.

As for the other betting methods, there exist “split bet” to bet on a line between two numbers so as to cover two numbers, “street bet” to bet at an end of the horizontal row (in FIG. 6, the vertical line) of the numbers so as to cover three numbers (for example, “13”, “14”, “15”), “five bet” to bet on a line between the number “00” and “3” so as to cover five numbers of "0", "00", "1", "2", "3", "line bet" to bet between two horizontal rows (in FIG. 6, two vertical lines) of the numbers so as to cover six numbers (for example, "13", "14", "15", "16", "17", "18"), "column bet" to bet on the square described as "2 to 1" so as to cover 12 numbers, and "dozen bet" to bet on the square described as "1st 12", "2nd 12", "3rd 12" to respectively cover 12 numbers. Further, there exists a betting method to bet so as to cover 18 numbers based on whether color of the number display plate is red or black, the number is the odd number or even number, the number is less than 18 or more than 19, by using six squares provided at the lowermost stage in the table betting board 60. Here, in each of the betting methods mentioned in the above, the payout of credits (payout magnification) per one chip is respectively made different when winning is obtained for the betted chip.

When the player bets on the BET screen 61 constructed according to the above, at first, the player directs the BET area 72 (on number and square of mark or square line forming squares) to be betted on the screen and directly presses by the finger. As a result, the cursor 70 moves to the BET area 72 directed.

Thereafter, the player presses one of the unit bet buttons 66 (1 BET button 66A, 5 BET button 66B, 10 BET button 66C, 100 BET button 66D). Thereby, chips corresponding to the unit number are betted to the BET area 72 directed. For example, when the player presses the 10 BET button 66C four times, 5 BET button 66B one time and 1 BET button 66A three times, 48 chips can be totally betted.

Figure 7:
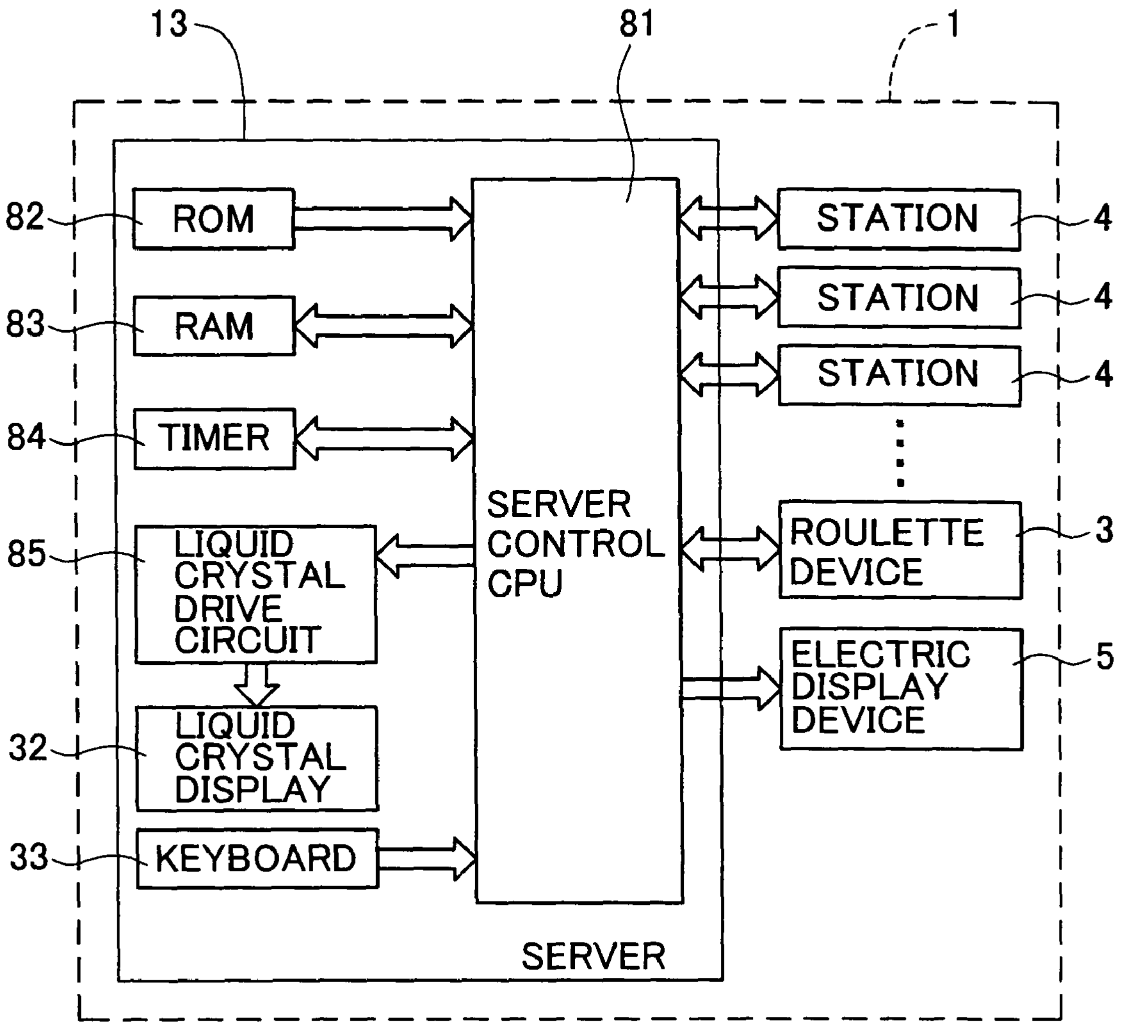
FIG. 7 is a block diagram schematically showing a control system of the roulette game machine according to the first embodiment.

Next, a construction of control system in the roulette game machine 1 according to the first embodiment will be described with reference to FIG. 7. FIG. 7 is a block diagram schematically showing the control system of the roulette game machine.

As shown in FIG. 7, the roulette game machine 1 is constructed from the server 13 and a plurality of stations 4 (in the first embodiment, 12 stations) connected to the server 13, and the roulette device 3 and the electric display device 5 are connected to the server 13. Here, a control system of the station 4 will be described hereinafter.

Figure 33:
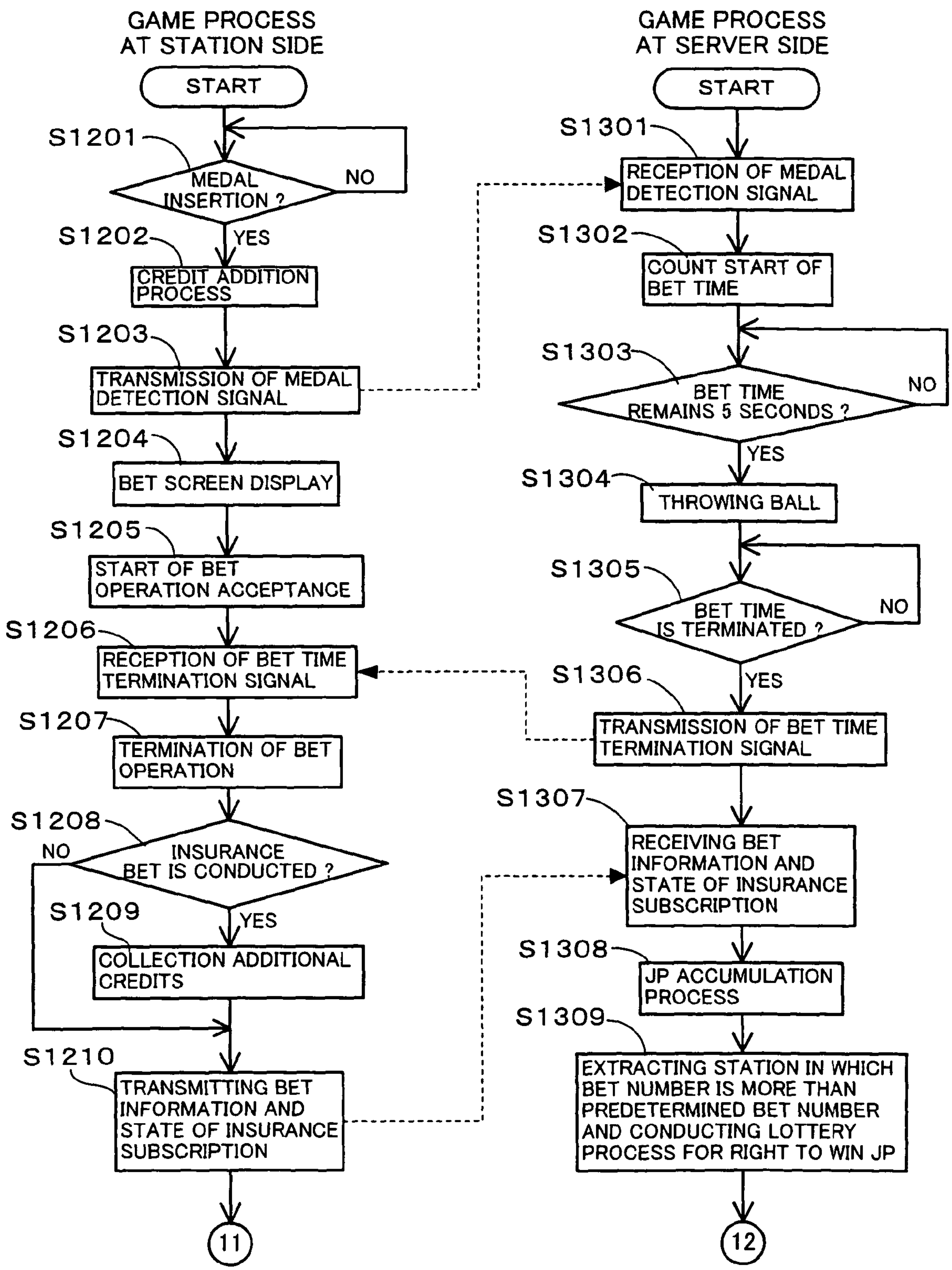
FIG. 33 is a flowchart of game process program executed in the roulette game machine according to the seventh embodiment.

The server 13 is basically constructed from a server control CPU 81, a ROM 82, a RAM 83, a timer 84 connected to the server control CPU 81, the liquid crystal display 32 connected to the server control CPU 81 through a liquid crystal drive circuit 85 and the keyboard 33 (see FIG. 33).

The server control CPU 81 conducts various processes based on input signals supplied from the stations 4 and programs stored in the ROM 82 and the RAM 83, and transmits command signals to the stations based on a result of processes, thereby the server control CPU 81 mainly controls each of the stations 4 and progresses the game. Further, the server control CPU 81 drives the drive motors provided in the roulette device 3, thereby the ball 27 is thrown on the wheel 22 and the wheel 22 is rotated. The server control CPU 81 controls the determination device when a position in which the ball 27 is rolled is specified, thereby the winning number concerning with the position in which the ball 27 is rolled is determined. Further, the server control CPU 81 determines whether or not winning is obtained for chips betted, and calculates the credit number paid out in each of the stations 4.

The ROM 82 is, for example, constructed from a semi-conductor memory and there are stored in the ROM 82 programs to realize basic functions of the roulette game machine 1, notification of maintenance time and setup of notification condition to notify the maintenance time, program to execute management, the payout magnification for the roulette game (the payout number of credits corresponding to winning per one chip and programs to mainly control each of the stations 4.

On the other hand, there are temporarily stored in the RAM 83 bet information of chips, the winning number of the roulette device 3 determined by the sensor, the JP sum accumulated by present, the kind of bonus pocket 24 set on the bonus pocket setup screen 42 ("00" is set in the initial setup) and data concerning with a result of processes executed by the server control CPU 81.

Further, to the server control CPU 81, the timer 84 to count a time is connected. Time information counted by the tinier 84 is transmitted to the server control CPU 81, thereby the server control CPU 81 conducts rotation operation of the wheel 22 and throwing of the ball 27 based on the time information counted by the timer 84.

To the server control CPU 81, the electric display device 5 (see FIG. 1) is connected. The server control CPU 81 controls the electric display device 5 so as to conduct illumination effects by controlling light emission of light emitting devices such as LEDs and so as to display predetermined characters on the electric display device 5. Further, in particular, the server control CPU 81 controls the electric display device 5 so as to display the JP sum accumulated by preset in the JP sum display portion 15 of the electric display device 5.

Figure 9:
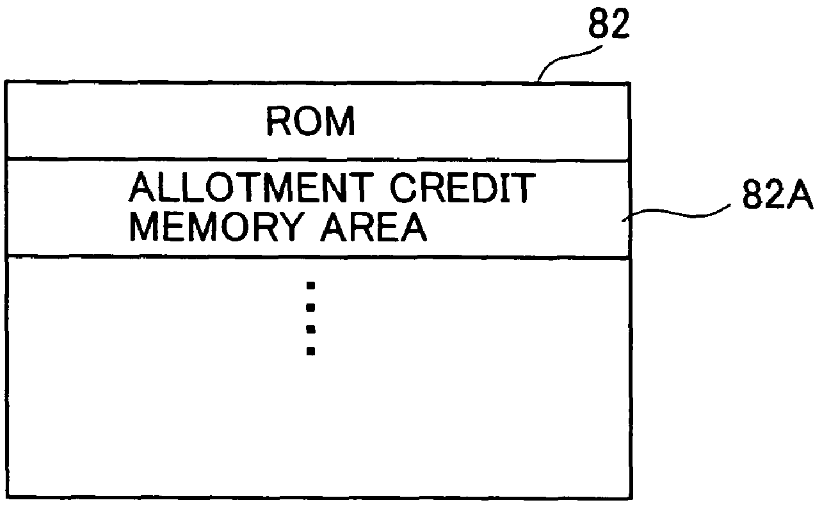
FIG. 9 is a schematic view showing memory areas in a ROM of the roulette game machine according to the first embodiment.

As shown in FIG. 9, in the ROM 82, it is provided a payout credit memory area 82A in which the allotment magnification concerning with the roulette game by use of the BET screen 61 is stored. Here, in the allotment magnification corresponding to each of the BET areas 72 of the BET screen 16 and stored in the payout credit memory area 82A, one of magnifications of "×2"~"×36" is determined beforehand and stored according to the kind of the betting method ("straight bet", "corner bet", "split bet" and the like).

Figure 10:
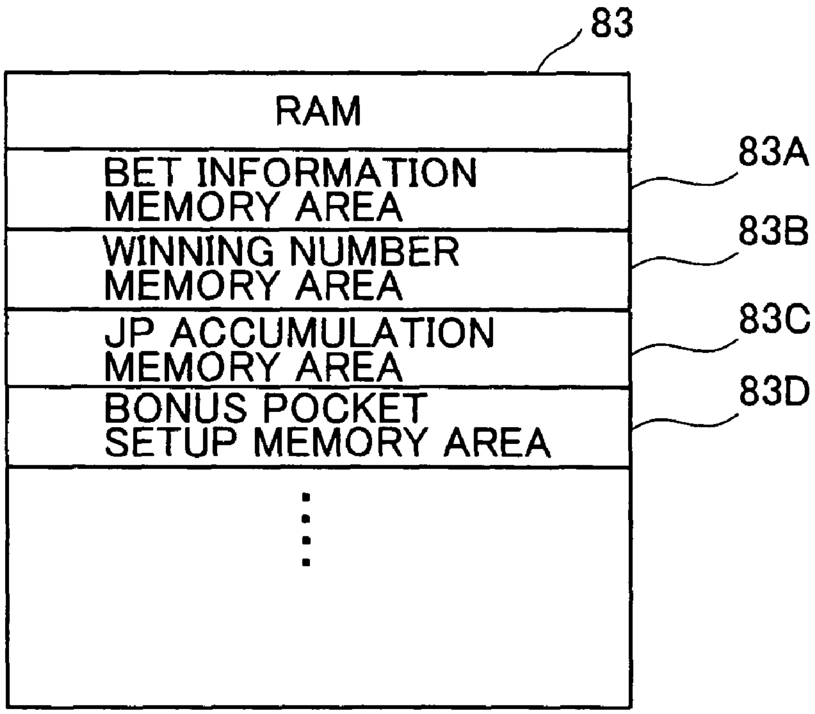
FIG. 10 is a schematic view showing memory areas in a RAM of the roulette game machine according to the first embodiment.

As shown in FIG. 10, in the RAM 83, there are provided a bet information memory area 83A for storing the bet information of the player during the game, a winning number memory area 83B for storing the winning number of the roulette device 3 determined by the winning determination device, a JP accumulation memory area 83C for storing the credit number obtained by accumulatively adding 0.5% of the credit number betted on the BET screen 61 (see FIG. 6) and a bonus pocket setup memory area 83D for storing information to specify the bonus pocket set on the bonus pocket setup screen 42 (see FIG. 5). Here, concretely, the bet information means information concerning with the bet operation conducted by using the station 4, such as the BET area 72 directed on the BET screen 61, the chip number (bet number) betted and the kind of betting method.

Figure 8:
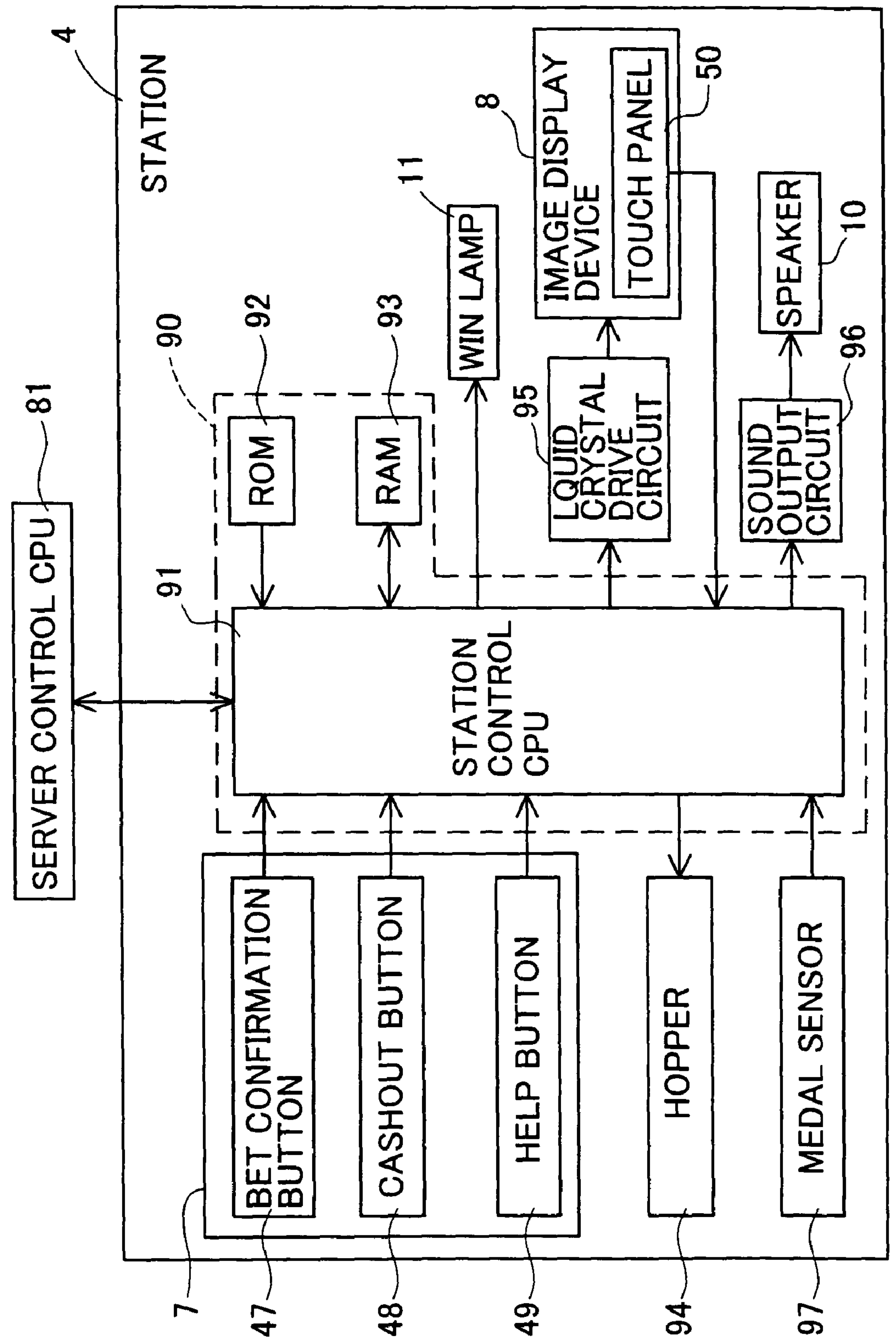
FIG. 8 is a block diagram schematically showing a control system of a station according to the first embodiment.

Next, a control system of the station 4 connected to the server 13 of the first embodiment will be described with reference to FIG. 8. FIG. 8 is a block diagram schematically showing the control system of the station 4 according to the first embodiment. Here, each of 12 stations 4 has basically the same construction, thus explanation will be done according to one station 4.

As shown in FIG. 8, the station 4 is constructed from a station control portion 90 and some circumference devices. The station control portion 90 has a station control CPU 91, a ROM 92 and a RAM 93. The ROM 92 is, for example, constructed from a semi-conductor memory, and there are stored in the ROM 92 programs for realizing basic functions of the station 4 and various programs and data tables required for control of the station 4. The RAM 93 is a memory to temporarily store various data calculated by the station control CPU 9, the credit number (stored in the station 4) held by the player at present and the bet state of chips by the player.

The BET confirmation button 47, the CASHOUT button 48 and the HELP button 49, all of which are provided in the control portion 7 (see FIG. 1), are connected to the station control CPU 91. The station control CPU 91 conducts control to execute various processes corresponding to the buttons based on operation signals output from the buttons. Concretely, based on the input signal supplied from the control portion 7 when the input operation is done by the player and data and programs stored in the ROM 92, RAM 93, the station control CPU 91 conducts various processes. The station control CPU 91 transmits a result thereof to the server control CPU 81 mentioned in the above.

On the other hand, the station control CPU 91 receives the command signal from the server control CPU 81 and controls the circumference devices constructing the station 4, thereby progressing the roulette game in the station 4. The station control CPU 91 conducts various processes according to contents of processes based on the input signal supplied from the control portion 7 when the input operation is done by the player and data and programs stored in the ROM 92, RAM 93. Further, on the basis of a result thereof, the station control CPU 91 controls the circumference devices constructing the station 4, thereby progressing the roulette game in the station 4.

A hopper 94 is connected to the station control CPU 91. This hopper 94 pays out a predetermined number of medals from the medal payout opening 9 (see FIG. 1), based on the command signal output from the station control CPU 91.

Further, to the station control CPU 91, the image display device is connected through a liquid crystal drive circuit 95. Here, the liquid crystal drive circuit 95 is constructed from a program ROM, an image ROM, an image control CPU, a work RAM, a VDP (Video Display Processor) and a video RAM. In the program ROM, there are stored image control programs and various data tables concerning with display on the image display device 8. In the image ROM, for example, dot data to form images displayed on the image display device 8 are stored. The image control CPU determines images displayed on the image display device 8 among dot data stored beforehand in the image ROM, according to the image control program stored beforehand in the program ROM, based on parameters preset by the station control CPU 91. The work RAM is used as a temporary memory when the image control program is executed by the image control CPU. Further, the VDP forms images corresponding to display contents determined by the image control CPU and outputs the images to the image display device 8. Here, the video RAM is constructed as a temporary memory when images are formed by the VDP.

Further, a touch panel 50 is arranged in front of the image display device 8, and operation information of the touch panel 50 is transmitted to the station control CPU 91. By use of the touch panel 50 the bet operation of chips by the player is conducted on the BET screen 61. Concretely, selection of the BET area 72 and operation of the unit BET buttons 66 are conducted on the touch panel 50 and such operation information is transmitted to the station control CPU 91. Based on the operation information, the bet information of the player at present (BET area directed in the BET screen 61 and chip number betted) is voluntarily stored. Further, such bet information is transmitted to the server control CPU 81 and stored in the bet information memory area of the RAM 83.

Further, a sound output circuit 96 and the speaker 10 are connected to the station control CPU 91, and the speaker 10 outputs various effect sounds when various effects are conducted based on the output signal from the sound output circuit 96.

A medal sensor 97 is connected to the station control CPU 91. The medal sensor 97 detects medals inserted from the medal insertion portion 6 (see FIG. 1) and calculates medals inserted and transmits a result thereof to the station control CPU 91. The station control CPU 91 increases the credit number obtained by the player stored in the RAM 93 on the basis of the signal transmitted from the medal sensor 97.

The WIN lamp 11 is connected to the station control CPU 91. The station control CPU 91 repeatedly conducts turning on and off of the WIN lamp 11 when the game state shifts to the special bonus game which occurs based on that the ball 27 enters in the bonus pocket 24, as mentioned later. Thereby, the station 4 in which the WIN lamp 11 is turned on is serially moved in clockwise direction. On the basis of a lottery result in the special bonus game, when a player wins a special bonus game, the operation of turning on of the WIN lamp 11 is stopped while retaining a state that the WIN lamp 11 is turned on in the station 4 in which a player wins. Thereby, a player is notified that the player has won the special bonus game. When winning or JP winning is obtained for chips betted through the BET screen 61, the WIN lamp 11 is turned on in a predetermined color.

Figure 11:
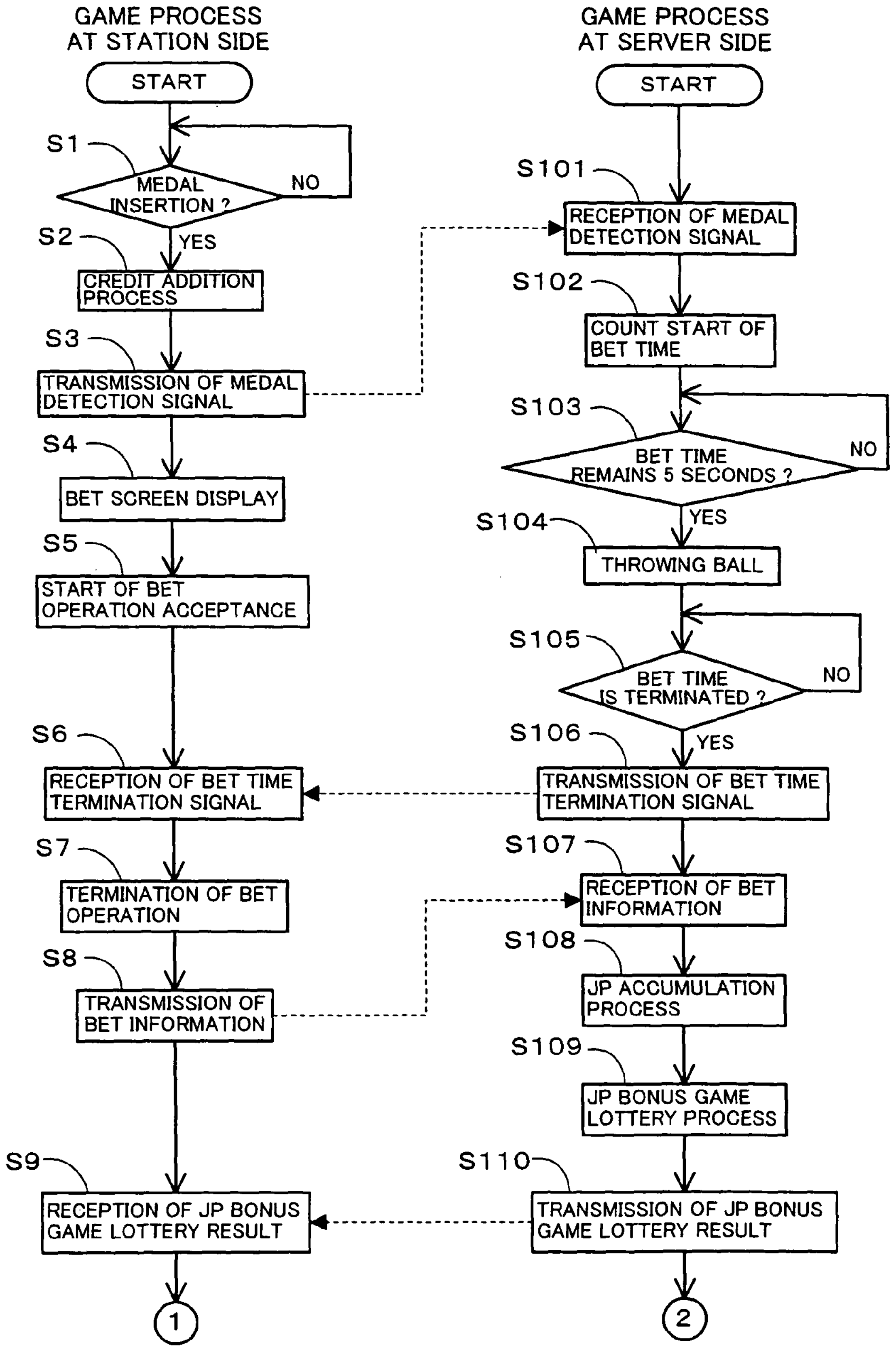
FIG. 11 is a flowchart of a game process program of the roulette game machine according to the first embodiment.
Figure 12:
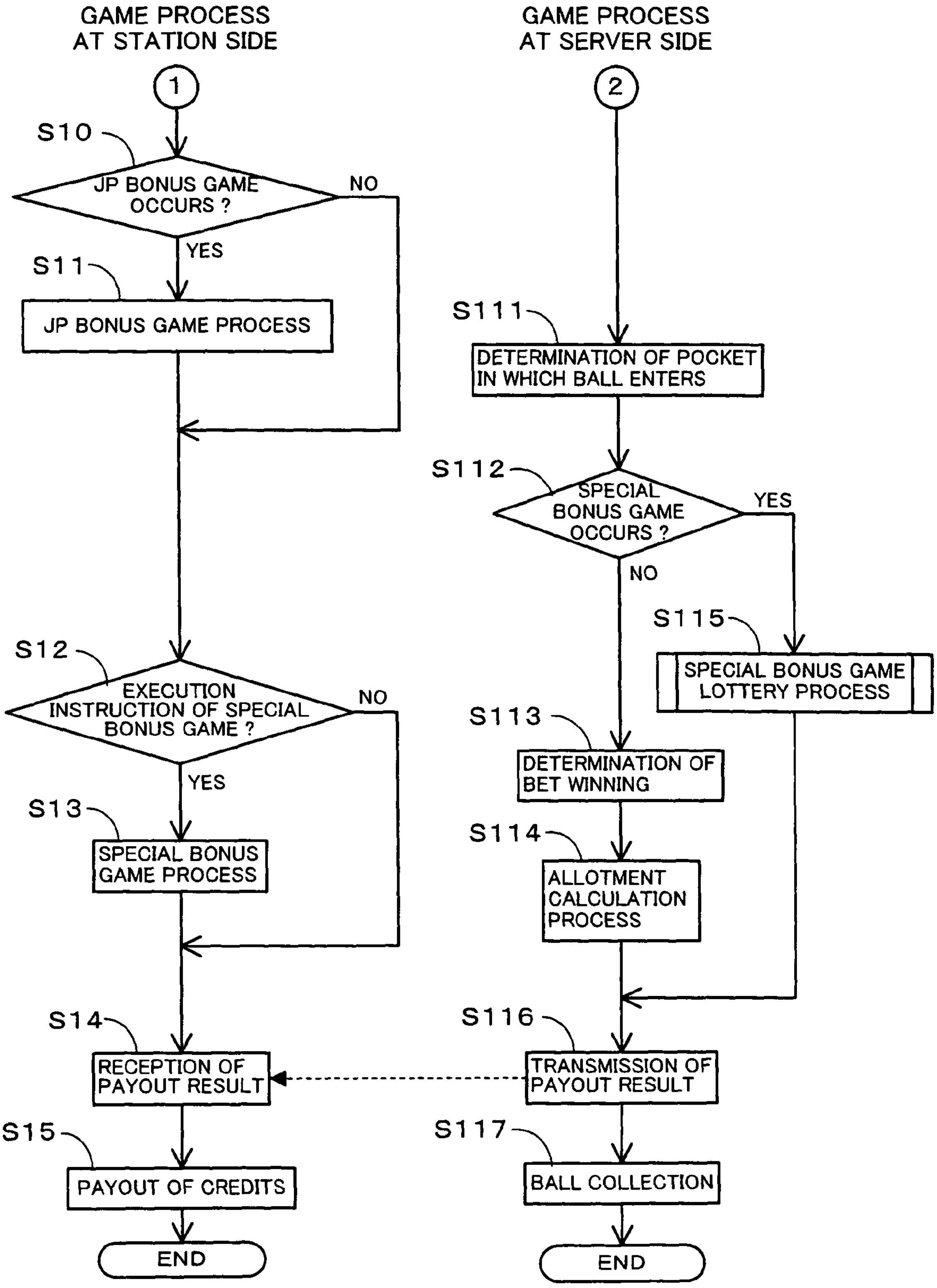
FIG. 12 is a flowchart of a game process program of the roulette game machine according to the first embodiment.

Next, with reference to FIGS. 11 and 12, it will be described a game process program in the server executed by the server control CPU 81 in the roulette game machine 1 according to the first embodiment and a game process program in the station executed by the station control CPU 91 in the station 4. Here, programs shown by the flowcharts of FIGS. 11 and 12 are stored in the ROM 82 and RAM 83 provided in the server 13 and in the ROM 92 and RAM 93 provided in the station 4, and executed by the server control CPU 81 and the station control CPU 91.

At first, with reference to FIGS. 11 and 12, the game process program in the station will be described. In step (abbreviated as "S" hereinafter) 1, it is determined by the station control CPU 91 whether or not medals or coins are inserted by the player, based on the detection signal output from the medal sensor 97. It it is determined that medals or coins are not inserted (S1: NO), procedure waits until medals or coins are inserted. On the other hand, if it is determined that medals or coins are inserted (S1: YES), procedure shifts to S2.

In S2, credit data of sum corresponding to the inserted number are stored in the RAM 93. Next, in S3, a medal insertion signal is transmitted to the server instructing that medals or coins are inserted.

In S4, the BET screen 61 shown in FIG. 6 is displayed on the image display device 8 of the station 4 and the bet time during which the player can bet chips is started to count (S5). During the bet time that the bet operation can be accepted, the player participating in the game can bet chips to the BET area 72, concerning with the number which the player predicts (see FIG. 6). Here, since the concrete betting method by using the BET screen 61 is already explained, thus explanation will be omitted.

The player can participate in the game that the bet time is started to count even after the game is started, and 12 players at maximum can play the game in the roulette game machine 1 according to the first embodiment. Further, if the present game is conducted continuously to the previous game, acceptance of the bet operation is started right after the previous game is terminated.

In S6, if a bet time termination signal, instructing that the bet time is terminated, is received from the server control CPU 81, the image indicating that the bet time is terminated is displayed on the image display device 8 of the station 4. Thereby, acceptance of the bet operation by the touch panel 50 is terminated (S7). Thereafter, the bet information (directed BET area 72 and chip number (bet number) betted to the directed BET area 72) occurring on the basis of operation by the player is transmitted (S8).

In S9, a lottery result in the JP bonus game lottery process (S109, mentioned later) executed by the server control CPU 81 is received from the server 13. Here, the lottery result of the JP bonus game includes a lottery result concerning with whether or not the predetermined JP bonus game occurs in each of the stations 4 and a lottery result concerning with that the JP winning occurs in which station 4 among 12 stations 4 (or the JP winning is lost in all stations 4) in a case that the JP bonus game occurs.

Next, in S10 of FIG. 12, the station control CPU 91 determined whether or not the JP bonus game occurs based on the lottery result obtained in the JP bonus game lottery process received in S9. If it is determined that the JP bonus game does not occur in the station 4 (S10: NO), procedure shifts to S12.

On the other hand, if it is determined that the JP bonus game occurs in the station 4 (S10: YES), a predetermined bonus game with selection type concerning with obtainment of the JP is executed in S11. A game result thereof (whether or not the JP has been obtained) is displayed on the image display device 8 based on the lottery result received in S9.

Next, in S12, it is determined whether or not the execution instruction of the special bonus game is transmitted from the server control CPU 81. Here, as for the special bonus game, in a case that the ball 27 enters in the bonus pocket 24 in the lottery of winning number conducted through the roulette device 3, it is determined that the special bonus game is executed by the server control CPU 81, thereby execution thereof is instructed to the station control CPU 91 (S123). However, since the special bonus game is not executed in the station 4 that the bet number does not reach to 10 bets (10 credits) in the present game, instruction of the special bonus game is not done.

Figure 14:
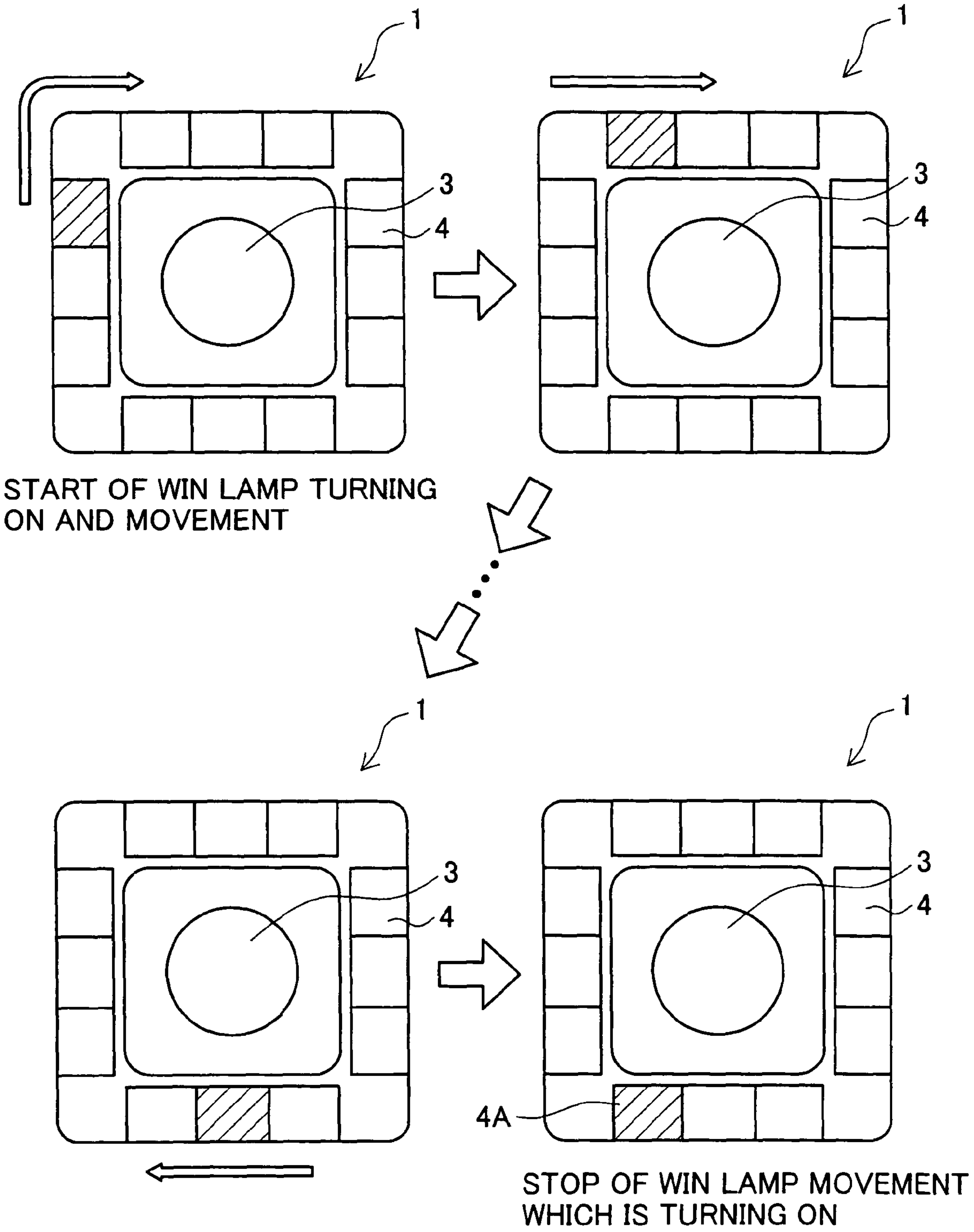
FIG. 14 is a schematic view showing a turning on state of a WIN lamp when the special bonus game is executed in the roulette game machine according to the first embodiment.

If it is determined that the execution instruction of the special bonus game is conducted (S12: YES), the special bonus game process is conducted in S13. In the special bonus game process, the WIN lamp 11 is turned on and off with a predetermined time interval and only the WIN lamp 11 of the station 4 in which winning of the special bonus game is obtained based on the lottery result by the server control CPU 81 is finally turned on. Here, FIG. 14 is a schematic view showing a state that the WIN lamp 11 is turned on in the special bonus game. As shown in FIG. 14, in the special bonus game, at first, the WIN lamp 11 in a predetermined station 4 is turned on and turned off after a predetermined time (for example, 1 second) elapses. Next, the WIN lamp 11 of the station 4 positioned at the left adjacent position is turned on and is similarly turned off after the predetermined time elapses. Hereinafter, similar to the above, turning on and off are repeated. Thereby, the station 4 with the WIN lamp 11 turning on moves in clockwise direction. However, since the special bonus game is not executed in the station 4 that the bet number does not reach to 10 bets (10 credits) in the present game, the WIN lamp 11 is not turned on.

Based on the lottery result by the server control CPU 81 after a predetermined time elapses, the effect is stopped in a state that the WIN lamp 11 in the station 4 that the special bonus game is won is turned on. Thereby, it can be notified that the station 4, in which the WIN lamp 11 finally is turned on, is the station 4 in which the special bonus game is won.

On the other hand, if the execution instruction of the special bonus game is not conducted (S12: NO), procedure shifts to S14.

In S14, the payout result of credits transmitted from the server control CPU 81 is received. Here, the payout result of credits is constructed from the payout result in the base game conducted by using the BET screen 61, the payout result of JP conducted in the JP bonus game and the payout result in the special bonus game.

Thereafter, in S15, based on the payout result received in S14, the credits are paid out. Payout credit data of the base roulette game, the JP sum accumulated credit data, if the JP bonus game occurs and such station 4 wins the JP, and the credit data of the sum corresponding to all credit numbers betted in all of the stations 4 in the present game if the station 4 wins in the special bonus game occurring based on that the ball 27 enters in the bonus pocket 24 are stored in the RAM 93. After the CASHOUT button 48 is pressed, medals (generally one medal corresponds to one bet) corresponding to the credit number stored in the RAM 93 at present are paid out from the medal payout opening 9.

Thereafter, in a case that the game is continued in any of the stations 4, procedure returns to S4, thereby the bet time is again started and procedure shifts to the next game.

On the other hand, if the game is terminated in all of the stations 4, the roulette game is terminated.

Next, with reference to FIGS. 11 and 12, the game process program conducted in the server side will be described. In S101, the server control CPU 81 receives the medal detection signal transmitted from the station control CPU 91 in S3 and determines whether medals or coins are inserted by the player. In the roulette game machine 1 according to the first embodiment, when medals or coins are inserted in any of the stations 4, the medal insertion signal is transmitted to the server control CPU 81 from the station control CPU 91 of the station 4 in which medals or coins are inserted.

From the time that the player first participating in the game inserts medals or coins, the bet time during which the bet operation by the player can be accepted is started to count (S102). Here, if the present game is conducted continuously to the previous game, the bet time is started to count right after the previous game is terminated. The player participating in the game can bet chips to the BET area 72 concerning with the number predicted by the player by operating the touch panel 50 during the bet time.

Next, in S103, it is determined whether or not remaining bet time becomes 5 seconds. Here, the remaining bet time is also displayed in the bet time display portion 69 of the image display device 8 (see FIG. 6). If it is determined that the remaining bet time does not reach to 5 seconds (S103: NO), procedure continuously waits until the remaining bet time becomes 5 seconds. On the other hand, if it is determined that the remaining bet time becomes 5 seconds (S103: YES), the lottery process by the roulette device 3 is executed according to the game execution program.

Concretely, at first, the ball throwing device is driven and the ball 27 is thrown in the roulette wheel (S104). Further, the drive motor is driven, thereby the wheel 22 is rotated at a predetermined speed in the reverse direction against the throwing direction of the ball 27. The ball 27 thrown rolls on the wheel 22 along the guide wall 29, thereafter when rotation speed becomes weak and centrifugal force disappears, the ball 27 rolls down on the inclined surface and moves toward the inner side, thereby reaches to the wheel 22 rotating (see FIG. 2).

The ball 27 rolled down on the wheel 22 further passes over the number display plates 25 or the bonus display plate 26 positioned at the outer side of the wheel 22 and enters in any of the number pockets 23 or the bonus pocket 24. The number (in FIG. 2, any of “0”, “1”~“36”) printed on the number display plate 25 corresponding to the number pocket 23 in which the ball 27 enters becomes the winning number. On the other hand, if the ball 27 enters in the bonus pocket 24, the special bonus game occurs. Here, determination of the winning number or occurrence of the special bonus game is conducted in S111 mentioned later.

In S105, it is determined whether or not the bet time is terminated. If it is determined that the bet time is not terminated (S105: NO), procedure waits until the bet time is terminated. On the other hand, if it is determined that the bet time is terminated (S105: YES), in S106 a bet time termination signal is transmitted to the station control CPU 91 to instruct that the bet time is terminated.

Next, in S107, the bet information (bet area 72 directed, the number (bet number) of chips betted to the directed bet area 72 and betting method) input by the player in each of the stations 4 is received and stored in the bet information memory area 83A of the RAM 83.

Thereafter, in S108, the credits corresponding to 0.5% of total credits betted in each of the stations 4 from which the bet information is received in S107 is accumulatively added to the JP sum stored in the JP accumulation memory area 83C of the RAM 83. According to this, display of the JP sum display portion 15 and the JP display portion 73 is renewed.

Next, in S109, the server control CPU 81 obtains a random number from a random number sampling circuit, and based on the random number a lottery is conduted to determine whether or not the JP bonus game occurs and which of the stations 4 wins the JP bonus game (or the JP is lost in all of the stations 4).

Next, in S110, based on the lottery process in S109, the lottery result of the JP bonus game every each station 4 is transmitted to each of the stations 4.

In S111, the server control CPU 81 drives the winning determination device after the ball 27 enters in the number pocket 23 or the bonus pocket 24, and determines that the ball 27 enters in which of the number pockets 23, or whether the ball 27 enters in the bonus pocket 24.

Further, in S112, based on the kind of the pocket, in which the ball 27 enters, determined S111, it is determined whether or not the special bonus game occurs, that is, whether or not the ball 27 enters in the bonus pocket 24. As a result, if it is determined that the special bonus game does not occur (S112: NO), that is, that the ball 27 enters in any of the number pockets 23, it is determined whether or not winning is obtained for chips betted in each station 4 based on the bet information of each station 4 received in S107 and the kind of the pocket determined in S111 (S113).

Next, the server control CPU 81 executes the allotment calculation process (S114). In the allotment calculation process, chips betted to the winning number are recognized in every each station 4 and a total allotment sum of credits paid out to each station 4 is calculated, by using the allotment magnification (credit number paid out per one chip (1 bet)) for each bet area 72 and stored in the payout credit memory area 82A of the ROM 82.

Figure 13:
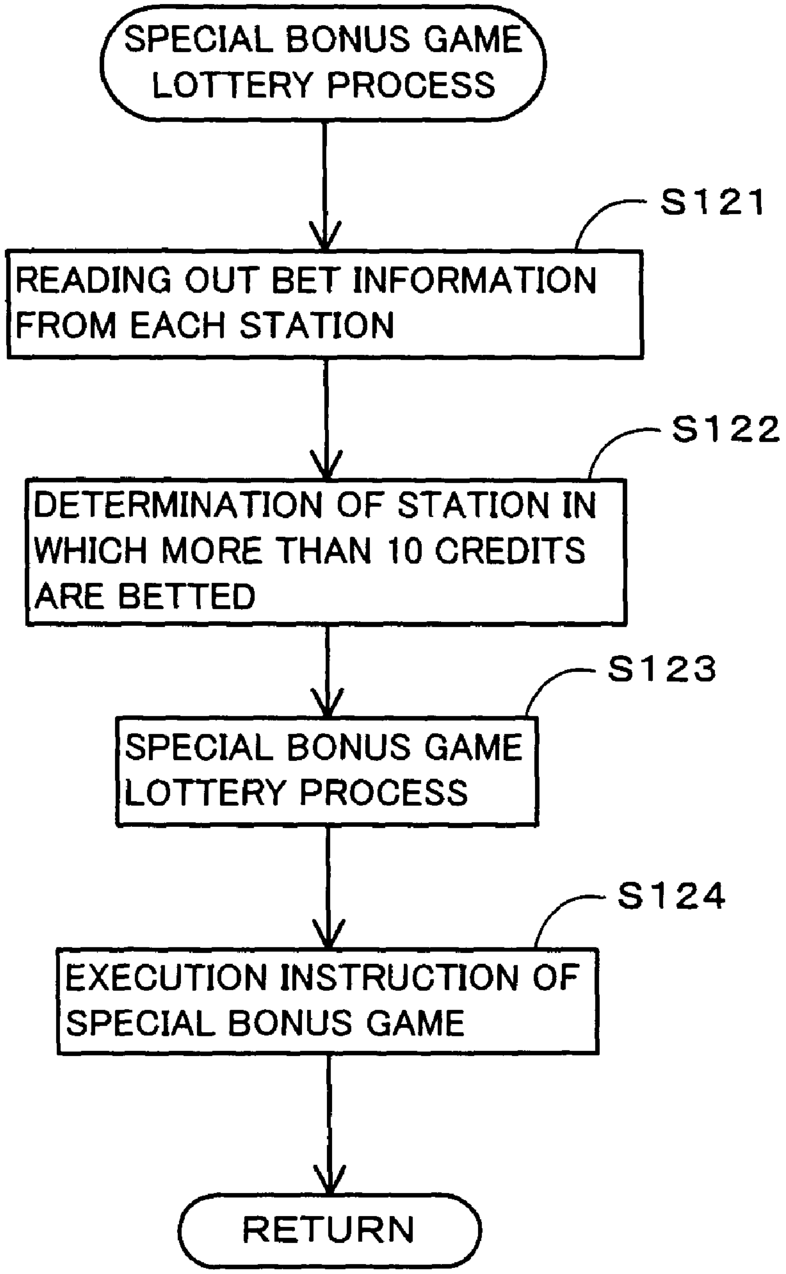
FIG. 13 is a flowchart of sub-process program of a special bonus game lottery process conducted in the roulette game machine according to the first embodiment.

On the other hand, if it is determined that the special bonus game occurs (S112: YES), that is, it is determined that the ball 27 enters in the bonus pocket 24, the special bonus lottery process shown in FIG. 13 is conducted. Here, in the special bonus game lottery process, as mentioned later, one station in which the bonus game is won is selected among the stations 4 to which more than 10 credits are betted.

In S116, the server control CPU 81 conducts the transmission process of the payout result of credits in the roulette game based on the allotment calculation process in S114, the payout result of JP based on winning determination of the JP bonus game in S109 and the payout result of credits based on winning determination of the special bonus game in S115. Concretely, credit data corresponding to the allotment sum of the base game are output to the station control CPU 91 of the station 4 in which winning is obtained in the base game, and if the JP is won, credit data corresponding to the JP sum accumulated at present are further output to the station control CPU 91, and if the special bonus game is won, credit data corresponding to the credit number betted in each station 4 in the present game are output to the station control CPU 91.

Thereafter, in S117, the ball collection device arranged under the wheel 22 is driven, thereby the ball 27 on the wheel 22 is collected. The collected ball 27 is again thrown in the wheel 22 of the roulette device 3 in the following game.

Next, a sub-process of the "special bonus game lottery process" in S115 will be described. FIG. 13 is a sub-flowchart showing the sub-process of the "special bonus lottery process" executed by the server control CPU 81 of the roulette game machine 1 according to the first embodiment.

At first, in S121, the server control CPU 81 again reads out the bet information received in S107. Based on the bet information read out, it is determined whether or not game media more than 10 credits are betted to each station 4 in the present game, and the stations 4 to which more than 10 credits are betted are specified among all 12 stations 4 (S122).

Next, in S123, by using the random number sampled through the random number sampling circuit, the special bonus lottery process is conducted to select one station 4 among the stations which are determined that more than 10 credits are betted in S122.

Thereafter, the instruction to execute the special bonus game is transmitted to each station 4, which is determined that more than 10 credits are betted. The station 4 receiving the instruction to execute the special bonus game executes the special bonus game while turning on the WIN lamp 11 as mentioned in the above.

As mentioned in detail, in the roulette game machine 1 according to the first embodiment, based on the lottery result of the winning number obtained by using the roulette device 3, in a case that the ball 27 especially enters in the bonus pocket 24 among the pockets formed on the wheel 22, the special bonus game using the WIN lamp 11 occurs and all credits betted in each station 4 in the present game are paid out (S15) to one station 4 which is determined that winning is obtained by the lottery (S123) by the server control CPU 81. Here, the bonus pocket 24 can be voluntarily set on the wheel 22 by using the bonus pocket setup screen 42, therefore the bonus pocket 24 for conducting the payout beneficial for the player can be provided on the wheel 22 without changing construction of the wheel 22. In a case that the ball 27 enters in the bonus pocket 24, all credits betted in the present game are paid out to one station 4 selected on the basis of the special bonus game, therefore the payout rate can be increased supposed that the payout rate in whole roulette game machine 1 in the present game is set to 100%. Further, by providing the bonus pocket 24, a new game can be provided using the bonus pocket 24 in the normal roulette game machine 1 in which the player predicts the winning number, thus games can be variegated.

Even if the ball 27 enters in the bonus pocket 24 and the special bonus game occurs according to the lottery result, the special bonus game does not occur if the bet number in the roulette game as the base game is not more than 10 bets (10 credits). Therefore, there is not fear that the bonus game occurs in the station 4 that the player does not play the game and game motivation can be raised by making the player bet more chips in the roulette game.

Here, in the first embodiment, although the payout is not conducted in the bonus game if the bet number is less than a predetermined bet number, only the effect to rotation the WIN lamp 11 may be done.

Further, by changing the position or number of the bonus pocket 24 on the wheel 22 on the bonus pocket setup screen 42, the payout rate can be more concretely controlled.

Second Embodiment

Figure 15:
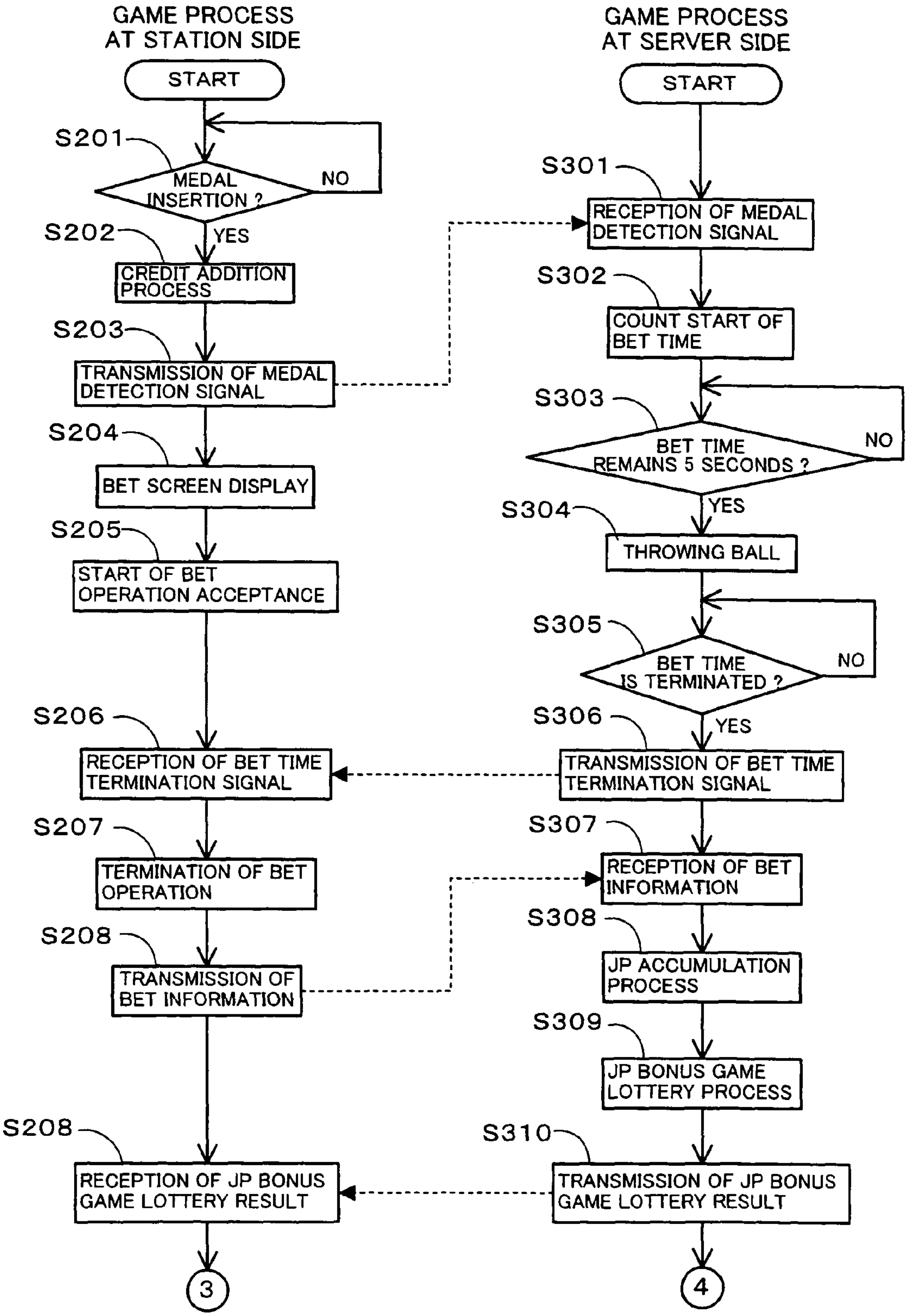
FIG. 15 is a flowchart of game process program executed in the roulette game machine according to the second embodiment.
Figure 16:
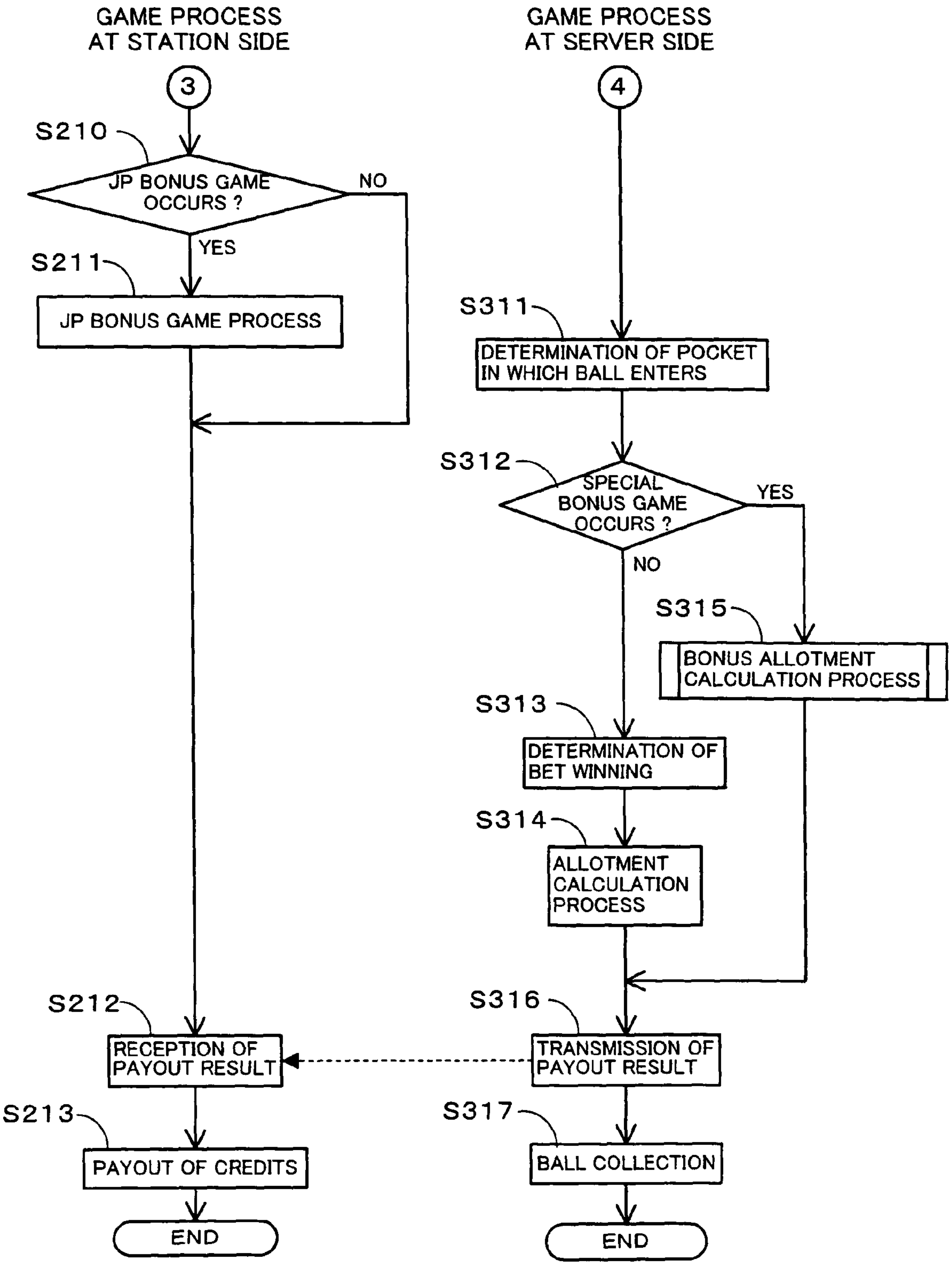
FIG. 16 is a flowchart of game process program executed in the roulette game machine according to the second embodiment.
Figure 17:
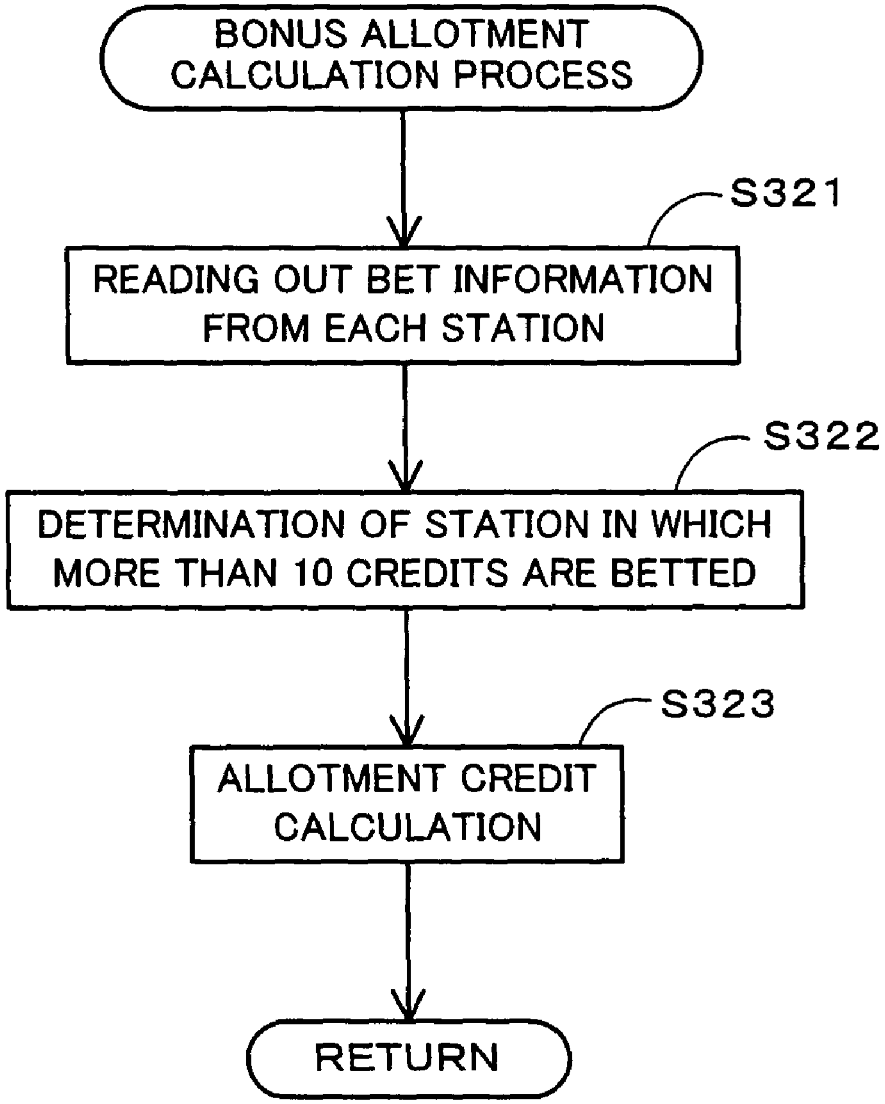
FIG. 17 is a flowchart of sub-process program of bonus allotment calculation process executed in the roulette game machine according to the second embodiment.

Next, the roulette game machine according to the second embodiment will be described with reference to FIGS. 15 to 17. Here, in explanation hereinafter, the roulette game machine of the second embodiment has the same construction as that of the first embodiment described based on FIGS. 1 to 14, therefore the same number used in the second embodiment indicates the same constructive element in the roulette game machine 1 of the first embodiment.

An outline construction of the second embodiment is almost same as that of the roulette game machine 1 of the first embodiment. Various processes in the second embodiment are almost as same as those in the roulette game machine 1 of the first embodiment.

However, although in the roulette game machine 1 of the first embodiment when the ball 27 enters in the bonus pocket 24 the special bonus game occurs and all credits betted in each station 4 in the present game are paid out to one station 4 in which winning is obtained according to the lottery result by the server 13, the roulette game machine of the second embodiment differs from the roulette game machine of the first embodiment at the following point. That is to say, in the roulette game machine of the second embodiment, when the ball 27 enters in the bonus pocket 24, all credits betted in each station 4 in the present game are equally divided and paid out to all stations 4 to each of which more than 10 credits are betted in the present game.

Hereinafter, in the roulette game machine according to the second embodiment, the game process program executed at the server side by the server control CPU 81 and the game process program executed at the station side by the station control CPU 91 will be described with reference to FIGS. 15 and 16. Here, the programs indicated by flowcharts shown in FIGS. 15 and 16 are stored in the ROM 82 and the RAM 83 provided in the server 13 and in the ROM 92 and the RAM 93 provided in the station 4. Such programs are executed by the server control CPU 81 and the station control CPU 91.

At first, with reference to FIGS. 15 and 16, the game process program at the station side will be described. Here, processes of S201 to S211 are as same as the processes of S1 to S11 in the game process program (see FIGS. 11 and 12) at the station side of the first embodiment, therefore explanation thereof will be omitted.

In S212, the station control CPU 91 receives the payout result of credits transmitted from the server control CPU 81. Here, the payout result of credits is constructed from the payout result in the normal roulette game conducted by using the BET screen 61, the payout result of JP in the JP bonus game and the payout result of bonus allotment based on that the ball 27 enters in the bonus pocket 24.

Thereafter, in S213, based on the payout result received in S212, the payout of credits is conducted. Concretely, the credit data of allotment of the roulette game, which is the base game, the credit data of JP sum accumulated by present if the JP bonus game occurs and such station 4 wins the JP, and the credit data of sum obtained by equally dividing all credit numbers betted in all stations 4 in the present game by the number of station 4 corresponding thereto if the ball 27 enters in the bonus pocket 24 and more than 10 credits are betted in the present game, are stored in the RAM 93. After the CASH-OUT button 48 is pressed, medals (generally one medal corresponds to one bet) corresponding to the credit number stored in the RAM 93 at present are paid out from the medal payout opening 9.

Thereafter, in a case that the game is continued in any of the stations 4, procedure returns to S204, thereby the bet time is again started and procedure shifts to the next game.

On the other hand, if the game is terminated in all of the stations 4, the roulette game is terminated.

Next, with reference to FIGS. 15 and 16, the game process program conducted at the server side will be described. Here, the processes of S301 to S311 are as same as the processes of S101 to S111 in the game process program (see FIGS. 11 and 12) at the station side of the first embodiment, therefore explanation thereof will be omitted.

Further, in S312, based on the kind of the pocket in which the ball 27 enters determined in S311, it is determined whether or not the ball 27 enters in the bonus pocket 24. As a result, if it is determined that the ball 27 does not enter in the bonus pocket 24 (S312: NO), that is, if it is determined that the ball 27 enters in any of the number pockets 23, it is determined whether or not winning is obtained for chips betted in each station 4 based on the bet information of each station 4 received in S307 and the kind of the pocket determined in S311 (S313).

Next, the server control CPU 81 executes the allotment calculation process (S314). In the allotment calculation process, chips betted to the winning number are recognized in every each station 4 and total allotment sum of credits paid out to each station 4 is calculated, by using the payout magnification (credit number paid out per one chip (1 bet)) for each bet area 72 and stored in the allotment credit memory area 82A of the ROM 82.

On the other hand, if it is determined that the ball 27 enters in the bonus pocket 24 (S312: YES), the bonus allotment calculation process shown in FIG. 17 is conducted. Here, in the bonus allotment calculation process, as mentioned later, the credit number paid out to the station 4 is calculated based on the number of the station 4 to each of which more than 10 credits are betted and the credit number betted in the present game.

In S316, the server control CPU 81 conducts the transmission process of the payout result of credits in the roulette game based on the allotment calculation process in S314, the payout result of JP based on winning determination of the JP bonus game in S309 and the payout result of credits based on the bonus allotment calculation process in S315. Concretely, credit data corresponding to the allotment sum of the base game are output to the station control CPU 91 of the station 4 in which winning is obtained in the base game, and if the JP is won, credit data corresponding to the JP sum accumulated at present are further output to the station control CPU 91, and if the ball 27 enters in the bonus pocket 24, credit data corresponding to the bonus allotment sum calculated in S315 are output to the station control CPU 91.

Thereafter, in S317, the ball collection device arranged under the wheel 22 is driven, thereby the ball 27 on the wheel 22 is collected. The collected ball 27 is again thrown in the wheel 22 of the roulette device 3 in the following game.

Next, a sub-process of the “bonus allotment calculation process” in S315 will be described. FIG. 17 is a sub-flowchart showing the sub-process of the “bonus allotment calculation process” executed by the server control CPU 81 of the roulette game machine according to the second embodiment.

At first, in S321, the server control CPU 81 again reads out the bet information received in S307. Based on the bet information read out, it is determined whether or not more than 10 credits are betted to each station 4 in the present game, and the stations 4 to which more than 10 credits are betted are specified among all 12 stations 4.

Next, in S323, by dividing all credit numbers betted to each station 4 in the present game by the number of the station 4 to which more than 10 credits are betted, the credit number of the bonus allotment paid out per one station 4 is calculated. Thereafter, the credit number corresponding to the bonus allotment calculated in S323 is paid out to each station 4 which is determined that more than 10 credits are betted.

As mentioned in detail, in the roulette game machine 1 according to the second embodiment, based on the lottery result of the winning number by using the roulette device 3, in a case that the ball 27 especially enters in the bonus pocket 24 among the pockets formed on the wheel 22, the credit obtained by equally dividing all credits betted in all 12 stations 4 in the present game is paid to the station 4 which is determined that more than 10 credits are betted in the present game (S123). Here, the bonus pocket 24 can be voluntarily set on the wheel 22 by using the bonus pocket setup screen 42, therefore the bonus pocket 24 for conducting the payout beneficial for the player can be voluntarily provided on the wheel 22 without changing construction of the wheel 22. In a case that the ball 27 enters in the bonus pocket 24, all credits betted in the present game are finally paid out, therefore the payout rate can be increased supposed that the payout rate in whole roulette game machine 1 in the present game is set to 100%. Further, by providing the bonus pocket 24, a new game can be provided using the bonus pocket 24 in the normal roulette game machine 1 in which the player predicts the winning number, thus games can be variegated.

Even if the ball 27 enters in the bonus pocket 24, the payout of credits corresponding to the bonus allotment is not paid out in the station corresponding thereto if the bet number in the roulette game as the base game is not more than 10 bets (10 credits). Therefore, there is not fear that the bonus game occurs in the station 4 that the player does not play the game and game motivation can be raised by making the player bet more chips in the roulette game.

Further, by changing the position or number of the bonus pocket 24 on the wheel 22 on the bonus pocket setup screen 42, the payout rate can be more concretely changed.

Third Embodiment

Figure 18:
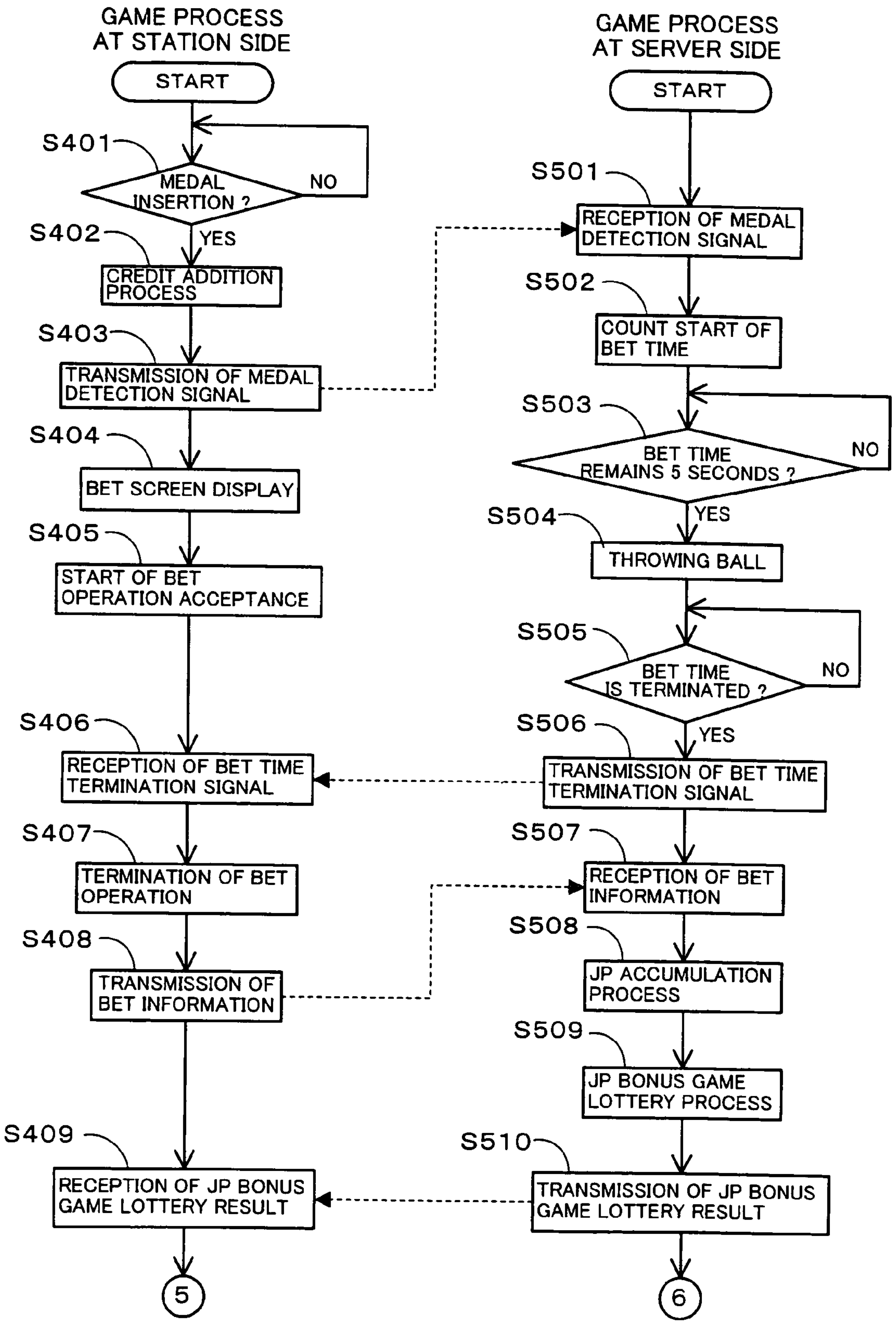
FIG. 18 is a flowchart of game process program executed in the roulette game machine according to the third embodiment.
Figure 19:
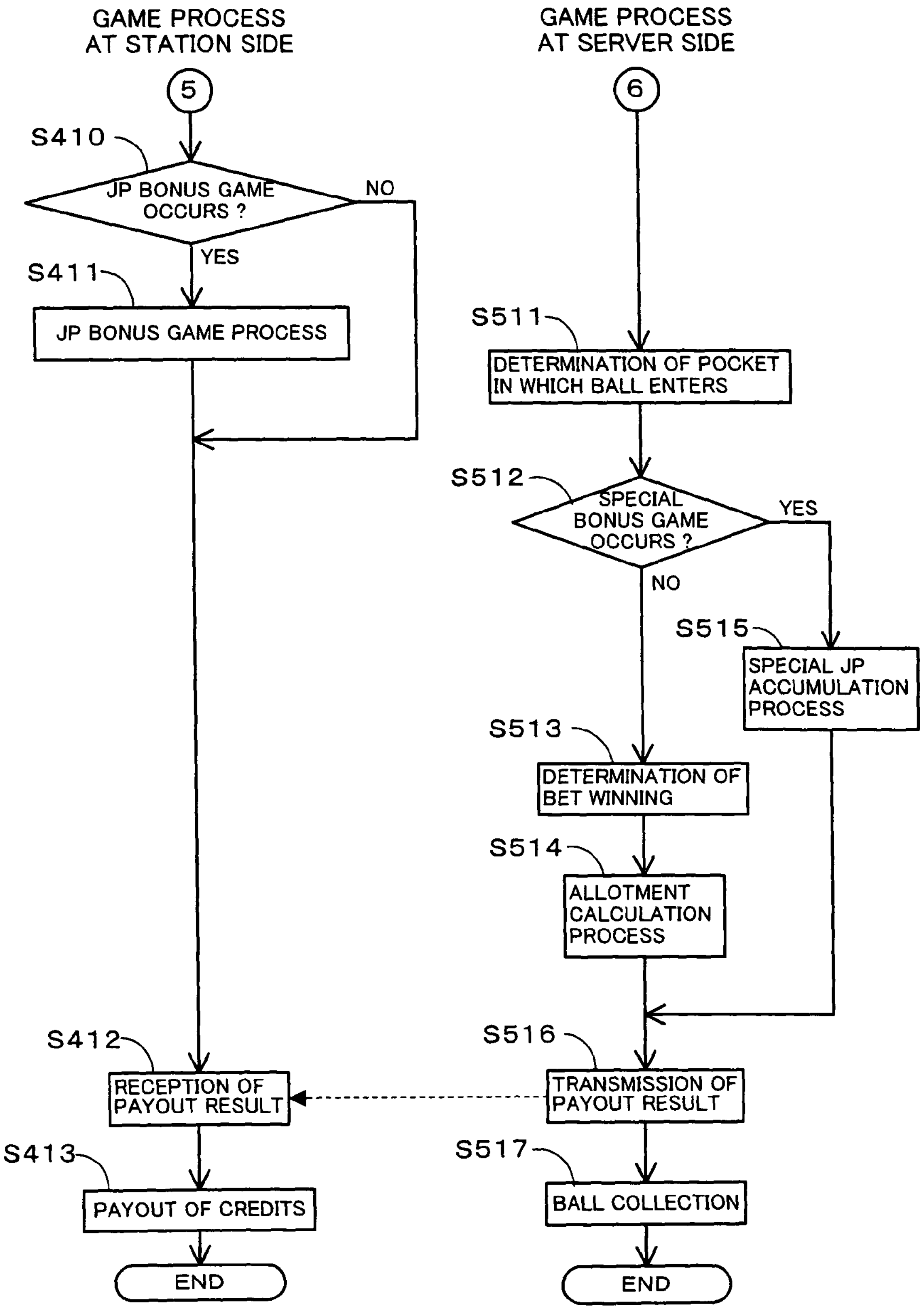
FIG. 19 is a flowchart of game process program executed in the roulette game machine according to the third embodiment.

Next, the roulette game machine according to the third embodiment will be described with reference to FIGS. 18 to 19. Here, in explanation hereinafter, the roulette game machine of the third embodiment has the same construction as that of the first embodiment described based on FIGS. 1 to 14, therefore the same number used in the third embodiment indicates the same constructive element in the roulette game machine 1 of the first embodiment.

An outline construction of the third embodiment is almost as same as that of the roulette game machine 1 of the first embodiment. Various processes in the third embodiment are substantially similar to those in the roulette game machine 1 of the first embodiment.

However, although in the roulette game machine 1 of the first embodiment when the ball 27 enters in the bonus pocket 24 the special bonus game occurs and all credits betted in each station 4 in the present game are paid out to one station 4 in which winning is obtained according to the lottery result by the server 13, the roulette game machine of the third embodiment differs from the roulette game machine of the first embodiment at the following point. That is to say, in the roulette game machine of the third embodiment, when the ball 27 enters in the bonus pocket 24, all credits betted in each station 4 in the present game are accumulated in the JP.

Hereinafter, in the roulette game machine according to the third embodiment, the game process program executed at the server side by the server control CPU 81 and the game process program executed at the station side by the station control CPU 91 will be described with reference to FIGS. 18 and 19. Here, the programs indicated by flowcharts shown in FIGS. 18 and 19 are stored in the ROM 82 and the RAM 83 provided in the server 13 and in the ROM 92 and the RAM 93 provided in the station 4. Such programs are executed by the server control CPU 81 and the station control CPU 91.

At first, with reference to FIGS. 18 and 19, the game process program at the station side will be described. Here, processes of S401 to S411 are as same as the processes of S1 to S11 in the game process program (see FIGS. 11 and 12) at the station side of the first embodiment, therefore explanation thereof will be omitted.

In S412, the station control CPU 91 receives the payout result of credits transmitted from the server control CPU 81. Here, the payout result of credits is constructed from the payout result in the normal roulette game conducted by using the BET screen 61 and the payout result of JP in the JP bonus game.

Thereafter, in S413, based on the payout result received in S412, the payout of credits is conducted. Concretely, the credit data of allotment of the roulette game, which is the base game, and the credit data of JP sum accumulated by present if the JP bonus game occurs and such station 4 wins the JP are stored in the RAM 93. After the CASHOUT button 48 is pressed, medals (generally one medal corresponds to one bet) corresponding to the credit number stored in the RAM 93 at present are paid out from the medal payout opening 9.

Thereafter, in a case that the game is continued in any of the stations 4, procedure returns to S404, thereby the bet time is again started and procedure shifts to the next game.

On the other hand, if the game is terminated in all of the stations 4, the roulette game is terminated.

Next, with reference to FIGS. 18 and 19, the game process program conducted at the server side will be described. Here, the processes of S501 to S511 are as same as the processes of S101 to S111 in the game process program (see FIGS. 11 and 12) at the station side of the first embodiment, therefore explanation thereof will be omitted.

Further, in S512, based on the kind of the pocket in which the ball 27 enters determined in S511, it is determined whether or not the ball 27 enters in the bonus pocket 24. As a result, if it is determined that the ball 27 does not enter in the bonus pocket 24 (S512: NO), that is, if it is determined that the ball 27 enters in any of the number pockets 23, it is determined whether or not winning is obtained for chips betted in each station 4 based on the bet information of each station 4 received in S507 and the kind of the pocket determined in S511 (S513).

Next, the server control CPU 81 executes the allotment calculation process (S514). In the allotment calculation process, chips betted to the winning number are recognized every each station 4 and total allotment sum of payout of credits paid out to each station 4 is calculated, by using the payout magnification (credit number paid out per one chip (1 bet)) for each bet area 72 and stored in the allotment credit memory area 82A of the ROM 82.

On the other hand, if it is determined that the ball 27 enters in the bonus pocket 24 (S512: YES), the special accumulation process of JP is conducted. In the JP accumulation process, the credit number betted in the present game in each of 12 stations 4 is accumulatively added to the JP sum stored in the JP accumulation memory area 83C of the RAM 83. Therefore, although only 0.5% of the credits are generally added among the credits betted in the stations 4, 100% of the credits are added if the ball 27 enters in the bonus pocket 24.

In S516, the server control CPU 81 conducts the transmission process of the payout result of credits in the roulette game based on the payout calculation process in S514 and the payout result of JP based on winning determination of the JP bonus game in S509. Concretely, credit data corresponding to the payout sum of the base game are output to the station control CPU 91 of the station 4 in which winning is obtained in the base game, and if the JP is won, credit data corresponding to the JP sum accumulated at present are further output to the station control CPU 91.

Thereafter, in S517, the ball collection device arranged under the wheel 22 is driven, thereby the ball 27 on the wheel 22 is collected. The collected ball 27 is again thrown in the wheel 22 of the roulette device 3 in the following game.

As mentioned in detail, in the roulette game machine 1 according to the third embodiment, based on the lottery result of the winning number by using the roulette device 3, in a case that the ball 27 especially enters in the bonus pocket 24 among the pockets formed on the wheel 22, all credits betted in all 12 stations 4 in the present game are added to the JP sum (S515). Here, the bonus pocket 24 can be voluntarily set on the wheel 22 by using the bonus pocket setup screen 42, therefore the bonus pocket 24 for conducting the payout beneficial for the player can be voluntarily provided on the wheel 22 without changing construction of the wheel 22. In a case that, the ball 27 enters in the bonus pocket 24, all credits betted in the present game are added to the JP, therefore the payout rate can be increased by conducting the payout based on winning of the JP thereafter. Further, by providing the bonus pocket 24, it can be provided a new game using the bonus pocket 24 in the normal roulette game machine 1 in which the player predicts the winning number, thus games can be variegated.

Fourth Embodiment

Next, the roulette game machine according to the fourth embodiment will be described with reference to FIGS. 20 to 21. Here, in explanation hereinafter, the roulette game machine of the fourth embodiment has the same construction as that of the first embodiment described based on FIGS. 1 to 14, therefore the same number used in the fourth embodiment indicates the same constructive element in the roulette game machine 1 of the first embodiment.

An outline construction of the fourth embodiment is almost as same as that of the roulette game machine 1 of the first embodiment. Various processes in the fourth embodiment substantially similar to those in the roulette game machine 1 of the first embodiment.

However, although in the roulette game machine 1 of the first embodiment when the ball 27 enters in the bonus pocket 24 the special bonus game occurs and all credits betted in each station 4 in the present game are paid out to one station 4 in which winning is obtained according to the lottery result by the server 13, the roulette game machine of the fourth embodiment differs from the roulette game machine of the first embodiment at the following point. That is to say, in the roulette game machine of the fourth embodiment, when the ball 27 enters in the bonus pocket 24, all chips betted by the BET screen 61 (see FIG. 6) are handled as winning chips and the allotment corresponding to the betting method (credit number betted and payout magnification) is paid out.

Hereinafter, in the roulette game machine according to the fourth embodiment, the game process program executed at the server side by the server control CPU 81 and the game process program executed at the station side by the station control CPU 91 will be described with reference to FIGS. 20 and 21. Here, the programs indicated by flowcharts shown in FIGS. 20 and 21 are stored in the ROM 82 and the RAM 83 provided in the server 13 and in the ROM 92 and the RAM 93 provided in the station 4. Such programs are executed by the server control CPU 81 and the station control CPU 91.

At first, with reference to FIGS. 20 and 21, the game process program conducted at the station side will be described. In S601, the station control CPU 91 determines whether or not medals or coins are inserted by the player based on the detection signal of the medal sensor 97. If it is determined that medals or coins are not inserted (S601: NO), procedure waits until medals or coins are inserted. On the other hand, if it is determined that medals or coins are inserted (S601: YES), procedure shifts to S602.

In S602, the credit data corresponding to the number of game media inserted are stored in the RAM 93. Next, in S603, it is transmitted to the server 13 the medal insertion signal to instruct that medals or coins are inserted.

In S604, the BET screen 61 shown in FIG. 6 is displayed on the image display device 8 of the station 4, and it is started to count the bet time during which the player can bet chips (S605). The player participating in the game can bet chips to the BET area 72 concerning with the number which the player predicts by operating the touch panel 50 during the bet time that acceptance of bet can be permitted (see FIG. 6). Here, since the concrete betting method by using the BET screen 61 is already explained, thus explanation will be omitted.

The player can participate in the game even after the game is started, and 12 players at maximum can play the game in the roulette game machine 1 according to the fourth embodiment. Further, if the present game is conducted continuously to the previous game, acceptance of the bet operation is started right after the previous game is terminated.

In S606, if it is received from the server control CPU 81 the bet time termination signal instructing that the bet time is terminated, the image indicating that the bet time is terminated is displayed on the image display device 8 of the station 4, thereby acceptance of the bet operation by the touch panel 50 is terminated (S607). Thereafter, the bet information (directed BET area 72 and chip number (bet number) betted to the directed BET area 72) occurring on the basis of operation by the player is transmitted (S608).

In S609, a lottery result in the JP bonus game lottery process (S709, mentioned later) executed by the server control CPU 81 is received from the server 13. Here, the lottery result of the JP bonus game includes a lottery result concerning with whether or not the predetermined JP bonus game occurs in each of the stations 4 and a lottery result concerning with that the JP winning occurs in which station 4 among 12 stations 4 (or the JP winning is lost in all stations 4) in a case that the JP bonus game occurs.

Figure 20:
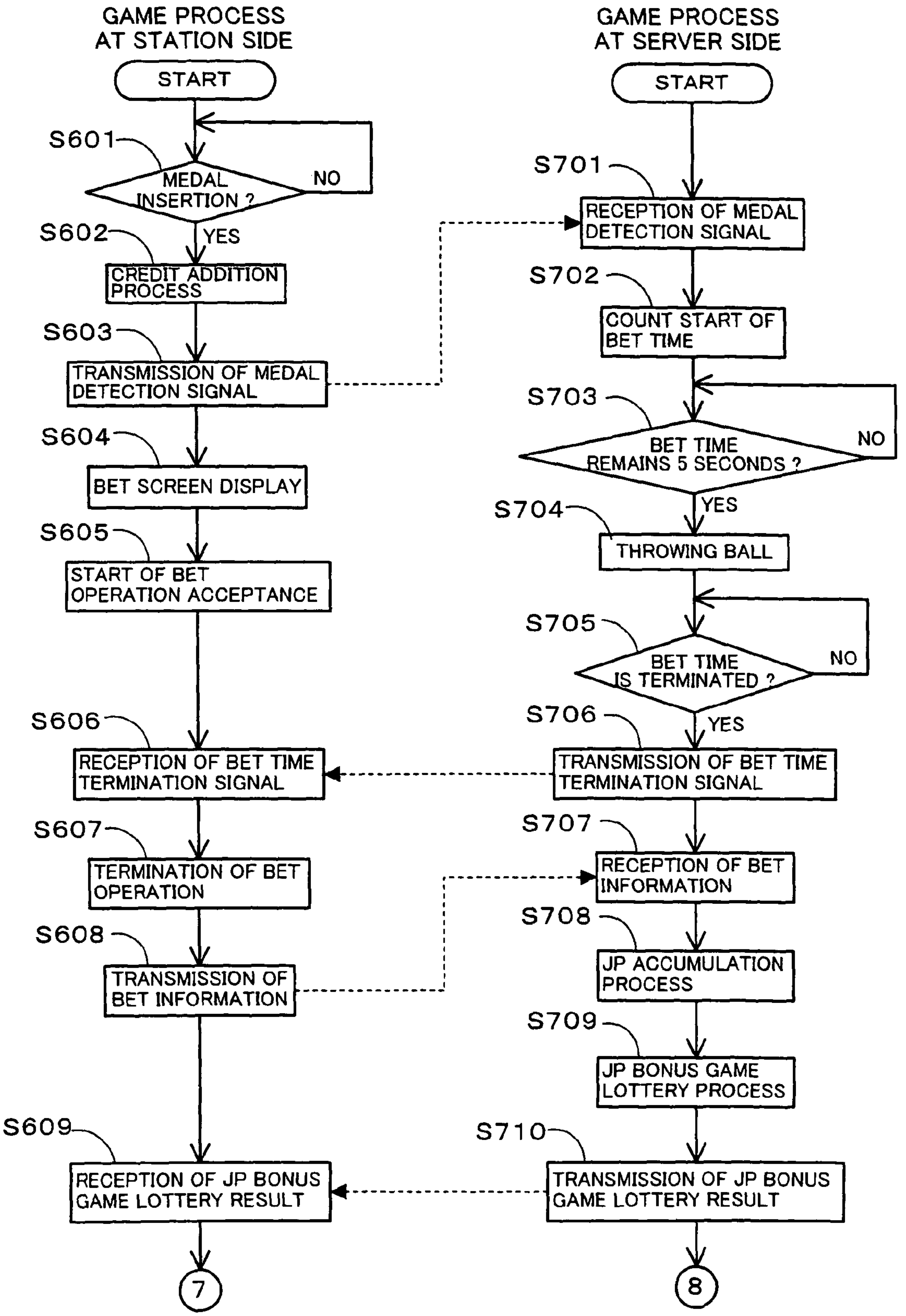
FIG. 20 is a flowchart of game process program executed in the roulette game machine according to the fourth embodiment.
Figure 21:
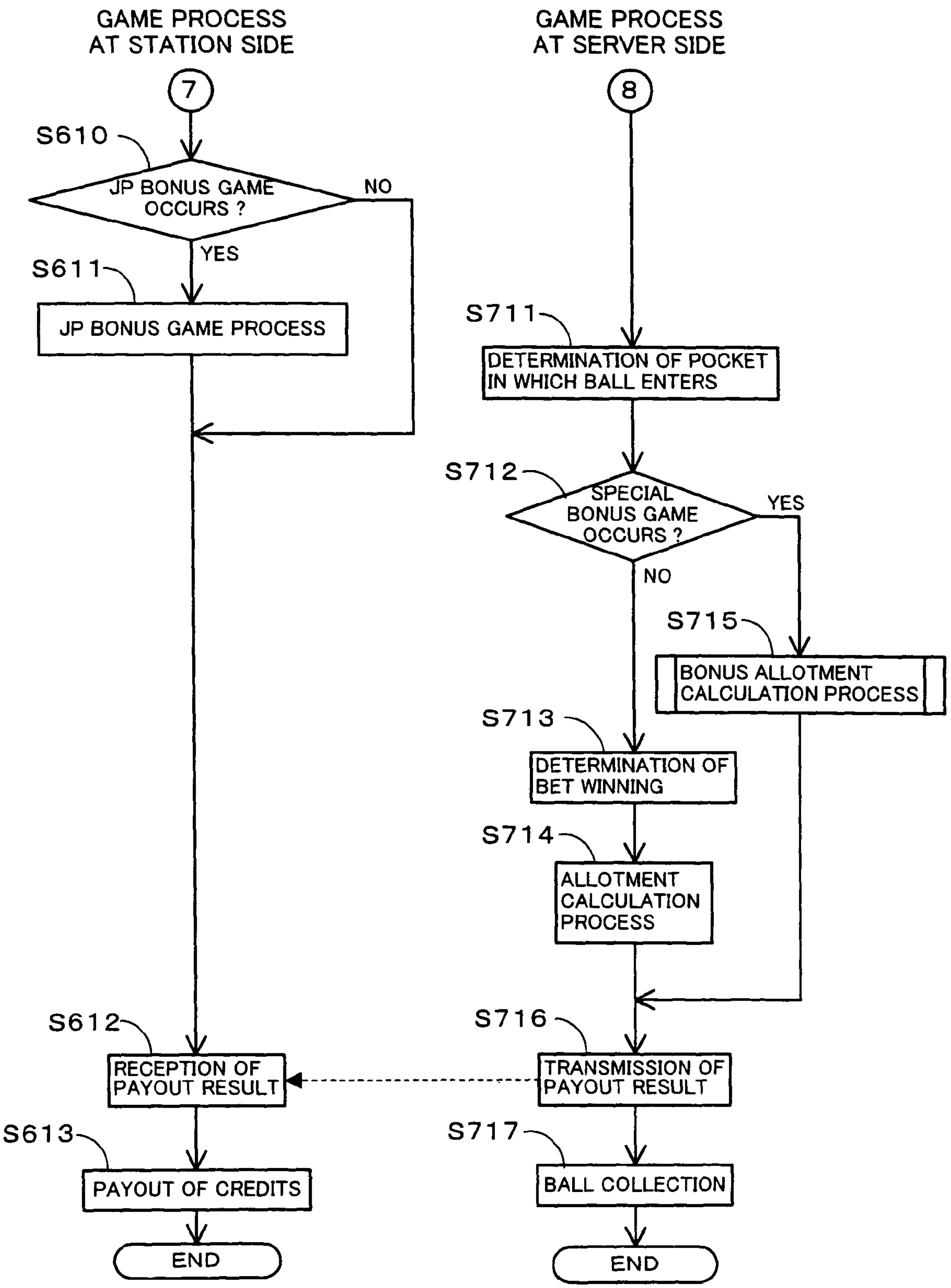
FIG. 21 is a flowchart of game process program executed in the roulette game machine according to the fourth embodiment.

Next, in S610 of FIG. 20, the station control CPU 91 determines whether or not the JP bonus game occurs based on the lottery result obtained in the JP bonus game lottery process received in S609. If it is determined that the JP bonus game does not occur in the station 4 (S610: NO), procedure shifts to S612.

On the other hand, if it is determined that the JP bonus game occurs in the station 4 (S610: YES), a predetermined bonus game with selection type concerning with obtainment of the JP is executed in S611. A game result thereof (whether or not the JP has been obtained) is displayed on the image display device 8 based on the lottery result received in S609.

Next, in S612, the station control CPU 91 receives the payout result of credits transmitted from the server 13. Here, the payout result of credits is constructed from the payout result in the base game conducted by using the BET screen 61, the payout result of JP conducted in the JP bonus game and the payout result of the bonus allotment based on that the ball 27 enters in the bonus pocket 24. Here, the bonus allotment is a special allotment paid out for the player who bets more than 10 bets in the present game corresponding to the betting method when the ball 27 enters in the bonus pocket 24. Concretely, the bonus allotment corresponds to the credit number obtained by that all chips betted in the present game are handled as winning chips and the chip number (bet number) betted to the BET area 72 is multiplied by the magnification corresponding to the kind of betting method ("straight bet", "corner bet", "split bet" or the like).

Thereafter, in S613, based on the payout result received in S612, the credits are paid out. Concretely, the credit data of payout of the roulette game, which is the base game, the credit data of JP sum accumulated by present if the JP bonus game occurs and such station 4 wins the JP and the credit data of bonus allotment sum corresponding to the betting method of each chip betted in all stations 4 in the present game if the ball 27 enters in the bonus pocket 24 and more than 10 credits are betted in the present game, are stored in the RAM 93. After the CASHOUT button 48 is pressed, medals (generally one medal corresponds to one bet) corresponding the credit number stored in the RAM 93 at present are paid out from the medal payout opening 9.

Thereafter, in a case that the game is continued in any of the stations 4, procedure returns to S604, thereby the bet time is again started and procedure shifts to the next game.

On the other hand, if the game is terminated in all of the stations 4, the roulette game is terminated.

Next, with reference to FIGS. 20 and 21, the game process program conducted in the server side will be described. In S701, the server control CPU 81 receives the medal detection signal transmitted from the station control CPU 91 in S603 and determines whether medals or coins are inserted by the player. In the roulette game machine 1 according to the fourth embodiment, when medals or coins are inserted in any of the stations 4, the medal insertion signal is transmitted to the server control CPU 81 from the station control CPU 91 of the station 4 in which medals or coins are inserted.

From the time that the player first participating in the game inserts medals or coins, the bet time during which the bet operation by the player can be accepted is started to count (S702). Here, if the present game is conducted continuously to the previous game, the bet time is started to count right after the previous game is terminated. The player participating in the game can bet chips to the BET area 72 concerning with the number predicted by the player by operating the touch panel 50 during the bet time.

Next, in S703, it is determined whether or not remaining bet time becomes 5 seconds. Here, the remaining bet time is also displayed in the bet time display portion 69 of the image display device 8 (see FIG. 6). If it is determined that the remaining time does not reach to 5 seconds (S703: NO), procedure continuously waits until the remaining time of the bet time becomes 5 seconds. On the other hand, if it is determined that the remaining time becomes 5 seconds (S703: YES), the lottery process by the roulette device 3 is executed according to the game execution program.

Concretely, at first, the ball throwing device is driven and the ball 27 is thrown in the roulette wheel (S704). Further, the drive motor is driven, thereby the wheel 22 is rotated at a predetermined speed in the reverse direction against the throwing direction of the ball 27. The ball 27 thrown rolls on the wheel 22 along the guide wall 29, thereafter when rotation speed becomes weak and centrifugal force disappears, the ball 27 rolls down on the inclined surface and moves toward the inner side, thereby reaches to the wheel 22 rotating (see FIG. 2).

And the ball 27 rolled down on the wheel 22 further passes over the number display plates 25 or the bonus display plate 26 positioned at the outer side of the wheel 22 and enters in any of the number pockets 23 or the bonus pocket 24. The number (in FIG. 2, any of "0", "1"~"36") printed on the number display plate 25 corresponding to the number pocket 23 in which the ball 27 enters becomes the winning number. On the other hand, if the ball 27 enters in the bonus pocket 24, the special bonus game occurs. Here, determination of the winning number or occurrence of the special bonus game is conducted in S711 mentioned later.

In S705, it is determined whether or not the bet time is terminated. If it is determined that the bet time is not terminated (S705: NO), procedure waits until the bet time is terminated. On the other hand, if it is determined that the bet time is terminated (S705: YES), in S706 it is transmitted to the station control CPU 91 the bet time termination signal to instruct that the bet time is terminated.

Next, in S707, the bet information (bet area 72 directed, the number (bet number) of chips betted to the directed bet area 72 and betting method) input by the player in each of the stations 4 is received and stored in the bet information memory area 83A of the RAM 83.

Thereafter, in S708, the credits corresponding to 0.5% of total credits betted in each of the stations 4 from which the bet information is received in S107 is accumulatively added to the JP sum stored in the JP accumulation memory area 83C of the RAM 83. According to this, display of the JP sum display portion 15 and the JP display portion 73 is renewed.

Next, in S709, the server control CPU 81 obtains a random number from a random number sampling circuit, and based on the random number it is conducted a lottery to determine whether or not the JP bonus game occurs and that the JP wins in which of the stations 4 (or the JP is lost in all of the stations 4).

Next, in S710, based on the lottery process in S709, the lottery result of the JP bonus game every each station 4 is transmitted to each of the stations 4.

In S711, the server control CPU 81 drives the winning determination device after the ball 27 enters in the number pocket 23 or the bonus pocket 24, and determines that the ball 27 enters in which of the number pockets 23, or whether the ball 27 enters in the bonus pocket 24.

Further, in S712, based on the kind of the pocket, in which the ball 27 enters, determined S711, it is determined whether or not the ball 27 enters in the bonus pocket 24. As a result, if it is determined that the ball does not enter in the bonus pocket 24 (S712: NO), that is, that the ball 27 enters in any of the number pockets 23, it is determined whether or not winning is obtained for chips betted in each station 4 based on the bet information of each station 4 received in S707 and the kind of the pocket determined in S711 (S713).

Next, the server control CPU 81 executes the allotment calculation process (S714). In the allotment calculation process, chips betted to the winning number are recognized every each station 4 and total allotment sum of credits paid out to each station 4 is calculated, by using the allotment magnification (credit number paid out per one chip (1 bet)) for each bet area 72 and stored in the payout credit memory area 82A of the ROM 82.

Figure 22:
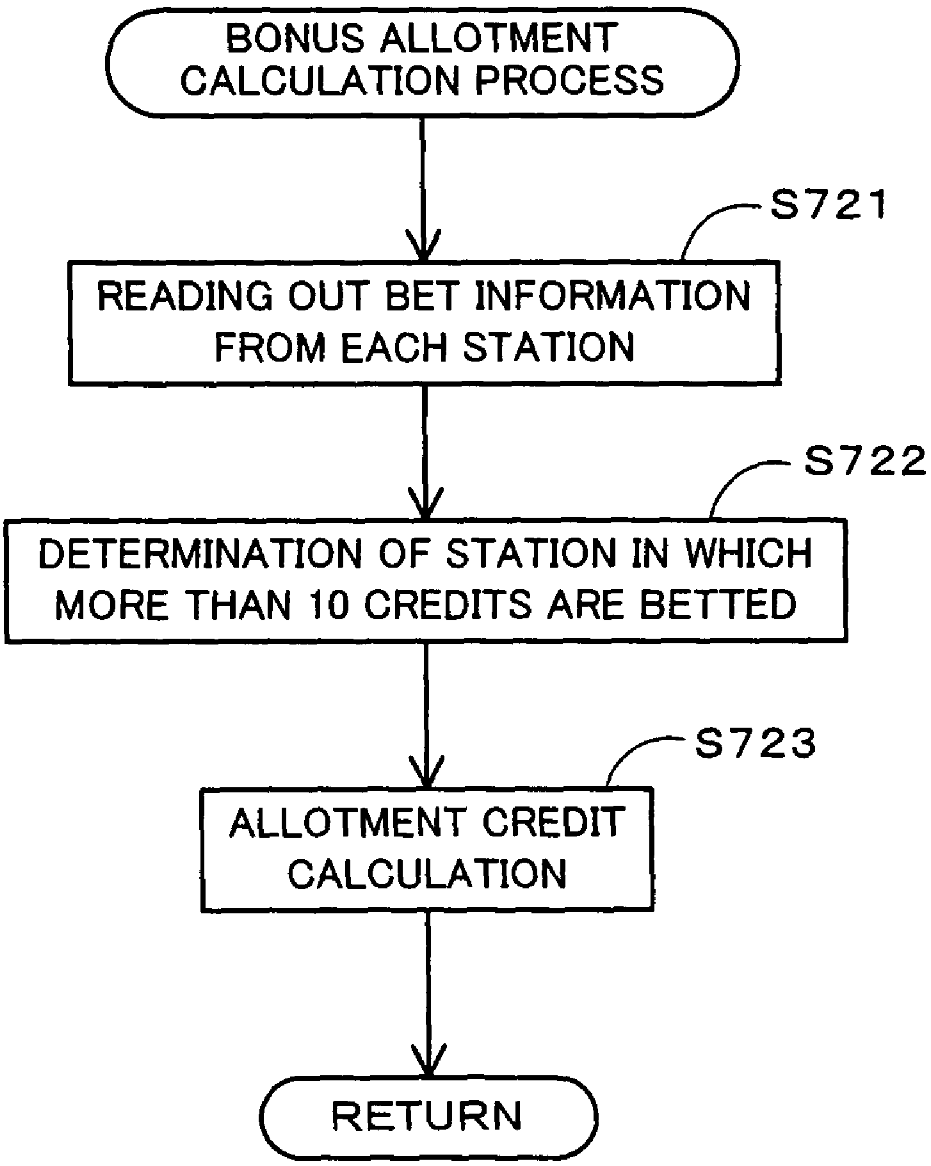
FIG. 22 is a flowchart of sub-process program of bonus allotment calculation process executed in the roulette game machine according to the fourth embodiment.

On the other hand, if it is determined that the ball 27 enters in the bonus pocket 24 (S712: YES), the bonus allotment calculation process of FIG. 22 is conducted (S715). Here, in the bonus allotment calculation process, as mentioned later, the credit number paid out to the station 4 is calculated based on the betting method (credit number betted and payout magnification) against the station 4 to which more than 10 credits are betted.

And in S716, the server control CPU 81 conducts the transmission process of the payout result of credits in the roulette game based on the allotment calculation process in S714, the payout result of JP based on winning determination of the JP bonus game in S709 and the payout result of credits based on the bonus allotment calculation process in S715. Concretely, credit data corresponding to the allotment sum of the base game are output to the station control CPU 91 of the station 4 in which winning is obtained in the base game, and if the JP is won, credit data corresponding to the JP sum accumulated at present are further output to the station control CPU 91, and if the ball 27 enters in the bonus pocket 24, credit data corresponding to the bonus allotment sum calculated in S715 are output to the station control CPU 91.

Thereafter, in S717, the ball collection device arranged under the wheel 22 is driven, thereby the ball 27 on the wheel 22 is collected. The collected ball 27 is again thrown in the wheel 22 of the roulette device 3 in the following game.

Next, a sub-process of the "bonus allotment calculation process" in S715 will be described. FIG. 22 is a sub-flowchart showing the sub-process of the "bonus allotment calculation process" executed by the server control CPU 81 of the roulette game machine 1 according to the fourth embodiment.

At first, in S721, the server control CPU 81 again reads out the bet information received in S707. Based on the bet information read out, it is determined whether or not game media more than 10 credits are betted to each station 4 in the present game, and the stations 4 to which more than 10 credits are betted are specified among all 12 stations 4 (S722).

Next, in S723, the credit number of bonus allotment is calculated from the credit number corresponding to chips betted during the bet acceptance time (S605 S607) of the station 4 specified in S122 and the payout magnification on the basis of the kind of the betting method of chips ("straight bet", "corner bet", "split bet" or the like). Concretely, the allotment is calculated supposed that all chips betted are handled as winning chips, and for example, after chips are betted to the positions shown in FIG. 6, if the ball 27 enters in the bonus pocket 24, it is calculated 1792 credits by adding the allotment (36×36) on the basis of 36 chips betted to "0", the allotment (7×36) on the basis of 7 chips betted to "18", the allotment (10×18) on the basis of 10 chips betted between "16" and "17", the allotment (20×3) on the basis of 20 chips betted to "2 to 1", the allotment (1×4) on the basis of 1 chip betted among "5", "6", "8", "9". Thereafter, in each station 4 which is determined that more than 10 credits are betted, credits corresponding to the bonus allotment calculated in S723 are paid out (S613).

As mentioned in detail, in the roulette game machine 1 according to the fourth embodiment, based on the lottery result of the winning number by using the roulette device 3, in a case that the ball 27 especially enters in the bonus pocket 24, it is paid out credits corresponding the betting method (credit number betted and payout magnification) to the station 4 which is determined that more than 10 credits are betted in the present game. Here, the bonus pocket 24 can be voluntarily set on the wheel 22 by using the bonus pocket setup screen 42. Therefore, the bonus pocket 24 for conducting the payout beneficial for the player can be voluntarily provided on the wheel 22 without changing construction of the wheel 22. In a case that the ball 27 enters in the bonus pocket 24, all chips betted in the present game are handled as winning chips and the allotment corresponding to the bet number (credit number) and the payout magnification is paid out for the player, therefore the payout rate can be increased as the payout rate in whole roulette game machine 1 in the present game is set to more than 100%. Further, by providing the bonus pocket 24, it can be provided a new game using the bonus pocket 24 in the normal roulette game machine 1 in which the player predicts the winning number, thus games can be variegated.

Even if the ball 27 enters in the bonus pocket 24 and the special bonus game occurs according to the lottery result, the bonus allotment is not paid out in the station if the bet number in the roulette game as the base game is not more than 10 bets (10 credits), therefore game motivation can be raised by making the player bet more chips in the roulette game.

Further, by changing the position or number of the bonus pocket 24 on the wheel 22 on the bonus pocket setup screen 42, the payout rate can be more concretely controlled.

Fifth Embodiment

Figure 23:
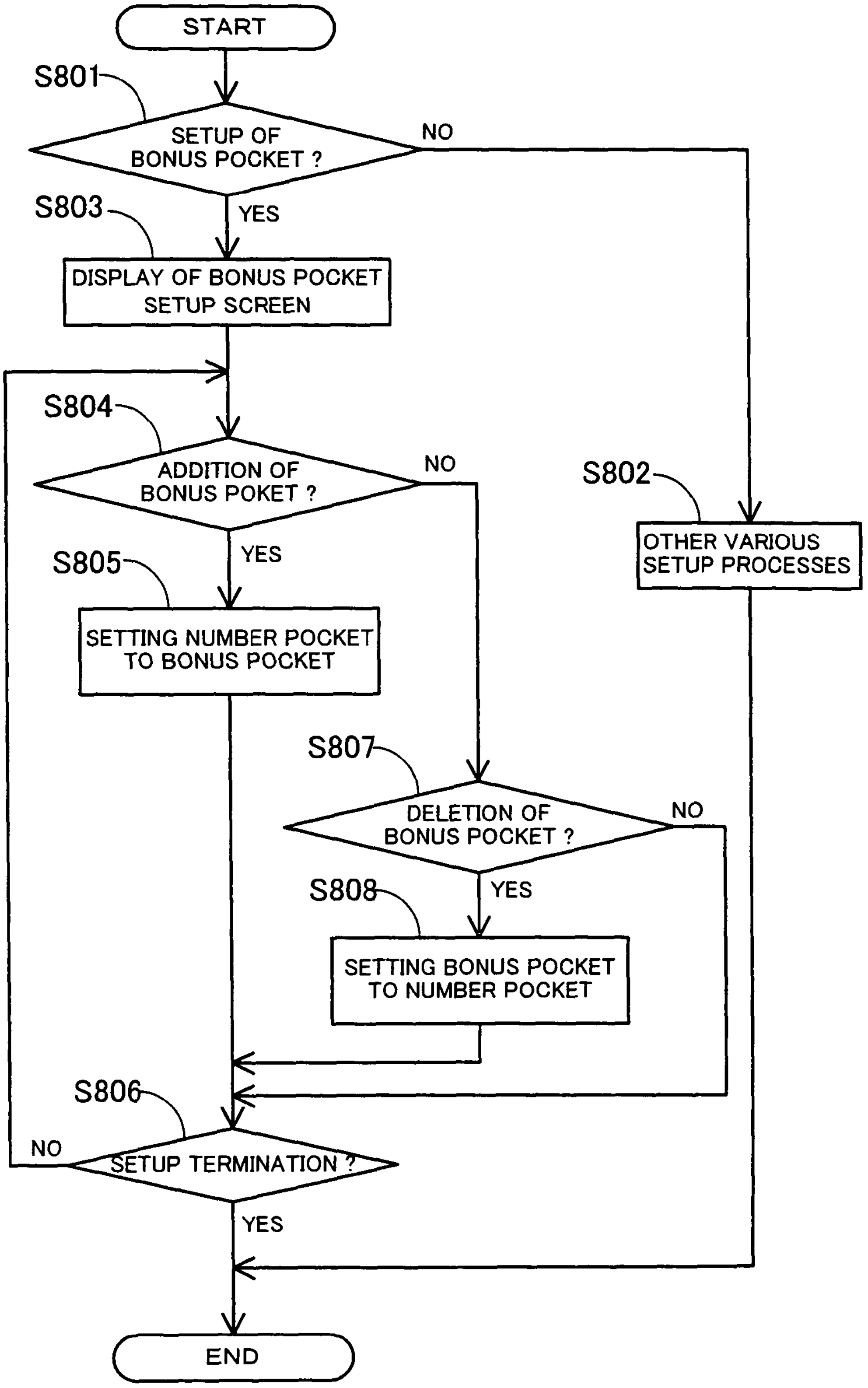
FIG. 23 is a flowchart of bonus pocket setup process program executed in the roulette game machine according to the fifth embodiment.

Next, the roulette game machine according to the fifth embodiment will be described with reference to FIG. 23. Here, in explanation hereinafter, the roulette game machine of the fifth embodiment has the same construction as that of the first embodiment described based on FIGS. 1 to 14. Therefore, the same number used in the fifth embodiment indicates the same constructive element in the roulette game machine 1 of the first embodiment.

An outline construction of the fifth embodiment is almost as same as that of the roulette game machine 1 of the first embodiment. Various processes in the fifth embodiment are almost as same as those in the roulette game machine 1 of the first embodiment.

Thereinafter, it will be described with reference to FIG. 23 the bonus pocket setup process program executed by the server control CPU 81 in the roulette game machine 1 according to the fifth embodiment. Here, the bonus pocket setup process is a process to change setup concerning with addition and deletion of the pocket becoming the bonus pocket 24 by using the server 13. Here, the program shown in FIG. 23 by a flowchart is stored in the ROM 82 and the RAM 83 provided in the server 13 and is executed by the server control CPU 81.

In the bonus pocket setup process program, at first, in S801, the station control CPU 91 determines whether or not setup concerning with the bonus pocket 24 is conducted based on the operation information of the keyboard 33. Concretely, in a case that "BONUS POCKET MENU" is selected from the menu screen 40 (see FIG. 4) displayed on the liquid crystal display 32, it is determined that the setup concerning with the bonus pocket 24 is conducted.

And if it is determined that the setup concerning with the bonus pocket 24 is not conducted (S801: NO), various setups (for example, setup of sound volume, test operation) of the roulette game machine 1 other than the setup of the bonus pocket 24 are conducted (S802).

On the other hand, if it is determined that the setup concerning with the bonus pocket 24 is conducted (S801: YES), the bonus pocket setup screen 42 (see FIG. 5) is displayed on the liquid crystal display 32 (S803).

Thereafter, in S804, it is determined whether or not addition of the bonus pocket 24 is done. Concretely, it is determined whether or not a new number of a range of "00", "0", "1"~"36" is input to the bonus number 43 of the bonus pocket setup screen 42. And if it is determined that a new number of a range of "00", "0", "1"~"36" is input to the bonus number 43 (S804: YES), the number pocket 23 corresponding to the input number (for example, if the number "07" is input, the number pocket 23 having the number "7") is newly set to the bonus pocket 24 (S805). Thereby, the bonus pocket 24 for conducting the payout beneficial for the player can be voluntarily provided on the wheel 22 without changing construction of the wheel 22.

Thereafter, in S806, it is determined whether or not the setup concerning with the bonus pocket 24 is terminated based on the operation information of the keyboard 33. If it is determined that such setup is terminated (S806: YES), the bonus pocket setup process is terminated. On the contrary, if it is determined that such setup is continuously conducted (S806: NO), procedure returns to the determination process of S804.

On the other hand, if it is determined that addition of the bonus pocket 24 is not conducted (S804: NO), procedure shifts to S807. In S807, it is determined whether or not deletion of the bonus pocket 24 is conducted. Concretely, it is determined whether or not the number input to the bonus number 43 on the bonus pocket setup screen 42 is deleted by using the keyboard 33. If it is determined that the number input to the bonus number 43 is deleted (S807: YES), the bonus pocket 24 corresponding to the deleted number (for example, the bonus pocket 24 provided instead of the number pocket 23 to which the number "7" is given if the number "07" is deleted) is set to the original number pocket 23 (S808). Thereby, the bonus pocket 24 for conducting the payout beneficial for the player can be voluntarily provided on the wheel 22 without changing construction of the wheel 22.

In S807, if it is determined that deletion of the bonus pocket 24 is not conducted (S807; NO), procedure shifts to the determination process of S806.

As mentioned in the roulette game machine according to the fifth embodiment, a new number of a range of "00", "0", "1"~"36" is input to the bonus number 43 on the bonus pocket setup screen 42 and the number pocket 23 corresponding to the input number (for example, the number pocket 23 to which the number "7" is given if the number "07" is input) is newly changed to the bonus pocket 24 (S805), therefore, the bonus pocket 24 for conducting the payout beneficial for the player can be voluntarily provided on the wheel 22 without changing construction of the wheel 22.

Sixth Embodiment

Next, the roulette game machine according to the sixth embodiment will be described with reference to FIGS. 24 to 32. Here, in explanation hereinafter, the roulette game machine of the sixth embodiment has the same construction as that of the first embodiment described based on FIGS. 1 to 14, therefore the same number used in the sixth embodiment indicates the same constructive element in the roulette game machine 1 of the first embodiment.

An outline construction of the sixth embodiment is almost same as that of the roulette game machine 1 of the first embodiment. Various processes in the sixth embodiment are substantially similar to those in the roulette game machine 1 of the first embodiment.

However, although in the roulette game machine 1 of the first embodiment the bonus pocket 24 is fixed beforehand on the wheel 22 and the bonus game is conducted every the ball 27 enters in the bonus pocket 24 in every game, the roulette game machine of the sixth embodiment differs from the roulette game machine of the first embodiment at the following point. That is to say, in the roulette game of the sixth embodiment, it is conducted in each station 4 the lottery to determine whether or not the winning right of JP is obtained and if the winning right of JP is obtained in any of the stations 4, any of the number pockets 23 is set to the bonus pocket 24, and further when the ball 27 enters in the bonus pocket 24 set according to the above, the JP is paid out to the station in which the winning right of JP is obtained. Therefore, in the sixth embodiment, it is not required for a person to manually input the bonus pocket and the bonus pocket can be changed every time that the ball 27 enters in the bonus pocket 24 set according to the above.

In the roulette game machine of the sixth embodiment, as mentioned later, three kinds of JP of "MEGA", "MAJOR" and "MINI". Here, as one example, in the JP of "MEGA" 0.15% of credits among the credits betted to all 12 stations 4 in the base game (roulette game) using the BET screen 110 mentioned later are accumulatively stored, in the JP of "MAJOR" 0.20% of credits among the betted credits are accumulatively stored and in the JP of "MINI" 0.3% of credits among the betted credits are accumulatively stored.

In a case that a predetermined condition is satisfied by the 2-stage lottery using the bonus pocket mentioned later, any one of JPs is won and the credits corresponding to the sum accumulated in the JP corresponding thereto are paid out. And on the electric display device 15 (see FIG. 1) the accumulated sum of JP of "MEGA" is particularly displayed among three kinds of JPs.

Figure 24:
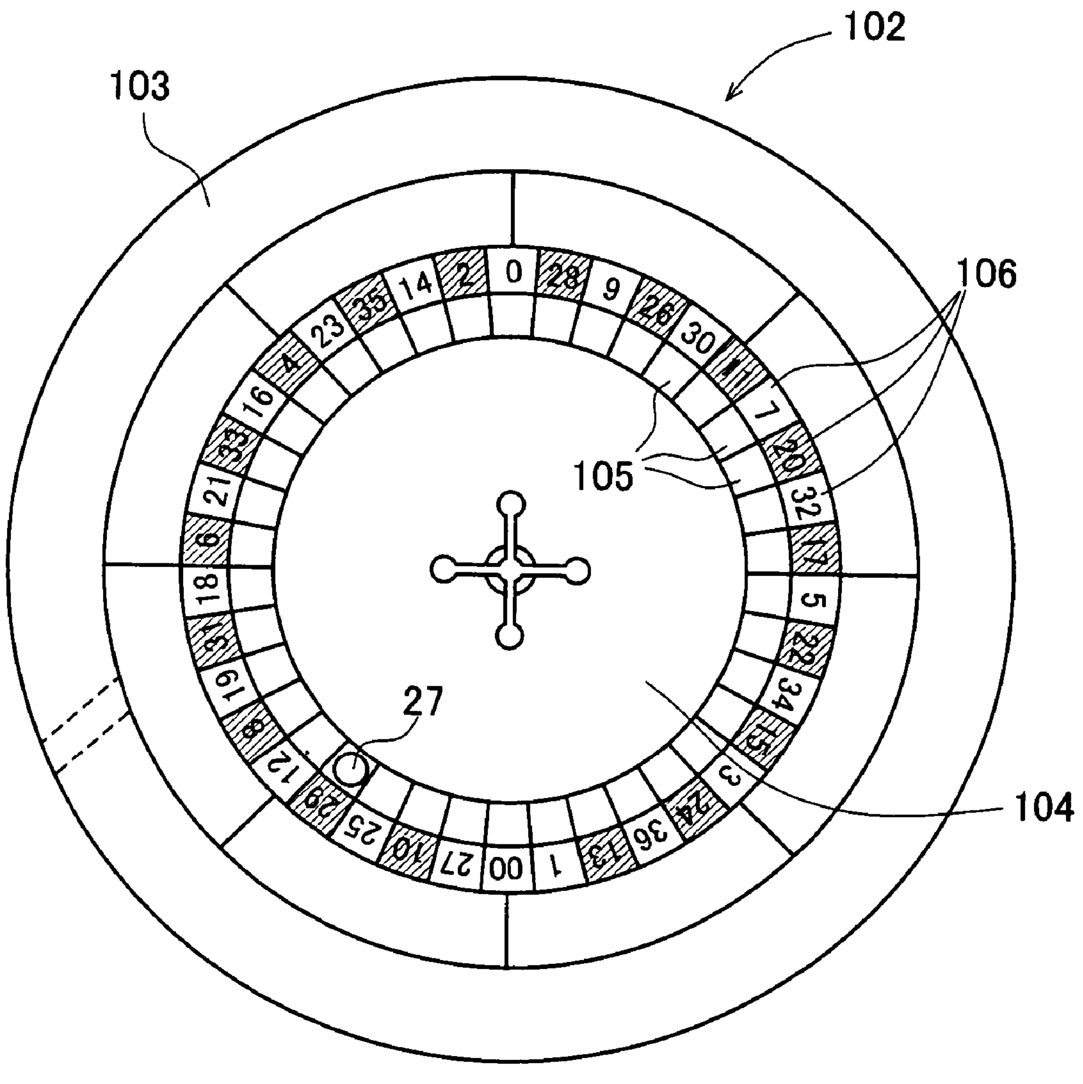
FIG. 24 is a plan view of roulette wheel according to the sixth embodiment.

Next, a construction of the roulette device 102 according to the sixth embodiment will be described with reference to FIG. 24. FIG. 24 is a plan view of the roulette device according to the sixth embodiment.

As shown in FIG. 24, the roulette device 102 has basically the same construction as that of the roulette device 3 (see FIG. 2) of the first embodiment, and is basically constructed from a frame 103 and a wheel 104 which is rotatably set within the frame 103. On an upper surface of the wheel 104, number pockets 105 formed in a concave form (total 38 pockets in the sixth embodiment) are formed. Further, on the upper surface of the wheel 104 in an outer direction of each number pocket 105, a number display plate 106, on which each of the numbers "0", "1"~"36" as figure numbers is printed, is arranged so as to correspond to each of the number pockets 105. Here, in the roulette device 102 of the sixth embodiment, differently from the roulette game machine 1 of the first embodiment, the bonus pocket is not provided beforehand on the wheel 104 and a specific number pocket 105 is set to the bonus pocket if a predetermined condition is satisfied.

In the roulette device 102 of the sixth embodiment, a LED is respectively arranged on a rear side of each of 38 number display plates 106. The LED arranged on the rear side of the number display plate 106 corresponding to the number pocket 105 which is set to the bonus pocket, turned on. Here, the number display plate 106 is made of semi-transparent resin and the number pocket 105 set to the bonus pocket is turned on, thereby such number pocket 105 is notified to the player so that the player can easily distinguish such number pocket 105.

Next, with reference to FIG. 25, the BET screen 110 used in the roulette game machine of the sixth embodiment will be described. Here, the BET screen 110 has substantially the same construction as that of the BET screen 61 in the first embodiment, and on the table betting board 60 there are arranged and displayed in matrix the numbers as same as 38 kinds of numbers of "0", "00", "1"~"36".

At the right side of the bet time display portion 69, there are provided a MINI display portion 111 displaying the credit number of JP of "MINI" accumulated by present, a MAJOR display portion 112 displaying the credit number of JP of "MAJOR" accumulated by present and a MEGA display portion 113 of JP of "MEGA" accumulated by present. Here, in the MINI display portion 111 0.3% of credits among the credits betted every one game in all 12 stations 4 are accumulatively added, in the MAJOR display portion 112 0.20% of credits among the betted credits are accumulatively added, and in the MEGA display portion 113 0.15% of credits among the credits betted are accumulatively added, and the value common to all of the stations 4 is displayed. As mentioned later, if the JP is won by the internal lottery and the ball 27 enters in the bonus pocket which is set, the JP is won, thereby the credit number of the JP which is won is paid out among the JPs displayed on each of the display portions 111~113 and after the credit number is paid out, the value displayed on the JP display portion is renewed to the initial value set beforehand in the ROM 82 or the RAM 83 (200 credits in "MINI", 5000 credits in "MAJOR", and 5000 credits in "MEGA").

Here, the other elements constructing the BET screen 111 are as same as the elements of the BET screen 61 of the first embodiment, which is already explained, thus explanation thereof will be omitted.

Next, with reference to FIGS. 26 and 27, memory areas of the ROM and RAM provided in the server 13 of the sixth embodiment will be described.

Figure 26:
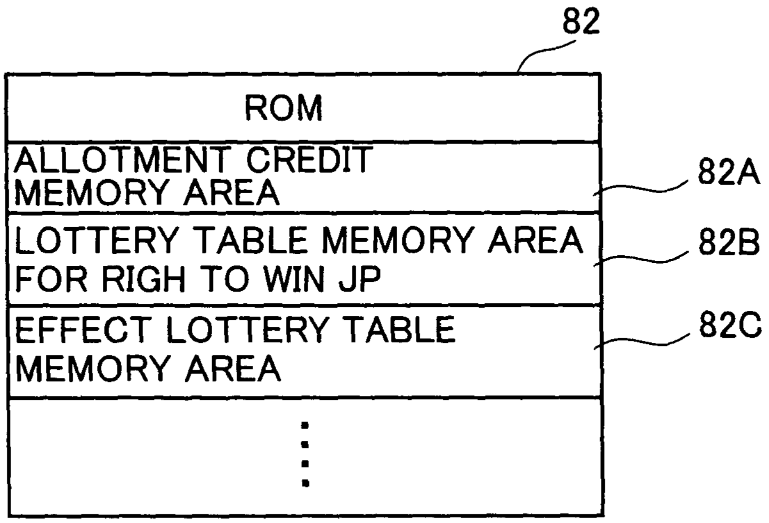
FIG. 26 is a schematic view showing memory areas in the ROM of the roulette game machine according to the sixth embodiment.

As shown in FIG. 26, in the ROM 82, there are provided an allotment credit memory area 82A storing odds concerning with the roulette game by using the BET screen 110, a JP right lottery table memory area 82B storing a JP right lottery table for conducting a lottery to determine whether or not the JP right is obtained and an effect lottery table memory area 82C storing an effect lottery table for conducting a lottery to determine whether or not effect to notify the number of bonus pocket to the player is conducted if the bonus pocket is set.

Here, the JP right lottery table memory area 82B is a table to conduct a lottery whether or not each station 4 obtains the right to win three kinds of JPs at the start of the game. In the roulette game machine of the sixth embodiment, a lottery is conducted for the station 4 that the bet number is more than 50 bets in the present game among the stations connected to the station control CPU 81 by using the JP right lottery table. Here, as one example, in the JP right lottery table, a range of random numbers is set so that a probability to obtain the right to win the JP of "MINI" becomes 4.7684%, a probability to obtain the right to win the JP of "MAJOR" becomes 0.4172% and a probability to obtain the right to win the JP of "MEGA" becomes 0.0298%. And in a case that more than one station 4 obtaining the right to win any of JPs exists, any of the number pockets 105 is set to the bonus pocket and a lottery by using the ball 27 is conducted. As a result, if the ball 27 enters in the bonus pocket, the station obtaining the right to win the JP wins the JP.

The lottery table is used to conduct a lottery whether or not the number corresponding to the bonus pocket set according to the above is notified, in a case that any of the stations 4 obtains the right to win the JP and any of the number pockets 105 is set to the bonus pocket, or whether or not effect to notify the kind of JP with the right to win the JP is conducted. Here, in the roulette game machine of the sixth embodiment, if the ball enters in the bonus pocket, a range of random numbers is set so as to notify the number with probability of 90% (here, the reason not to notify the number with probability of 10% is that possibility to win the JP is to be remained even if the notification is not done). And a range of random numbers is set so that if the player obtains the right to win the JPs of "MEGA" and "MAJOR", the kind of JP is notified with probability of 50% and if the player obtains the right to win the JP of "MINI", the kind of JP is notified with probability of 0% (the kind of JP is not notified).

Figure 27:
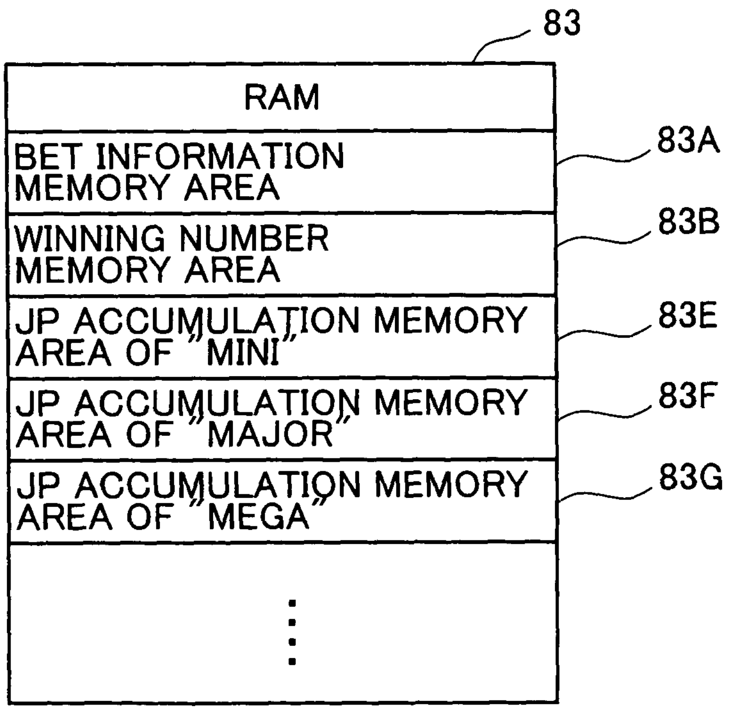
FIG. 27 is a schematic view showing memory areas in the RAM of the roulette game machine according to the sixth embodiment.

On the other hand, as shown in FIG. 27, in the RAM 83, there are provided a bet information memory area 83A storing the bet information of the player playing at present, a winning number memory area 83B storing the winning number of the roulette device 102 determined by the winning determination device, a JP accumulation memory area 83E storing the credit number accumulatively added as the JP of "MINI", a JP accumulation memory area 83F storing the credit number accumulatively added as the JP of "MAJOR" and a JP accumulation memory area 83G storing the credit number accumulatively added as the JP of "MEGA". Here, the bet information concretely means the number of chips (bet number) betted to the BET area 72 directed on the BET screen 110.

Figure 28:
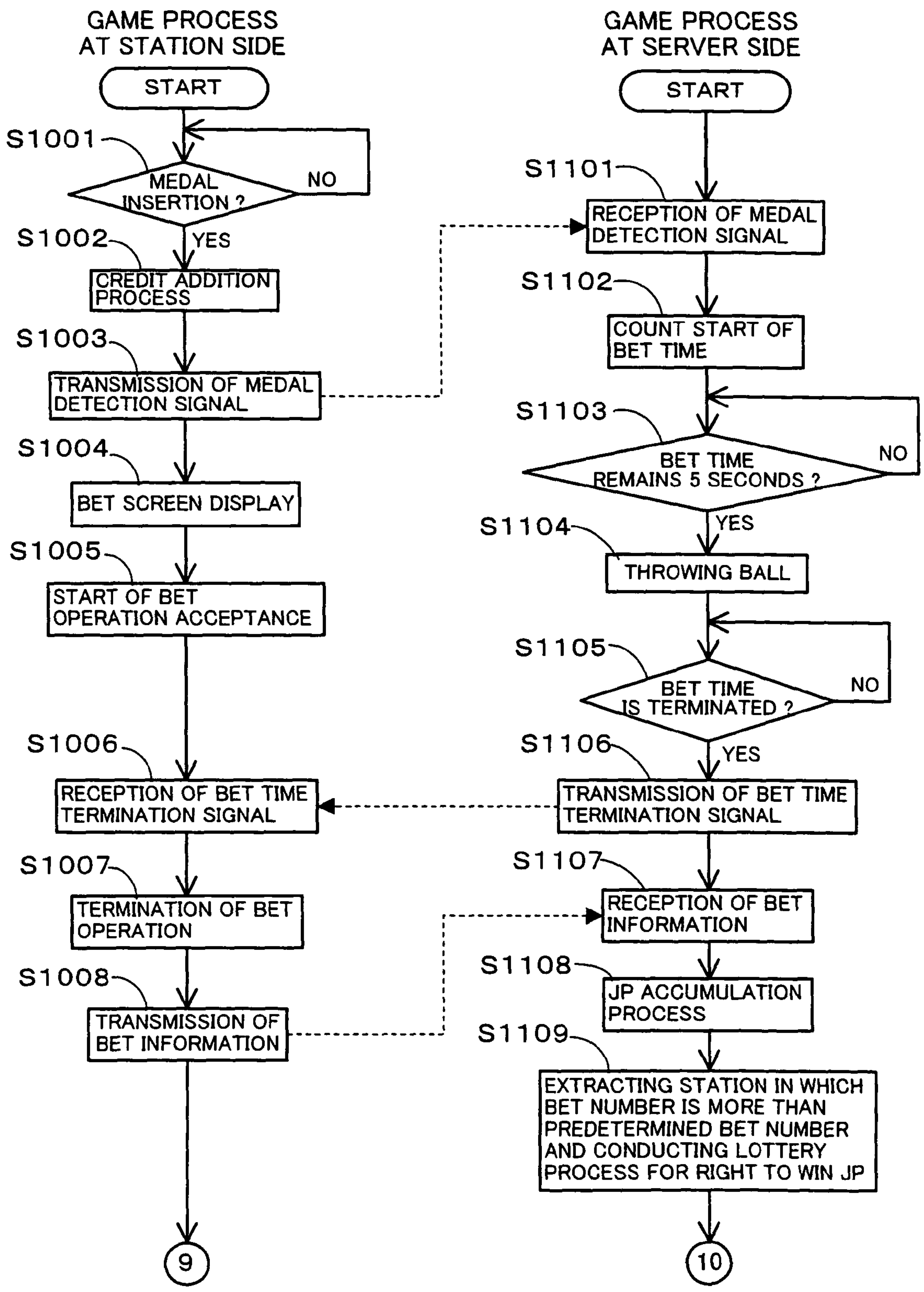
FIG. 28 is a flowchart of game process program executed in the roulette game machine according to sixth embodiment.
Figure 29:
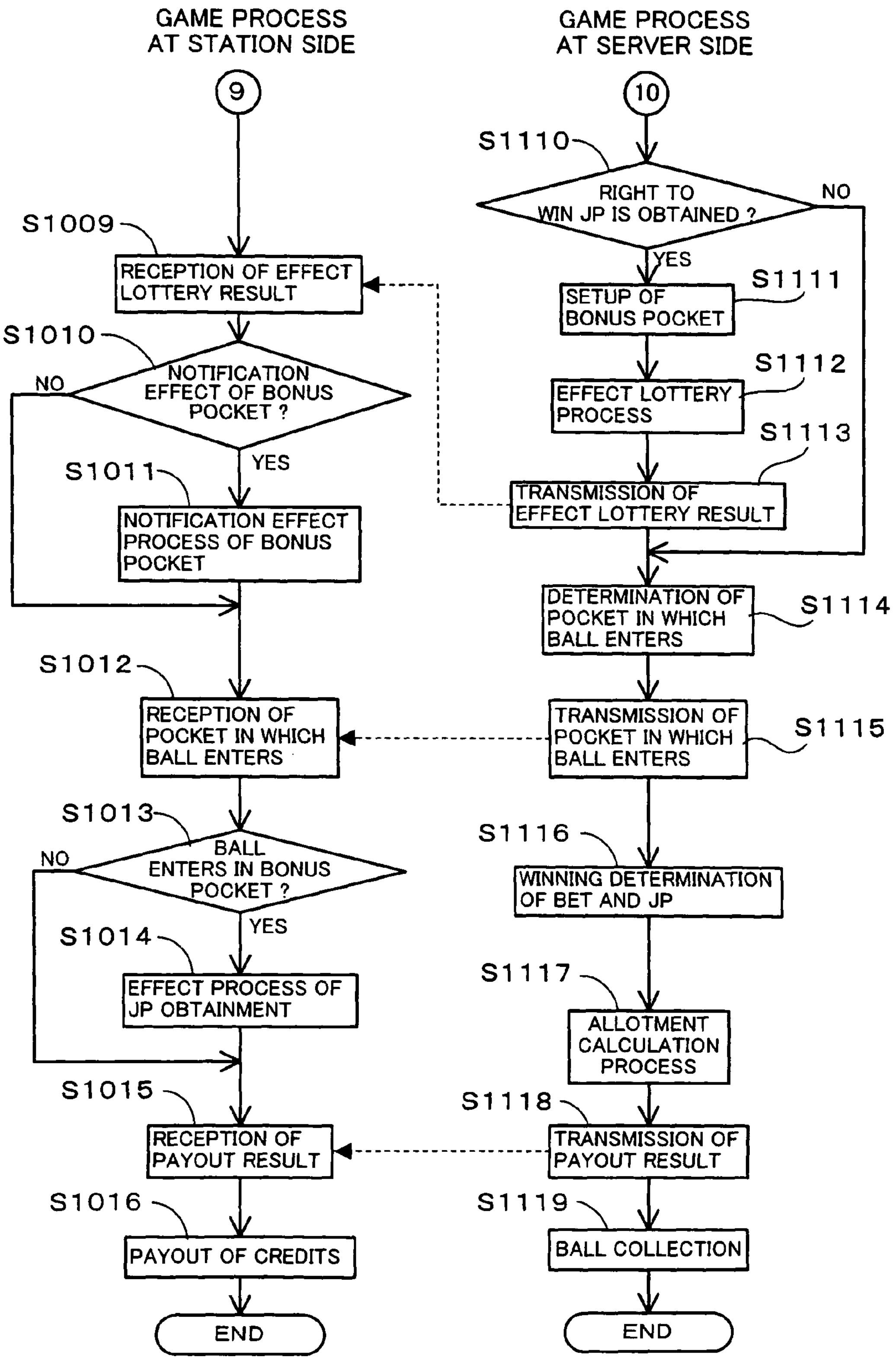
FIG. 29 is a flowchart of game process program executed in the roulette game machine according to sixth embodiment.

Next, with reference to FIGS. 28 and 29, it will be described a game process program in the server executed by the server control CPU 81 in the roulette game machine according to the sixth embodiment and a game process program in the station executed by the station control CPU 91 in the station 4. Here, programs shown by the flowcharts of FIGS. 28 and 29 are stored in the ROM 82 and RAM 83 provided in the server 13 and in the ROM 92 and RAM 93 provided in the station 4, and executed by the server control CPU 81 and the station control CPU 91.

At first, with reference to FIGS. 28 and 29, the game process program in the station will be described. Here, processes in S1001 to S1007 are as same as those of S1 to S7 of the game process program (see FIGS. 11 and 12) in the station of the first embodiment, explanation thereof will be omitted.

In S1008, the station control CPU 91 transmits to the server 13 the bet information (directed BET area 72 and chip number (bet number) betted to the directed BET area 72) occurring on the basis of operation by the player.

Next, in S1009, the station control CPU 91 receives from the server 13 the effect lottery result obtained by the lottery whether or not the bonus pocket notification effect to notify that the bonus pocket is set in the present game and the number corresponded to the set bonus pocket is conducted.

In S1010, based on the effect lottery result received in S1009, it is determined whether or not the effect to notify the bonus pocket is conducted. As a result, if it is determined that the effect to notify the bonus pocket is conducted (S1010: YES), the bonus pocket notification effect process is executed by using the image display device 8 and the speaker 10 (S1011). Concretely, in the bonus pocket notification effect process, it is notified to the player that the bonus pocket is set in the present game, the number corresponded to the set bonus pocket and the kind of JP (kind of JP that winning right thereof is obtained in S1009) which can be obtained when the ball 27 enters in the bonus pocket.

Hereinafter, with reference to FIGS. 30 and 31, the bonus pocket notification effect conducted in S1011 will be described. In the roulette game machine of the sixth embodiment, the server 13 receiving the bet information in S1107 from each station 4 sets one of number pockets 105 to the bonus pocket in a case that any of the stations 4 in which more than 50 bets are betted in the JP right lottery process (S1109) obtains the winning right to win the JP. For example, FIG. 30 is a plan view showing the roulette device 102 when the number pocket corresponded to the number "10" is set to the bonus pocket 107.

Figure 30:
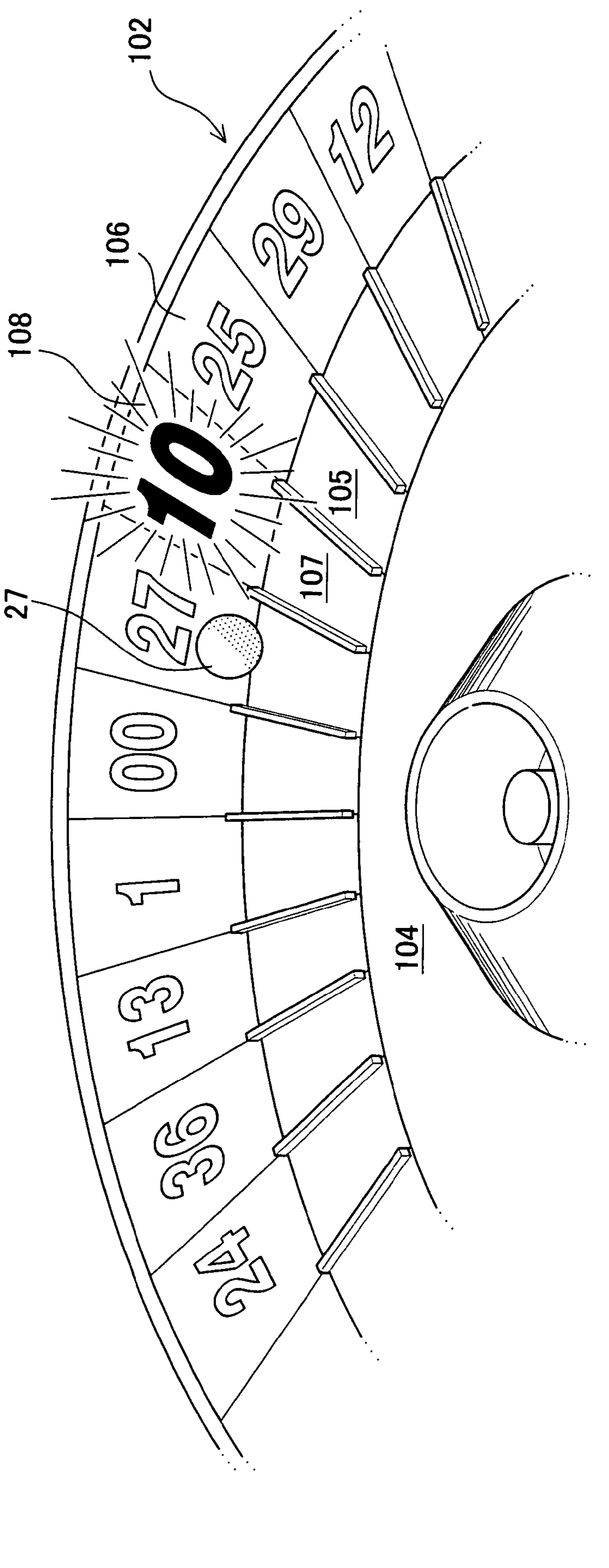
FIG. 30 is a plan view of the roulette wheel showing a case that a number pocket corresponded to a number "10" is set to the bonus pocket.

As shown in FIG. 30, when the bonus pocket 107 is set, the LED arranged on the rear side of the number display plate 108 corresponding to the bonus pocket 107 is turned on. Before the ball 27 rolling on the wheel 104 enters in any of the number pockets 105 or the bonus pocket 107, the bonus notification effect is conducted by using the image display device 8 and the speaker 10 every station 4. FIG. 31 is an explanatory view showing a display screen of the image display device 8 when the bonus pocket notification effect is conducted.

Figure 25:
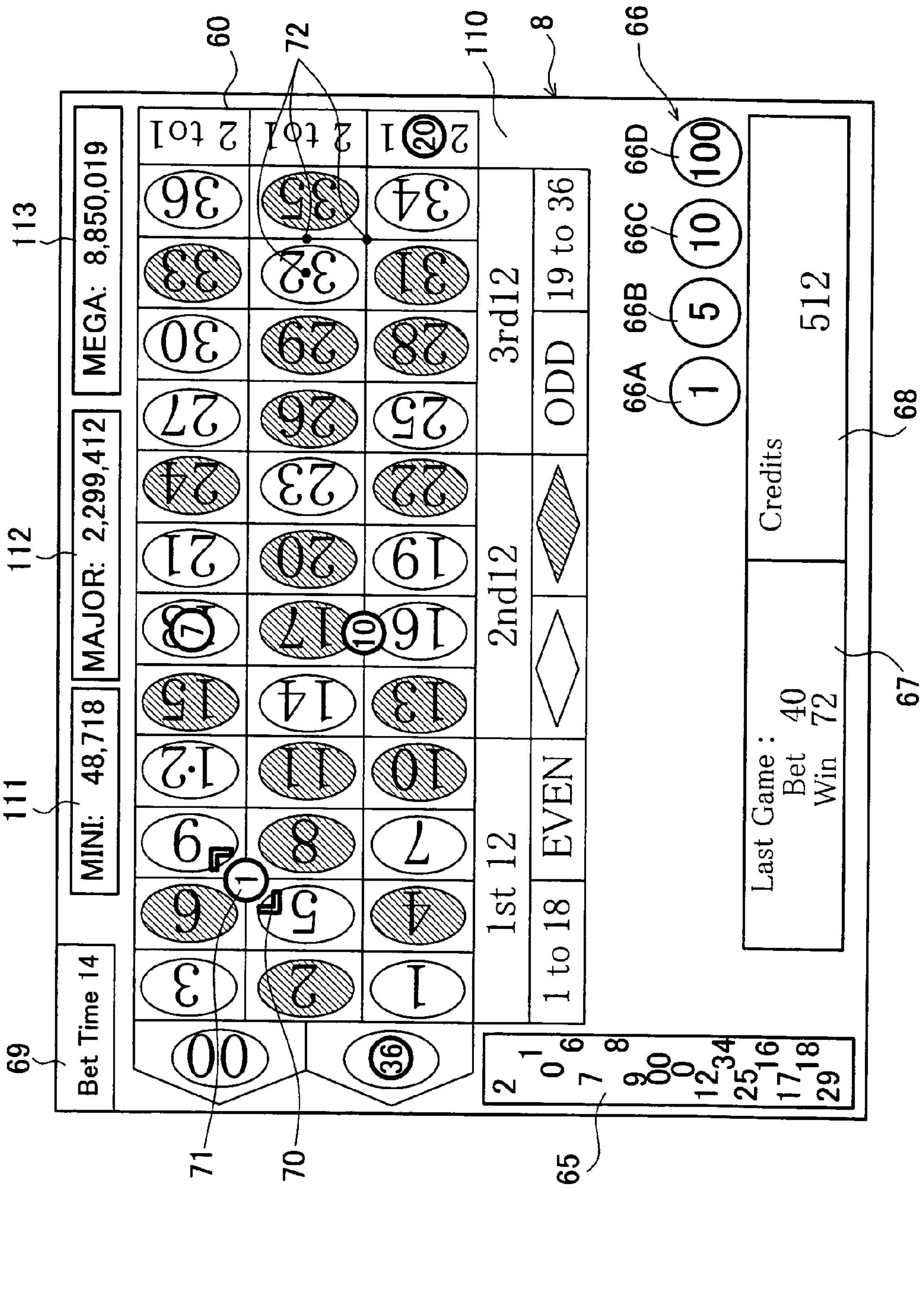
FIG. 25 is an explanatory view showing a BET screen displayed on the image display device in the roulette game machine according to sixth embodiment.
Figure 31:
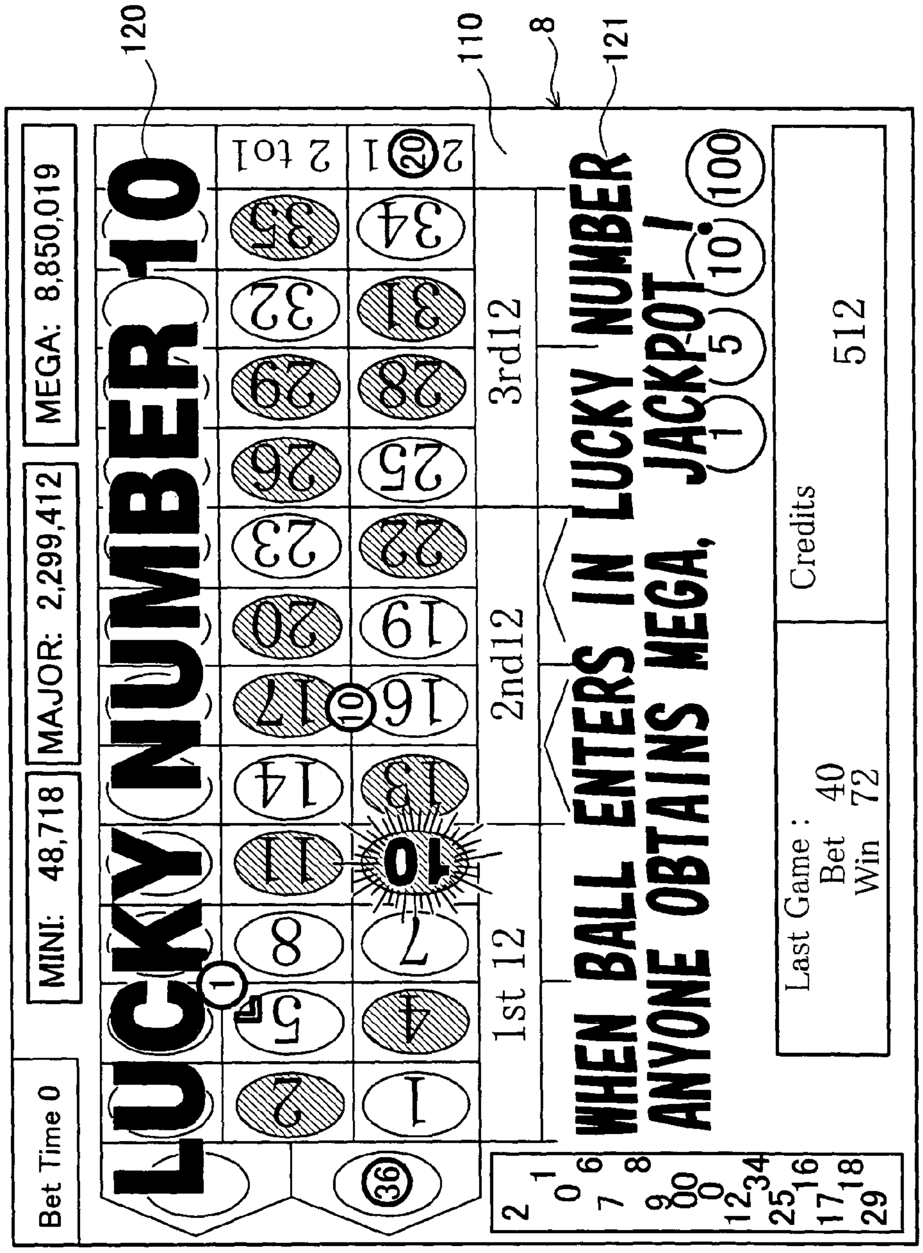
FIG. 31 is an explanatory view showing a display screen of the image display device when it is conducted effect to notify that the bonus pocket is set.

As shown in FIG. 31, in the bonus pocket notification effect, the guide sentence 120 guiding the number (in FIG. 31, "10") corresponded to the bonus pocket 107 and the JP guide sentence 121 guiding the kind of JP (in FIG. 31, JP of "MEGA") obtainable when the ball 27 enters in the bonus pocket 107 are displayed so as to superimpose with the BET screen 110 (see FIG. 25). Voices having the same contents as those of the number guide sentence 120 and the JP guide sentence 121 are output from the speaker 10. Therefore, the player can recognize that the bonus pocket is set in the present game, the number corresponded to the set bonus pocket and the kind of JP obtainable when the ball 27 enters in the bonus pocket, before the lottery by the roulette device 102 is terminated, by referring display and the output effect. Thereby, for example, a sense of distrust or uncomfortness against the game, which the player feels as if unfair or counterfeit is done by inner control, can be removed in a case that the JP winning is notified after the game result is displayed.

Thereafter, in S1012, after the lottery by the roulette device 102 is terminated, the number pocket 105 in which the ball 27 enters and the kind of the bonus pocket 107 are received from the server 13. In S1013, the station control CPU 91 determines whether or not the ball particularly enters in the bonus pocket 107 set according to the above. If it is determined that the ball 27 enters in the bonus pocket 107 (S1013: YES), it is conducted the JP obtainment effect process to notify whether or not the JP is obtained in such station 4 (S1014). On the other hand, if it is determined that the ball 27 does not enter in the bonus pocket 107 (S1013: NO), procedure shifts to S1015.

Figure 32:
FIG. 32 is an explanatory view showing one example of the display screen of the image display device when it is conducted effect that JP is obtained.

Hereinafter, with reference to FIG. 32, the JP obtainment effect conducted in S1014 will be described. In the roulette game machine of the sixth embodiment, if the ball 27 enters in the bonus pocket by the lottery in the roulette device 102, the station 4 obtaining the right to win the JP wins the JP. It is notified which station 4 obtains the JP by using the image display device 8 and the speaker 10 every station 4. FIG. 32 is an explanatory view showing one example of the display screen of the image display device 8 when the JP is obtained.

As shown in FIG. 32, an effect screen 122 is displayed in the JP obtainment effect. In the effect screen 122, plural kinds of cocktails 123 are serially displayed while moving from the right edge to the left direction and when any of the cocktails 123 is stopped in the center of the screen, the JP corresponding to the kind of the stopped cocktail 123 is won. On the other hand, if all of cocktails 123 are moves from the left edge to out of the screen, the JP is lost. For example, in FIG. 32, the effect screen 122 in the station 4 in which the JP of "MEGA" is won is displayed, and the cocktail corresponding to the JP of "MEGA" is stopped and displayed in the center of the screen and it is displayed a winning guide sentence 124 to notify that the JP of "MEGA" is won. Voices having the same contents as those of the winning guide sentence 124 are output form the speaker 10. Therefore, the player can recognize that any of the JPs is won in the present game or that any of the JPs is not won, by referring the display or the effect output.

In S1015, the station control CPU 91 receives the payout result of credits transmitted from the server control CPU 81. Here, the payout result of credits is constructed from the payout result of the base roulette game conducted by using the BET screen 110 and the payout result of JP when the JP is obtained.

Thereafter, in S1016, the payout of credits is done based on the payout result received in S1015. Concretely, the credit data of the payout in the roulette game which is the base game and the credit data of JP sum accumulated in the JP by present if the JP is won are respectively stored in the RAM 93. When the CASHOUT button 48 is pressed, medals (generally one medal for one credit) corresponding to the credit number stored in the RAM 93 at present are paid out from the medal payout opening 9.

Thereafter, in a case that the game is continued in any of the stations 4, procedure returns to S1004, thereby the bet time is again started and procedure shifts to the next game.

On the other hand, if the game is terminated in all of the stations 4, the roulette game is terminated.

Next, with reference to FIGS. 28 and 29, the game process program conducted in the server side will be described. Here, processes in S1101 to S1106 are as same as those in S101 to S106 of the game process program (see FIGS. 11 and 12) in the station side of the first embodiment, thus explanation thereof will be omitted.

In S1107, the server control CPU 81 receives the bet information (bet area 72 directed, the number (bet number) of chips betted to the directed bet area 72) and stores them in the bet information memory area 83A of the RAM 83.

Thereafter, in S1108, the credits corresponding to 0.30% of total credits betted in each of the stations 4 from which the bet information is received in S1107 are accumulatively added to the JP sum of "MINI" stored in the JP accumulation memory area 83E of the RAM 83. The credits corresponding to 0.20% are accumulatively added to the JP sum of "MAJOR" stored in the JP accumulation memory area 83F of the RAM 83. Further, the credits of 0.15% are accumulatively added to the JP sum of "MEGA" stored in the JP accumulation memory area 83G of the RAM 83. And according to this, the JP sum display portion 15 and the MINI display portion 111~MEGA display portion 113 are renewed.

Next, in S1109, based on the bet information received in S1107, the server control CPU 81 extracts the station 4 in which the bet number is more than 50 bets and conducts the JP right lottery process to conduct a lottery whether or not the right to win the JP is obtained in one station 4 or plural stations 4 extracted. In the JP right lottery process, concretely, the random number is obtained by the random number sampling circuit and the lottery is conducted by using the JP right lottery table to determine whether or not the right to win three kinds of JPs is obtained in each station 4. Here, as one example, in the JP right lottery table, a range of random numbers is set so that the probability to win the JP of "MINI" becomes 4.7684%, the probability to win the JP of "MAJOR" becomes 0.4172% and the probability to win the JP of "MEGA" becomes 0.0298%.

And in S1110, based on the lottery result of the JP right lottery process in S1109, it is determined whether or not the right to win any of the JPs is obtained in at least more than one station 4. As a result, if it is determined that the right to win any of the JPs is obtained in at least more than one station 4 (S1110: YES), any one of number pockets 105 among "00", "0", "1"~"36" is randomly selected and such selected number pocket is set to the bonus pocket (S1111).

On the other hand, if it is determined that the right to win the JP is not obtained in all of the stations 4 (S1110: NO), procedure shifts to S1114.

Next, in S1112, the server control CPU 81 obtains the random number by the random number sampling circuit and conducts the lottery by using the effect lottery table to determine whether or not the effect to notify the number corresponded to the bonus pocket set in S1111 is conducted, and whether or not the effect to notify the kind of JP that the right to win thereof is obtained. Here, in the effect lottery table, a range of random numbers is set so that the number is notified with the probability of 90%. If the player obtains the right to win the JP of "MEGA" and "MAJOR", the kind of JP is notified with the probability of 50%, and if the player obtains the right to win the JP of "MINI", a range of random numbers is set so that the kind of JP is notified with the probability of 0% (the kind of JP is not notified).

Thereafter, in S1113, the server control CPU 81 transmits the lottery result of S1112 to each station 4. Each station 4 indicates the bonus pocket by using the image display device 8 and the speaker 10 (see FIG. 31).

Next, in S1114, the server control CPU 81 drives the winning determination device after the ball 27 enters in the number pocket 105 or the bonus pocket and determines that the ball 27 enters in the number pocket 105 corresponded to which number, or whether or not the ball 27 enters in bonus pocket set in S1111. Based on the determination result in S1114, the server control CPU 81 transmits the kind of pocket in which the ball 27 enters to each station 4 (S1115).

Next, in S1116, if it is determined that the ball 27 enters in any of the number pockets 105, it is determined whether or not winning is obtained for chips betted in each station 4, based on the bet information of each station 4 received in S1107 and the kind of pocket determined in S1114. Further, based on the kind of pocket determined in S1114, it is determined whether or not the JP is won in a case that the station 4 obtaining the right to win the JP exists.

Next, the server control CPU 81 executes the allotment calculation process (S1117). In the allotment calculation process, winning chips betted to the winning number are recognized in every station 4 and total allotment sum of credits paid out to each station 4 is calculated by using the allotment magnification (credit number per one chip (one bet)) for each BET area 72 stored in the allotment credit memory area 82A of the ROM 82. If any of JPs is won, the credit accumulated in each of the JP accumulation memory areas 83E~83G at present is calculated as the allotment sum.

In S1118, the server control CPU 81 executes the transmission process of the payout result of credits on the basis of the allotment calculation process in S1117. Concretely, the credit data corresponding to the allotment sum of the base game are output to the station control CPU 91 of the station, which wins the base game, and if the JP is won, the credit data corresponding to the JP sum accumulated at present are further output.

Thereafter, in S1119, the ball collection device arranged under the wheel 104 is driven, and the ball on the wheel 104 is collected. The collected ball 27 is again thrown in the wheel 104 of the roulette device 102 in the following game.

As mentioned, in the roulette game machine according to the sixth embodiment, the station in which more than a predetermined bet number is betted is extracted from the stations 4 a lottery is conducted to determine whether or not the right to win any of three kinds of JPs is obtained against one of plural stations 4 which are extracted (S1109). Further, if at least one station 4 obtaining the right to win the JP exists (S1110: YES), any one of number pockets 105 is set to the bonus pocket 107 (S1111), and before the ball 27 enters in any of pockets in the roulette device 102, the number corresponded to the bonus pocket is notified (S1011). Therefore, it can be clearly notified that the bonus pocket which is confirmed to win the JP exists in any of the stations 4 before the lottery for the pocket is conducted. Thereby, expectation of the player for the bonus pocket can be raised and fairness for the lottery in the game can be made the player recognize.

In a case that the bonus pocket is set based on that any of the stations 4 obtains the right to win the JP and the ball 27 enters in the bonus pocket set according to the above, any of the stations 4 certainly obtains the JP, therefore stress of the player can be reduced without losing expectation.

Further, even if any of the stations 4 obtains the right to win the JP, the lottery of JP using the bonus pocket for JP obtainment and the normal lottery using the number pockets 105 are conducted at the same time by using the same roulette device 102 without being independently conducted, therefore the gaming time can be reduced and the player does not feel stress.

Seventh Embodiment

Figure 34:
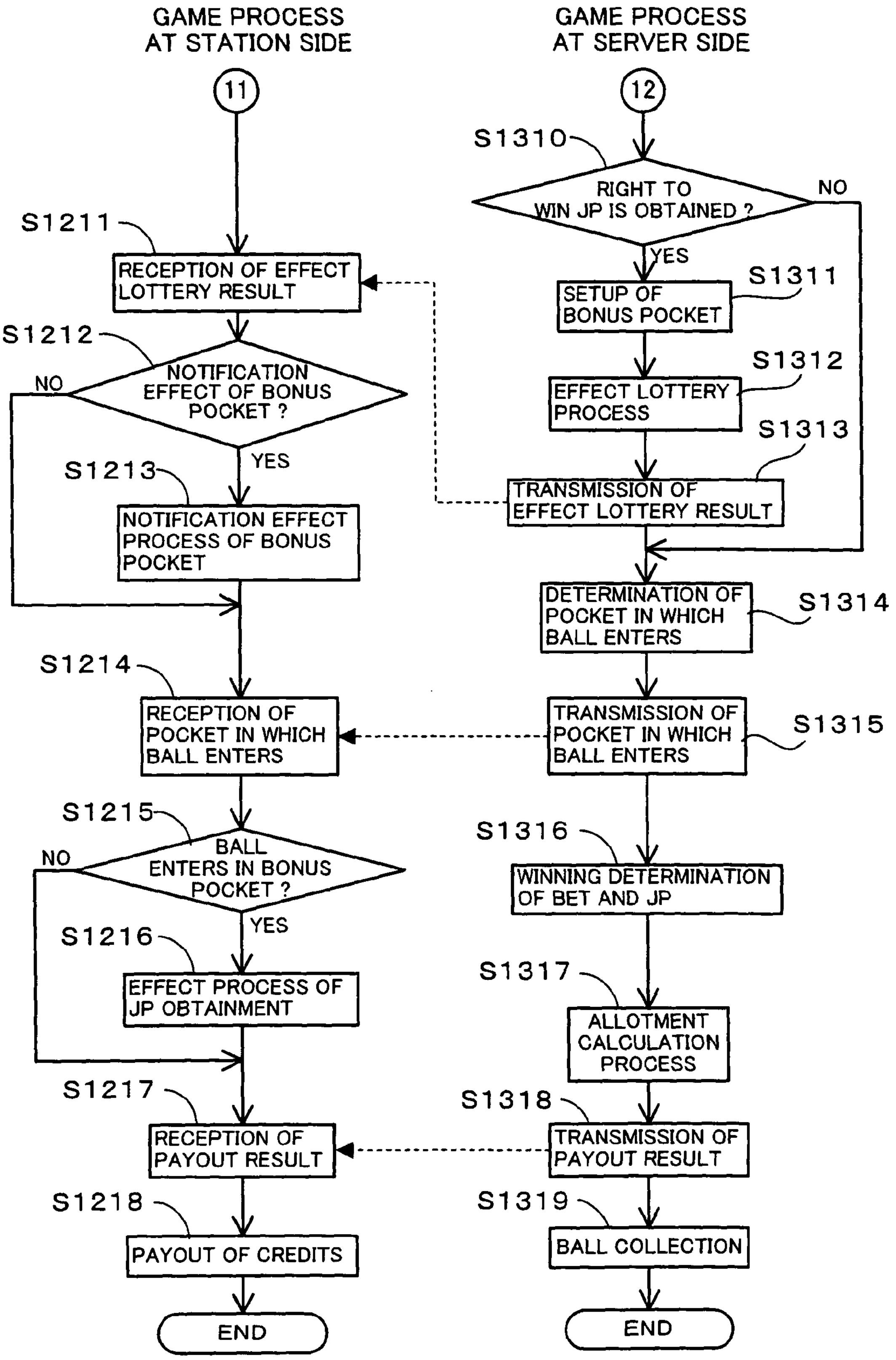
FIG. 34 is a flowchart of game process program executed in the roulette game machine according to the seventh embodiment.

Next, the roulette game machine according to the seventh embodiment will be described with reference to FIGS. 33 and 34. Here, in explanation hereinafter, the roulette game machine of the seventh embodiment has the same construction as that of the first embodiment described based on FIGS. 1 to 14, therefore the same number used in the seventh embodiment indicates the same constructive element in the roulette game machine 1 of the first embodiment.

An outline construction of the seventh embodiment is almost as same as that of the roulette game machine 1 of the sixth embodiment. Various processes in the seventh embodiment are substantially similar to those in the roulette game machine 1 of the sixth embodiment.

However, although in the roulette game machine 1 of the seventh embodiment, the game can be conducted while changing two states of an insurance subscription state and an insurance non-subscription state through an insurance bet button (not shown) which is displayed on the image display device 8 for a predetermined time after the bet time elapses.

Concretely, when the insurance bet button is pressed, the insurance subscription state is set by collecting a part of consumed game media (for example, 10% of the credits betted in all stations 4) as a premium and if the right to win the JP cannot be obtained by the lottery concerning with obtainment of the right to win the JP, it is constructed so that a predetermined number of game media are paid out to compensate the player's loss. Here, the insurance bet button may be provided in the control portion 7 (see FIG. 1). As the premium, a part of game media betted may be collected. As mentioned, by collecting a part of game media obtained or held by the player at the gaming machine side as the premium, it is not required to independently provide a pool for insurance at the casino side. Therefore, a manager of the casino can easily manage the premium.

Hereinafter, with reference to FIGS. 33 and 34, it will be described a game process program in the server executed by the server control CPU 81 in the roulette game machine according to the seventh embodiment and a game process program in the station executed by the station control CPU 91 in the station 4. Here, programs shown by the flowcharts of FIGS. 33 and 34 are stored in the ROM 82 and RAM 83 provided in the server 13 and in the ROM 92 and RAM 93 provided in the station 4, and executed by the server control CPU 81 and the station control CPU 91.

At first, with reference to FIGS. 33 and 34, the game process program in the station will be described. Here, processes in S1201 to S1207 are as same as those of S1 to S7 of the game process program (see FIGS. 11 and 12) in the station of the first embodiment, explanation thereof will be omitted.

And in S1208, the insurance bet button is displayed on the image display device 8 for a predetermined time (for example, 3 seconds) and it is determined whether or not the insurance bet button is pressed for the predetermined time. If it is determined that the insurance bet button is pressed (S1208: YES), the roulette game machine shifts to the insurance subscription state, and a part of game media (for example, 10% of the credits betted in all stations 4) consumed when betted is newly collected as the premium (S1209). On the other hand, if it is determined that the insurance bet button is not pressed (S1208: NO), the roulette game machine shifts to the insurance non-subscription state. Here, in the roulette game machine of the seventh embodiment, by pressing the insurance bet button, the player can play the game by selecting one of two insurance subscription state and insurance non-subscription state. Especially, in the insurance subscription state, a part of game media consumed when betted is collected as the premium and if the right to win the JP is not obtained in a JP right lottery process (S1309) mentioned later, it is constructed so that a predetermined number of game media (for example, 50% of all credits betted by the player or 50% of all bet numbers betted in the game) is paid out (S1218) to compensate the player's loss.

Next, in S1210, the station control CPU 91 transmits the bet information (bet area 72 directed, number of chips betted to bet area 72 (bet number)) conducted by the player in the station 4 and existence of the insurance subscription state if exists.

Next, in S1211, the station control CPU 91 receives from the server 13 the effect lottery result obtained by the lottery whether or not the bonus pocket is indicated as being set in the present game and the number corresponded to the set bonus pocket is conducted.

In S1212, based on the effect lottery result received in S1211, it is determined whether or not the bonus pocket is indicated. As a result, if it is determined that the bonus pocket is indicated (S1212: YES), the bonus pocket notification effect process is executed by using the image display device 8 and the speaker 10 (S1213). Concretely, in the bonus pocket notification effect process, it is notified to the player that the bonus pocket is set in the present game, the number corresponded to the set bonus pocket and the kind of JP (kind of JP that winning right thereof is obtained in S1309) which can be obtained when the ball 27 enters in the bonus pocket.

Here, as for the bonus notification effect conducted in S1213, such effect is as same as that of the roulette game machine in the sixth embodiment, thus explanation thereof will be omitted.

Thereafter, in S1214, after the lottery by the roulette device 102 is terminated, the number pocket 105 in which the ball 27 enters and the kind of the bonus pocket 107 are received from the server 13. In S1215, the station control CPU 91 determines whether or not the ball particularly enters in the bonus pocket 107 set according to the above. If it is determined that the ball 27 enters in the bonus pocket 107 (S1215: YES), it is conducted the JP obtainment effect process to notify whether or not the JP is obtained in such station 4 (S1216). On the other hand, if it is determined that the ball 27 does not enter in the bonus pocket 107 (S1215: NO), procedure shifts to S1217.

Here, the JP obtainment effect conducted in S1216 is—similar to that of the roulette game machine in the sixth embodiment, thus explanation thereof will be omitted.

In S1217, the station control CPU 91 receives the payout result of credits transmitted from the server control CPU 81. Here, the payout result of credits is constructed from the payout result of the base roulette game conducted by using the BET screen 110, the payout result of JP when the JP is obtained and the payout result compensating loss of the player when the insurance subscription state exists.

Thereafter, in S1218, the payout of credits is done based on the payout result received in S1217. Concretely, the credit data of the allotment in the roulette game which is the base game, the credit data of JP sum accumulated in the JP by present if the JP is won and the credit data corresponding to 50% of the credits betted if winning is lost in the lottery to obtain the JP under the insurance subscription state are respectively stored in the RAM 93. When the CASHOUT button 48 is pressed, medals (generally one medal for one credit) corresponding to the credit number stored in the RAM 93 at present are paid out from the medal payout opening 9.

Thereafter, in a case that the game is continued in any of the stations 4, procedure returns to S1204, thereby the bet time is again started and procedure shifts to the next game.

On the other hand, if the game is terminated in all of the stations 4, the roulette game is terminated.

Here, in the seventh embodiment, although it is constructed so that the insurance bet button is pressed after the process in S1207 is terminated, validity/invalidity (non-valid) of the insurance bet operation may be always selected during the game (in spite of present game or next game), by collecting a predetermined sum (for example, 1 bet among 10 bets) betted for the base game by the player at the start of game or another predetermined sum (for example, 1 bet) different from the sum betted for the base game as the insurance bet. It may be constructed so as to have a game state discrimination device through which the station control CPU 91 discriminates the validity/invalidity of the insurance bet. Thereby, at the station side, as one example, the present game state of the station 4 can be recognized by the player, by discriminatingly displaying the insurance bet button in blue color if the insurance bet button is valid or in red color if the insurance bet button is invalid.

Further, the credits to compensate the loss may be paid out when the loss credit number obtained by subtracting "credit number paid out (obtained) on the basis of the game result" from "credit number betted (consumed) through the bet button by the player" reaches to the upper limit value. Instead of the loss credit number, the credits may be paid out based on the payout rate. For example, when the payout rate becomes a predetermined rate (for example, 60%), the credit may be paid out. As for the payout at that time, the credit may be paid out like a mystery bonus. Thereby, when the loss sum of the player reaches to a predetermined rate, the loss compensation is suddenly conducted, and game motivation of the player is raised, as a result, game continuation by the player can be progressed.

Next, with reference to FIGS. 34 and 35, the game process program conducted in the server side will be described. Here, processes in S1301 and S1306 are as same as those in S101 to S106 of the game process program (see FIGS. 11 and 12) in the station side of the first embodiment, thus explanation thereof will be omitted.

In S1307, the server control CPU 81 receives the bet information (bet area 72 directed, the number (bet number) of chips betted to the directed bet area 72) and the information whether or not the insurance subscription state exists, and stores them in the bet information memory area 83A of the RAM 83.

Thereafter, in S1308, the credits corresponding to 0.30% of total credits betted in each of the stations 4 from which the bet information is received in S1307 are accumulatively added to the JP sum of "MINI" stored in the JP accumulation memory area 83E of the RAM 83. The credits corresponding to 0.20% are accumulatively added to the JP sum of "MAJOR" stored in the JP accumulation memory area 83F of the RAM 83. Further, the credits of 0.15% are accumulatively added to the JP sum of "MEGA" stored in the JP accumulation memory area 83G of the RAM 83. According to this, the JP sum display portion 15 and the MINI display portion 111~MEGA display portion 113 are renewed.

Next, in S1309, based on the bet information received in S1307, the server control CPU 81 extracts the station 4 in which the bet number is more than 50 bets and conducts the JP right lottery process to conduct a lottery whether or not the right to win the JP is obtained in one station 4 or plural stations 4 extracted. In the JP right lottery process, concretely, the random number is obtained by the random number sampling circuit and the lottery is conducted by using the JP right lottery table to determine whether or not the right to win three kinds of JPs is obtained in each station 4. Here, as one example, in the JP right lottery table, a range of random numbers is set so that the probability to win the JP of "MINI" becomes 4.7684%, the probability to win the JP of "MAJOR" becomes 0.4172% and the probability to win the JP of "MEGA" becomes 0.0298%.

In S1310, based on the lottery result of the JP right lottery process in S1109, it is determined whether or not the right to win any of the JPs is obtained in at least more than one station 4. As a result, if it is determined that the right to win any of the JPs in at least more than one station 4 (S1310: YES), any one of number pockets 105 among "00", "0", "1"~"36" is randomly selected and such selected number pocket is set to the bonus pocket (S1311).

On the other hand, if it is determined that the right to win the JP is not obtained in all of the stations 4 (S1310: NO), procedure shifts to S1314.

Next, in S1312, the server control CPU 81 obtains the random number by the random number sampling circuit and conducts the lottery by using the effect lottery table to determine whether or not the number corresponded to the bonus pocket set in S1311 is identified, and whether or not the kind of JP that may be won is identified. Here, in the effect lottery table, a range of random numbers is set so that the number is notified with the probability of 90%. If the player obtains the right to win the JP of "MEGA" and "MAJOR", the kind of JP is notified with the probability of 50%, and if the player obtains the right to win the JP of "MINI", a range of random numbers is set so that the kind of JP is notified with the'probability of 0% (the kind of JP is not notified).

Thereafter, in S1313, the server control CPU 81 transmits the lottery result of S1312 to each station 4. Each station 4 conducts the notification effect of the bonus pocket by using the image display device 8 and the speaker 10.

Next, in S1314, the server control CPU 81 drives the winning determination device after the ball 27 enters in the number pocket 105 or the bonus pocket and determines that the ball 27 enters in the number pocket 105 corresponded to which number, or whether or not the ball 27 enters in bonus pocket set in S1311. Based on the determination result in S1314, the server control CPU 81 transmits the kind of pocket in which the ball 27 enters to each station 4 (S1315).

Next, in S1316, if it is determined that the ball 27 enters in any of the number pockets 105, it is determined whether or not winning is obtained for chips betted in each station 4, based on the bet information of each station 4 received in S1307 and the kind of pocket determined in S1314. Further, based on the kind of pocket determined in S1314, it is determined whether or not the JP is won in a case that the station 4 obtaining the right to win the JP exists.

Next, the server control CPU 81 executes the allotment calculation process (S1317). In the allotment calculation process, winning chips betted to the winning number are recognized in every station 4 and total allotment sum of credits paid out to each station 4 is calculated by using the allotment magnification (credit number per one chip (one bet)) for each BET area 72 stored in the allotment credit memory area 82A of the ROM 82. If any of JPs is won, the credits accumulated in each of the JP accumulation memory areas 83E~83G at present are calculated as the allotment sum. Further, in the insurance subscription state, if there exists the station 4 which loses the lottery of the right to win the JP, 50% of the credits betted in such station 4 are calculated as the allotment sum.

in S1318, the server control CPU 81 executes the transmission process of the payout result of credits on the basis of the allotment calculation process in S1317. Concretely, the credit data corresponding to the allotment sum of the base game are output to the station control CPU 91 of the station, which wins the base game, and if the JP is won, the credit data corresponding to the JP sum accumulated at present are further output. Further, if there exists the station 4, which loses the lottery of the right to win the JP, in order to compensate the loss, the credit data corresponding to 50% of the credits betted in such station 4 are output.

Thereafter, in S1319, the ball collection device arranged under the wheel 104 is driven, and the ball on the wheel 104 is collected. The collected ball 27 is again thrown in the wheel 104 of the roulette device 102 in the following game.

As mentioned in the above, in the roulette game machine according to the seventh embodiment, after the bet time elapses, the roulette game machine shifts to the insurance subscription state based on that the additional credits are collected in the station 4 in which the insurance bet button is pressed, and even if the right to win the JP cannot obtained in such station 4, 50% of the credits betted in the present game are returned. Therefore, the loss of the player can be compensated. Thereby, fairness among players can be raised by compensating the loss of the player and game motivation can be raised.

Here, the present invention is not limited to the above embodiments, and various modifications and changes can be done within the scope of the present invention.

For example, in the embodiments mentioned in the above, concerning with the award beneficial for the player, such award means that the game state shifts to a beneficial game state for the player or a beneficial game result for the player is obtained. Concretely, such award includes that the bonus game is conducted and the game media with a predetermined worth are paid out.

For example, in the first embodiment, although the special bonus game, which is conducted when the ball 27 enters in the bonus pocket, is determined by turning on the WIN lamp 11 as shown in FIG. 14, and all credits betted in each station 4 are paid out to the station 4 in which winning is obtained, the bonus game is not limited to the above bonus game. For example, the BET screen 61 displayed on the image display device 8 is changed to the special bonus screen and the player who touches to the object first displayed on the special bonus screen can become a winner, and further all credits betted in each station 4 may be paid out to the station 4 in which the winner plays. Other than all credits, only a part of credits (for example, ½ of credits) may be paid out. Further, predetermined credits may be paid out to losers in addition to the winner.

In the first embodiment, although all credits betted in each station 4 are paid out to the station 4 in which winning is obtained in the special bonus game, a lottery result that any of the stations 4 cannot win may be provided based on a lottery result of the special bonus game. If such lottery result that no station 4 can win is realized, the credits which are scheduled to pay out in the present game (that is, all credits betted in each station 4 in the present game) may be pooled, and if the station 4 in which winning is obtained appears in the next bonus game, the credits pooled by present may be accumulatively added and such credits may be paid out to the station which winning is obtained. Here, the payout may be done in the game following to the next game.

Further, in the first to third embodiments, although if the station 4 in which winning is obtained in the bonus game appears, the credits betted in each of 12 stations 4 in the present game are paid out or accumulated to the JP, the game media (credits) paid out to the player may include the game media betted through the bet operation at any timing. For example, such game media may be the game media which are betted in the game when the bonus pocket is specified or may be the game media which are betted in the previous games or the game media which are betted in the games conducted in plural times within a predetermined time. Concretely, the credits betted in the games previously conducted before the previous game may be paid out or accumulated to the JP, other than the credits betted in the present game. Credits betted over plural games conducted for a predetermined time may be paid out or accumulated to the JP.

In the first and second embodiments, as the condition to execute the special bonus game and the condition to pay out the bonus allotment, although it is set the condition that game media more than 10 credits are betted in the station 4, the condition of more than 10 credits may not be required. For example, such condition may be satisfied by more than 1 bet. Without setting the condition by the worth of game media, the station 4 in which betting is conducted through a specific kind of game method (for example, "straight bet" or "corner bet") may satisfy the condition to execute the special bonus game and the condition to pay out the bonus allotment.

In the fourth embodiment, although the bonus allotment is calculated and paid out corresponding to the case that the ball 27 enters in the bonus pocket 24 based on the credit number betted by the bet operation conducted by the player through the BET screen 61 and the allotment magnification corresponding to such bet method, the bonus allotment which is calculated based on only the credit number betted may be paid out or the bonus allotment calculated based on only the bet method (that is, payout rate) may be paid out.

Here, concept of "bet method" includes the kind and number of the discriminative numbers to which the game media are betted and the magnification when such discriminative number is won.

In the sixth embodiment, although the number of bonus pocket is set one in a case that the right to win the JP is obtained in any of the stations 4, more than two bonus pockets may be set.

Further, in the seventh embodiment, the compensation of the loss means that the game state shifts to a beneficial game state for the player or a beneficial game result for the player is obtained. Concretely, such award includes that the bonus game is conducted and the game media with a predetermined worth are paid out. An additional bet operation for compensating the loss may be accepted and such loss may be compensated for (returned to) the player when the additional bet operation is accepted.

For example, although 50% of the credits betted are returned to the player under the insurance subscription state if the right to win the JP cannot be obtained through the insurance bet, for example, the right to win the JP may be forcibly obtained or compensation may be done by increasing the payout rate for a predetermined time.

Further, the credits to compensate the loss may be paid out when the loss credit number obtained by subtracting "credit number paid out (obtained) on the basis of the game result" from "credit number betted (consumed) through the bet button by the player" reaches to the upper limit value. Instead of the loss credit number, the credits may be paid out based on the payout rate. For example, when the payout rate becomes a predetermined rate (for example, 60%), the credits may be paid out. Under a condition that winning is not obtained in the station 4 for a predetermined time, the loss may be compensated for such station 4. Thereby, game motivation can be raised for the player of the above game machine who is losing interest for games without obtaining winnings.

In the first to seventh embodiments, although such embodiments are described according to the roulette game machine 1 with the roulette device 3, for example, the present invention can be adopted for the bingo game machine or the keno game machine.

What is claimed is:

1. A gaming machine comprising:

a wheel having a plurality of pockets each of which is labeled with a discriminative number, the pockets being arranged thereon;

a plurality of game stations each of which has a bet acceptance device which accepts a bet operation conducted while predicting a winning number; and a processor programmed to operate with the wheel and the game stations (a) to specify a pocket among the plurality of pockets on the wheel, (b) to detect the discriminative number given to the specified pocket as the winning number, (c) to pay out to a game station of the plurality of game stations based on the detected winning number and the bet operation accepted by the bet acceptance device in the game station, (d) to set a predetermined one of the pockets to a bonus pocket, wherein the processor notifies users of the plurality of game stations of the discriminative number given to the pocket which is set to the bonus pocket before the pocket is specified, wherein the bonus pocket is specifically selected prior to a start of a game and remains set until a new bonus pocket is specifically selected, and (e) to give an award to the game station when the bonus pocket is specified thereby.

2. The gaming machine according to claim 1, wherein the processor determines whether or not there exists the game station in which more than a predetermined bet amount is betted through the bet operation accepted by the bet acceptance device; and wherein the processor gives the award to the game station when there exists the game station in which more than the predetermined bet amount is betted.

3. The gaming machine according to claim 2, wherein the processor executes a bonus game as the award.

4. The gaming machine according to claim 1, wherein the processor awards to one game station all or a part of the bet amounts which are betted in all of the game stations when the bonus pocket is specified in the one game station.

5. The gaming machine according to claim 3, wherein the processor pays out based on a game result of the bonus game executed.

6. The gaming machine according to claim 1, further comprising:

an accumulation memory for accumulatively storing a predetermined rate of a bet amount which is betted through the bet acceptance device in each of all game stations;

wherein the processor accumulatively stores in the accumulation memory all of the bet amount betted through the bet acceptance device in each of all game stations when the bonus pocket is specified thereby, and wherein the processor pays out the bet amounts stored in the accumulation memory when a predetermined condition is realized.

7. The gaming machine according to claim 1, wherein a plural kinds of bet methods are accepted by the bet acceptance device, and wherein the processor pays out corresponding to the kind of the bet method accepted by the bet acceptance device when the bonus pocket is specified in the game station.

8. The gaming machine according to claim 7, wherein the processor specifies the bet amount based on worth of the bet amount betted and a payout magnification corresponding to the kind of the bet method.

9. The gaming machine according to claim 1, further comprising a bonus pocket indicator operable to indicate which of the pockets is set as the bonus pocket prior to a start of a game.

10. A gaming machine comprising:

a selection operation acceptance device configured to accept a selection operation to select one or more number pockets among a plurality of number pockets each of which is labeled with a discriminative number;

a bonus pocket setting device configured to set as a bonus pocket the number pocket selected in the selection operation accepted by the selection operation acceptance device, wherein the bonus pocket is selected prior to a start of a game and remains set until a new bonus pocket is specifically selected;

a wheel on which the number pockets and the bonus pocket set by the bonus setting device are arranged in a line along a circumference thereof;

a pocket specification device configured to specify one or more number pockets or the bonus pocket among the plurality of number pockets arranged on the wheel;

a winning number detection device configured to detect as a winning number the discriminative number given to the number pocket specified by the pocket specification device when the number pocket is specified by the pocket specification device;

a plurality of bet acceptance devices configured to accept one or more bet operations by a player conducted based on game media accumulated while anticipating the winning number detected by the winning number detection device, wherein the bet acceptance devices notify the player of the discriminative number of the bonus pocket before the pocket specification device specifies the one or more number pockets or the bonus pocket;

a payout device configured to pay out the game media to the player based on the winning number detected by the winning number detection device and the bet operation accepted by the bet acceptance device; and a special payout device configured to pay out to the player a part or whole of all game media betted in the bet operations accepted by the plurality of bet acceptance devices when the bonus pocket is specified by the pocket specification device.

11. A gaming machine comprising:

a selection operation acceptance device configured to accept a selection operation to select one or more number pockets among a plurality of number pockets each of which is labeled with a discriminative number;

a bonus pocket setting device configured to set as a bonus pocket the number pocket selected in the selection operation accepted by the selection operation acceptance device, wherein the bonus pocket is selected prior to a start of a game and remains set until a new bonus pocket is specifically selected;

a wheel on which the number pockets and the bonus pocket set by the bonus pocket setting device are arranged in a line along a circumference thereof;

a pocket specification device configured to specify one or more number pockets or the bonus pocket among the plurality of number pockets arranged on the wheel;

a winning number detection device configured to detect as a winning number the discriminative number given to the number pocket specified by the pocket specification device when the number pocket is specified by the pocket specification device;

a plurality of bet acceptance devices configured to accept one or more bet operations by a player conducted based on game media accumulated while anticipating the winning number detected by the winning number detection device, wherein the bet acceptance devices notify the player of the discriminative number of the bonus pocket before the pocket specification device specifies the one or more number pockets or the bonus pocket;

a first payout device configured to pay out the game media to the player based on the winning number detected by the winning number detection device and the bet operation accepted by the bet acceptance device;

a memory device configured to accumulatively store a predetermined worth amount among a worth amount of the game media betted in the bet operation;

a second payout device configured to payout to the player the game media corresponding to the predetermined worth amount accumulatively stored in the memory device when a predetermined condition is satisfied; and a special memory configured to accumulatively store data representing all game media corresponding to all worth amount betted in the bet operations accepted by the plurality of bet acceptance devices when the bonus pocket is specified by the pocket specification device.

* * * * *